United States Patent [19]

Morton et al.

[11] Patent Number: 4,965,679
[45] Date of Patent: Oct. 23, 1990

[54] METHOD FOR ELECTRONICALLY DUPLICATING FILM IMAGES WHILE MAINTAINING A HIGH DEGREE OF IMAGE QUALITY

[75] Inventors: Roger R. A. Morton, Penfield; Joseph T. Olesik, Rochester, both of N.Y.

[73] Assignee: Eastman Kodak Company, Rochester, N.Y.

[21] Appl. No.: 316,197

[22] Filed: Feb. 27, 1989

[51] Int. Cl.$^5$ .............................................. H04H 1/40
[52] U.S. Cl. ....................................... 358/462; 358/455; 358/463; 358/487; 358/447; 382/18; 382/48
[58] Field of Search ............... 358/400, 401, 403, 406, 358/434, 443, 445, 447, 448, 455, 463, 464, 465, 466, 462, 909, 487; 355/20; 382/18, 51

[56] References Cited

U.S. PATENT DOCUMENTS

| | | | |
|---|---|---|---|
| 3,400,632 | 9/1968 | Wahli | 355/20 |
| 3,715,724 | 2/1973 | Demonte et al. | 382/51 |
| 3,920,862 | 11/1975 | Damschroder et al. | 427/131 |
| 3,974,326 | 8/1976 | Rodolsky et al. | 358/426 |
| 4,001,846 | 1/1977 | Kauneckas | 354/105 |
| 4,096,472 | 6/1978 | Mercier | 382/50 |
| 4,145,709 | 3/1979 | Kelly | 355/111 |
| 4,213,040 | 7/1980 | Gokey et al. | 235/476 |
| 4,254,329 | 3/1981 | Gokey et al. | 235/379 |
| 4,263,001 | 4/1981 | Deutsch | 355/45 |
| 4,265,532 | 5/1981 | McIntosh | 355/20 |
| 4,288,157 | 9/1981 | Brunner | 355/40 |
| 4,437,125 | 3/1984 | Yamamoto | 358/167 |
| 4,449,052 | 5/1984 | Krieg | 382/50 |
| 4,497,066 | 1/1985 | Gasparri, Jr. | 382/18 |
| 4,511,229 | 4/1985 | Schwartz et al. | 354/20 |
| 4,513,325 | 4/1985 | Itoh | 358/450 |
| 4,513,390 | 4/1985 | Walter et al. | 364/900 |
| 4,555,729 | 11/1985 | Driessen | 358/133 |
| 4,607,367 | 8/1986 | Ive et al. | 371/37.4 |
| 4,627,719 | 12/1986 | Nitsch et al. | 355/41 |
| 4,654,722 | 3/1987 | Alkofer | 358/455 |
| 4,679,095 | 7/1987 | Kitamura et al. | 358/461 |
| 4,710,785 | 12/1987 | Mills | 358/406 |
| 4,734,565 | 3/1988 | Pierce et al. | 235/454 |
| 4,853,795 | 8/1989 | Morton et al. | 358/447 |

Primary Examiner—Edward L. Coles, Sr.
Attorney, Agent, or Firm—Dennis R. Arndt

[57] ABSTRACT

The invention relates to the making of reproductions of microfilm images which are scanned line-by-line using photoelectronic devices. The subsequent generation of images are reproduced onto photosensitive material line-by-line. By processing the video signal generated by scanning the first or original image, a series of parameters are produced which are stored either on the film or in a separate location. The second generation image is electronically scanned and the video signal processed to provide a second series of parameters. The first and second series of parameters are compared to provide an adjustment signal. The adjustment signal is then used to change or alter the second video signal prior to it being used to electronically reproduce the second generation image on film. The stored series of video parameters are used to produce subsequent generations of film images in a like manner.

5 Claims, 33 Drawing Sheets

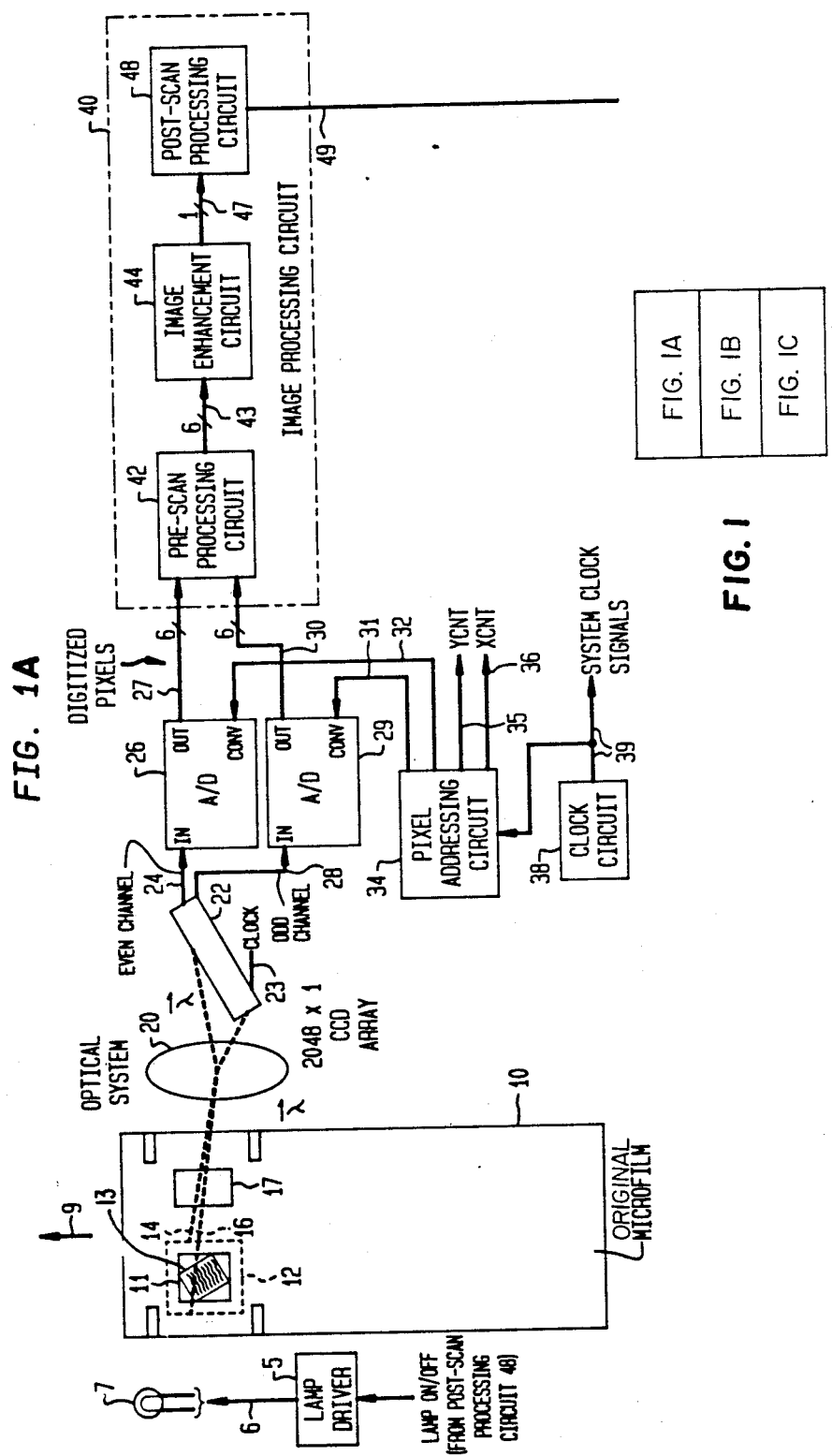

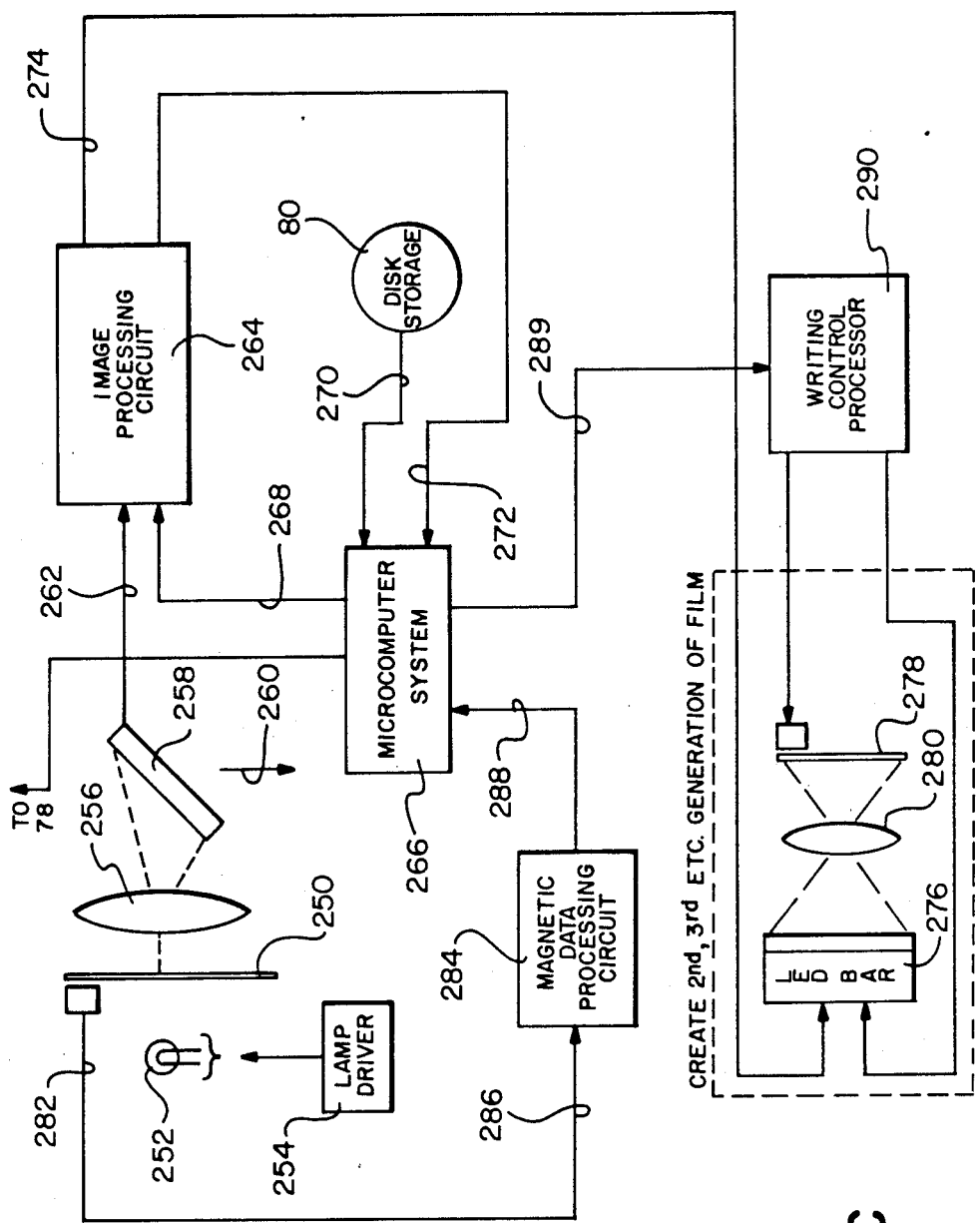
FIG. IC

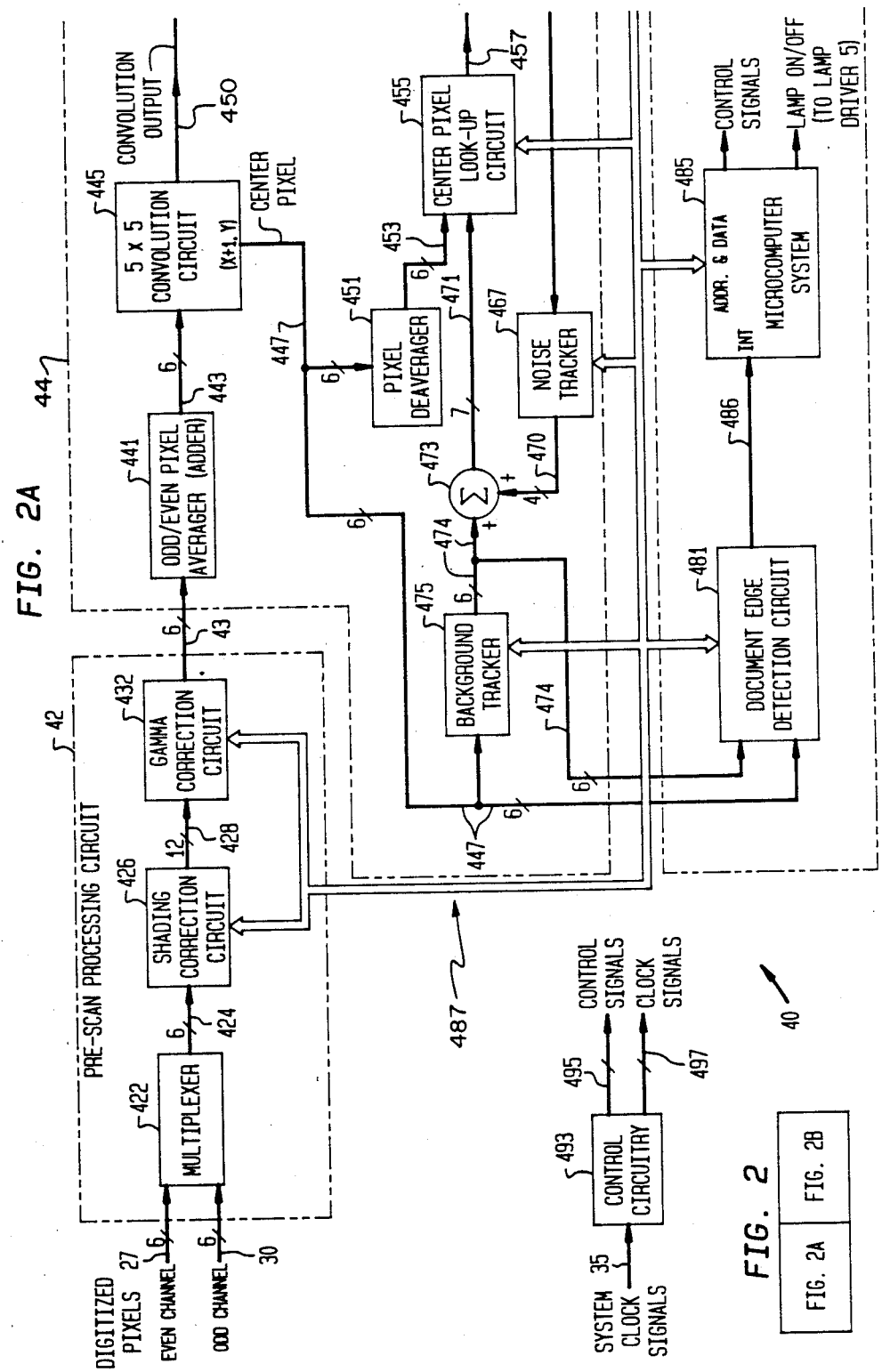

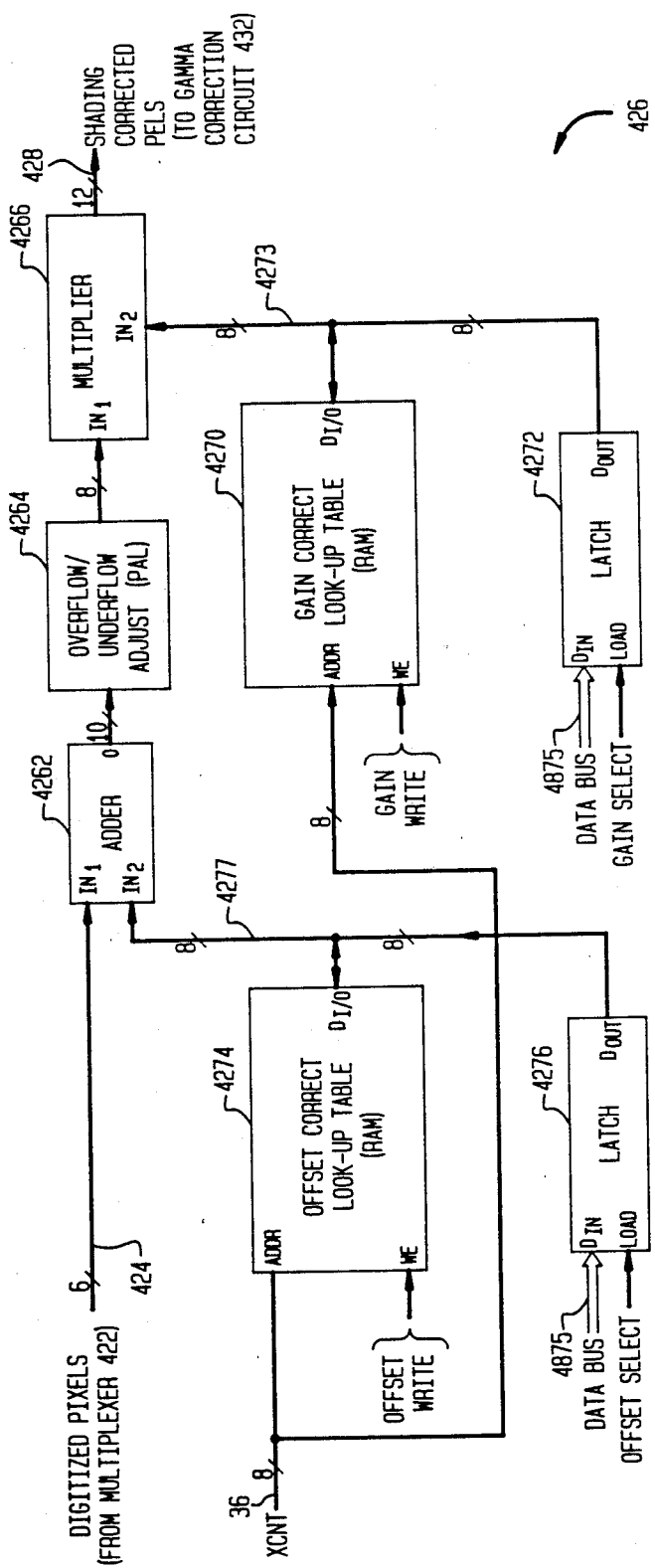

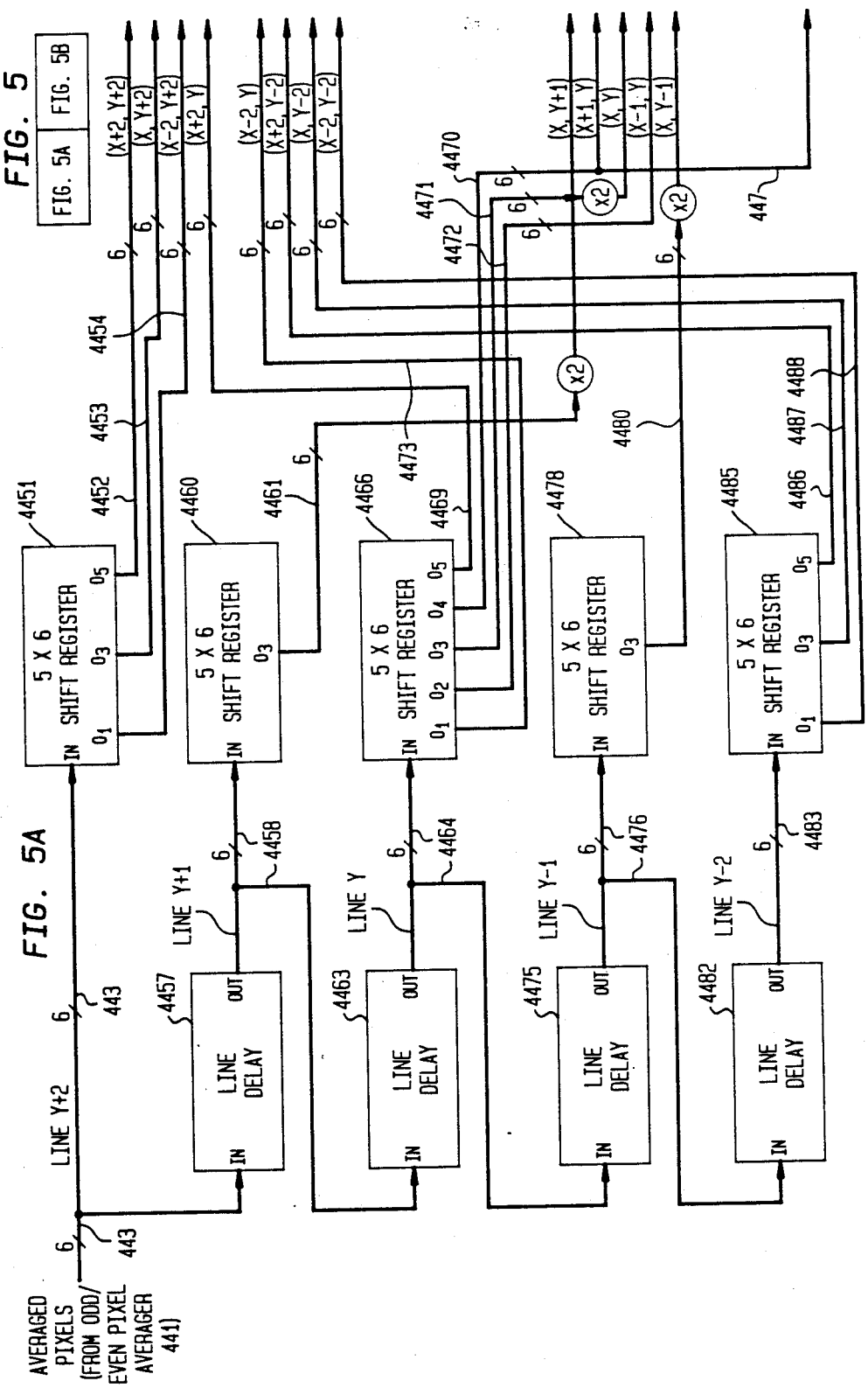

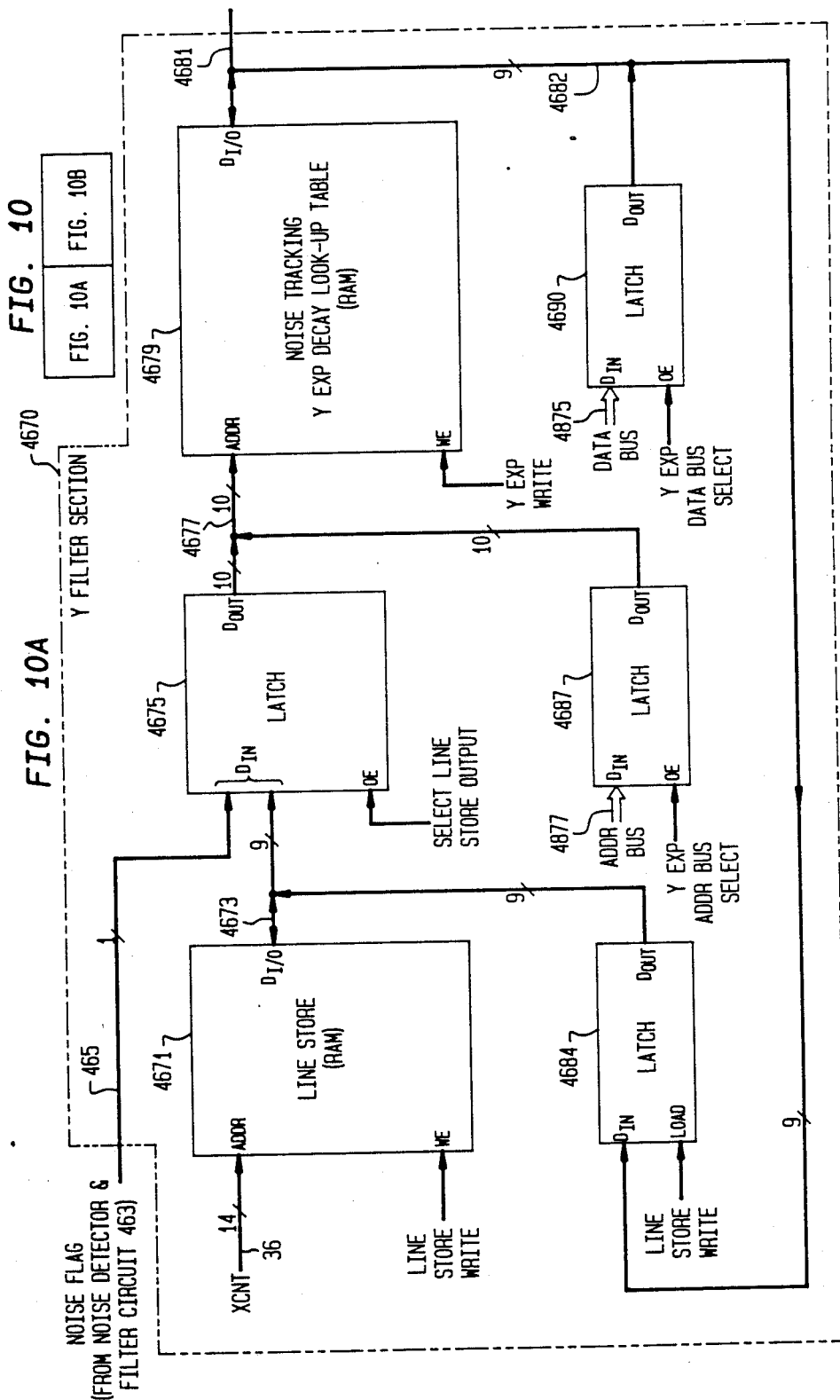

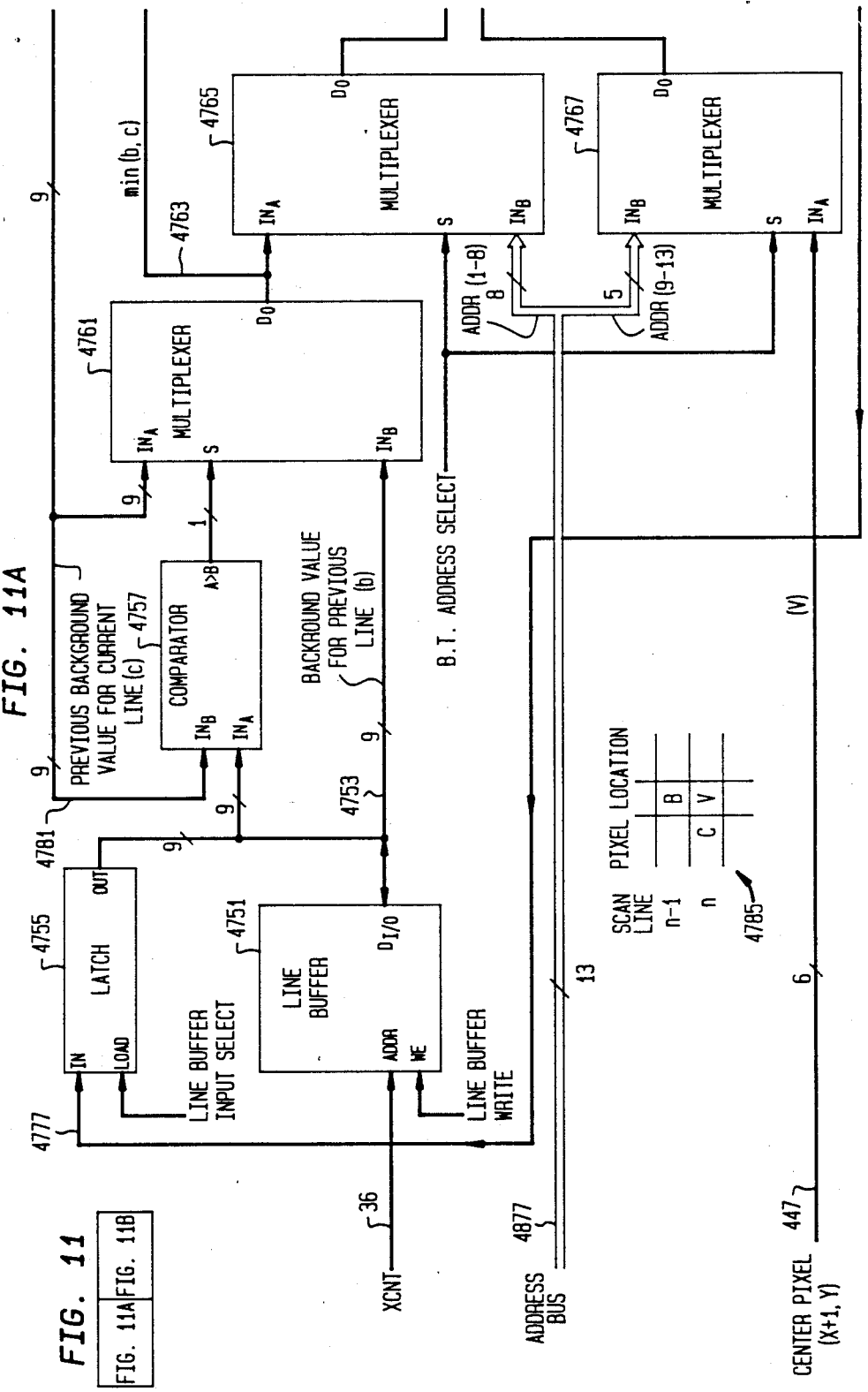

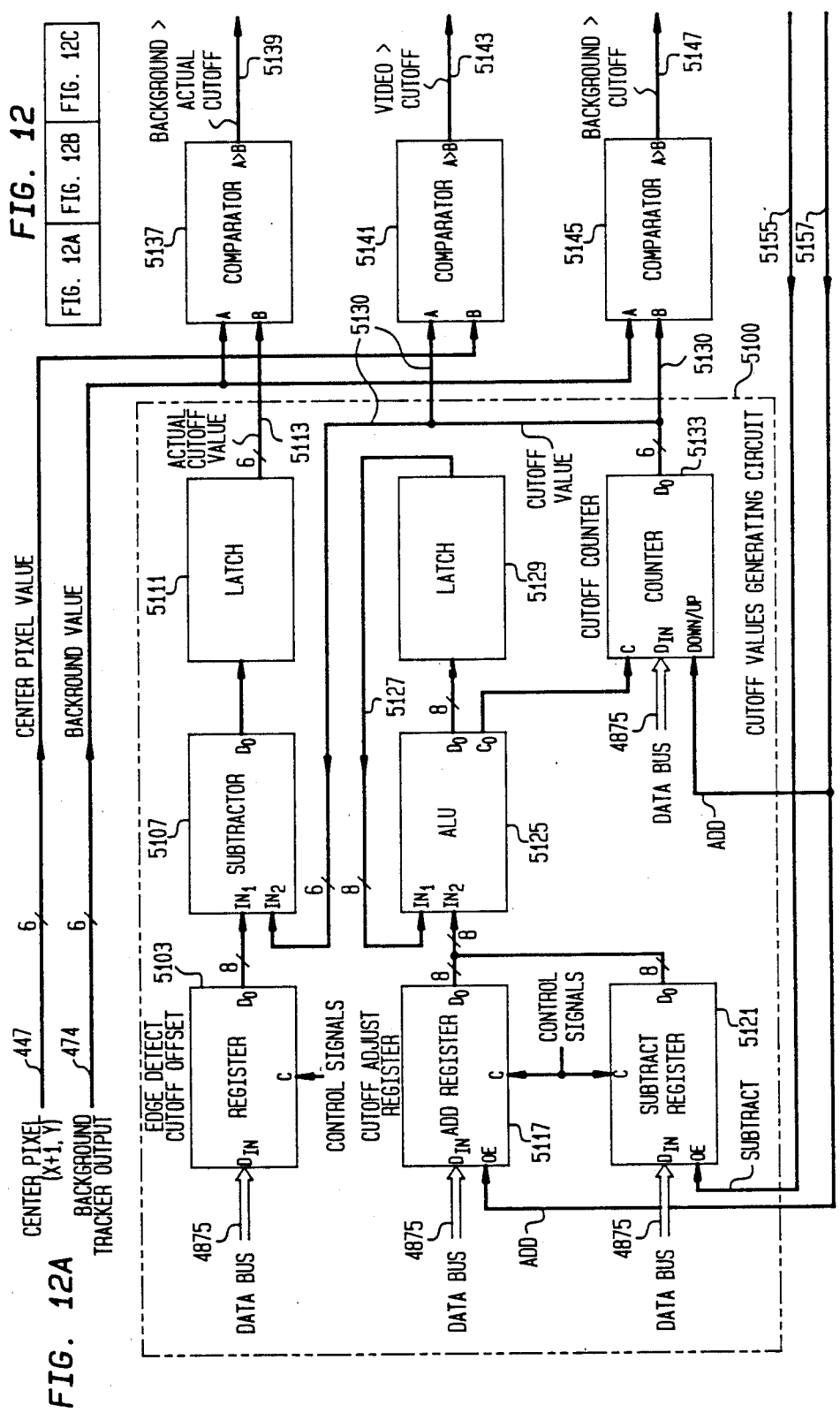

MAIN LOOP
1400

METHOD FOR ELECTRONICALLY DUPLICATING FILM IMAGES WHILE MAINTAINING A HIGH DEGREE OF IMAGE QUALITY

CROSS REFERENCE TO RELATED APPLICATIONS

Reference is made herein to commonly-assigned, copending U.S. patent application Ser. No. 07/316,204, entitled: APPARATUS FOR ELECTRONICALLY DUPLICATING FILM IMAGES WHILE MAINTAINING A HIGH DEGREE OF IMAGE QUALITY in the names of R. Morton and J. Olesik, filed concurrently herewith now U.S. Pat. No. 4,903,141.

TECHNICAL FIELD

The invention relates to a method of copying originals. More particularly, the invention relates to improvements in methods for making reproductions of originals which are scanned, line-by-line, by photoelectronic means. The images are reproduced onto photosensitive material, line-by-line. By processing information obtained from scanning the original video, parameters are produced which are stored either on the film or in a remote location. The stored video parameters are used to produce third or subsequent generations of film images.

BACKGROUND ART

Microfilm as a means of storing business documents offers many advantages including a more compact means of storing, more rapid access, having a long archival life, rapid speed of capture, and ability to make subsequent paper copies. However, when many of hundreds of thousands of documents are stored on microfilm per week, it is often desirable after a number of years to only preserve some of those documents by insuring that the microfilm may be selectively duplicated on a document by document basis. This duplication process may take place once every year or two and so over a long period of time, for example, fifty years, it may be necessary to make as many as twenty duplications of the microfilm. In the past, this has not been practical because by direct optical duplication, there is some loss of quality each time the copy is made.

The invention proposed herein overcomes this difficulty by using electronic techniques to generate the duplicate microfilm and along with the image itself is stored additional data, which may be used to control the scanning and the creation of subsequent generations of the microfilm in such a way that important parameters of the image are preserved.

Using this technique then, it would be possible to make high quality, multiple generations of microfilm and to monitor the quality throughout the useful life of the image. A further advantage is that quite often when copies of microfilm are made, it is customary to use negative film to produce copies from; this usually results in alternate generations of images to be positive or negative, with at least one generation being a wasted generation of film. Generally, the users desire the second generation copy to be the same sense as the original. There is a considerable disadvantage in going from positive to negative in alternate generations. This method and apparatus insures that it electronically maintains the sense of the copy as that of the original.

Another advantage of this method is that it helps make microfilm more compatible with the electronic office and computer environment. This insures that microfilm can be treated as other computer media, such as magnetic disc, magnetic tape, and optical discs as far as archival storage and ease of duplication.

DISCLOSURE OF THE INVENTION

It is an object of the present invention to provide a duplicating method for making multiple generations of film images while preserving the quality to a high degree of the original image. The method comprises means for electronically scanning a first or original film or paper document with a charged coupled device (CCD) linear array to provide a first video signal. The first video signal is processed to provide a first series of video parameters. Electronically writing on a second film, an image using the first video signal and storing the first series of video parameters. Electronically scanning the second generation image using a linear CCD array. The second video signal is processed to produce a second series of video parameters. Retrieving the first series of video parameters and comparing them with the second series of video parameters to produce an adjustment signal, and using the adjustment signal to modify the second video signal before using that signal to write the third generation of said image onto film.

BRIEF DESCRIPTION OF THE DRAWINGS

The teachings of the present invention may be readily understood by considering the following detailed description in conjunction with the accompanying drawing, in which:

FIG. 1 depicts the correct alignment of the drawing sheets for FIGS. 1A, FIG. 1B and 1C;

FIGS. 1A through 1C depict a block diagram of an embodiment of a microfilm scanning and image duplication system constructed in accordance with the teachings of the present invention;

FIG. 2 depicts the correct alignment of the drawing sheets for FIGS. 2A and 2B;

FIGS. 2A and 2B collectively depict a block diagram of Image Processing Circuit 40 shown in FIG. 1;

FIG. 3 depicts a block diagram of Shading Correction Circuit 426 which forms part of Image Processing Circuit 40 shown in FIGS. 2A and 2B;

FIG. 5 depicts the correct alignment of the drawing sheets for FIGS. 5A and 5B;

FIGS. 5A and 5B collectively depict a block diagram of 5-by-5 Convolution Circuit 445 which also forms part of Image Processing Circuit 40 shown in FIGS. 2A and 2B;

FIG. 10 depicts the correct alignment of the drawing sheets for FIGS. 10A and 10B;

FIGS. 10A and 10B collectively depict a block diagram of Noise Tracker 467 which also forms part of Image Processing Circuit 40 shown in FIGS. 2A and 2B;

FIG. 11 depicts the correct alignment of the drawing sheets for FIGS. 11A and 11B;

FIGS. 11A and 11B collectively depict a block diagram of Background Tracker 475 which also forms part of Image Processing Circuit 40 shown in FIGS. 2A and 2B;

FIG. 12 depicts the correct alignment of the drawing sheets for FIGS. 12A-12C;

FIGS. 12A-12C collectively depict a block diagram of Document Edge Detection Circuit 481 which also forms part of Image Processing Circuit 40 shown in FIGS. 2A and 2B;

FIG. 13 depicts the correct alignment of the drawing sheets for FIGS. 13A and 13B;

FIGS. 13A-13D collectively depict a block diagram of Windowing Frame Buffer 489 which also forms part of Image Processing Circuit 40 shown in FIGS. 2A and 2B;

DETAILED DESCRIPTION

A. Overall System Description

Figure 1B:
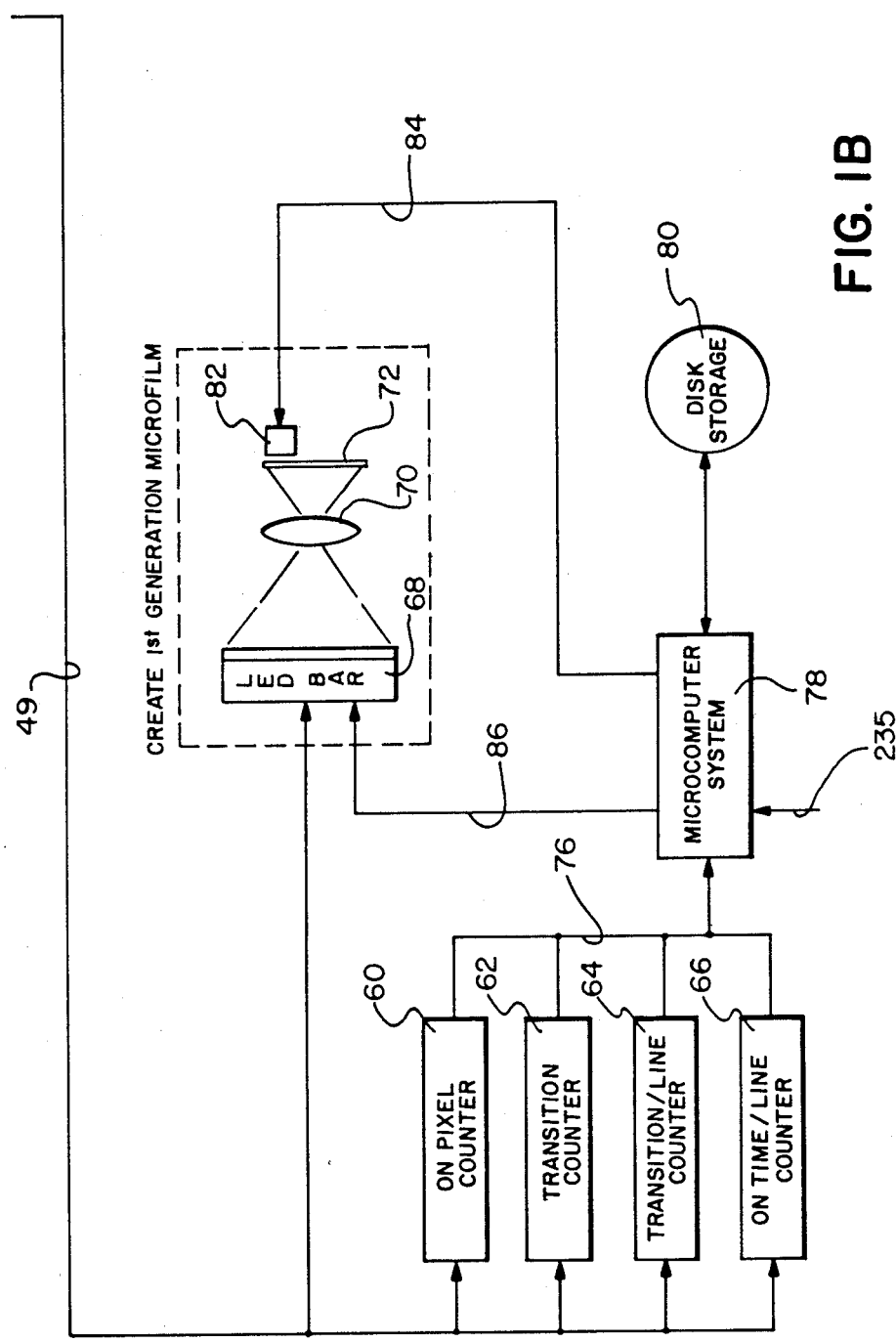

A block diagram of one embodiment of a microfilm scanning and image duplication system is depicted in FIGS. 1A-1C. In essence, the system enhances a scanned multi-bit gray scale microfilm image to substantially remove image noise therefrom and sharpen image edges therein, and then thresholds the enhanced image into single bit binary video for subsequent image compression. The system includes noise removal and edge sharpening, provided by Image Processing Circuit 40 which receives scanned pixel information from the scanned microfilm or document. The output of circuit 40 is routed, via lead 49, to counters 60, 62, 64 and 66 and then for storage in a memory.

Microfilm 10, as shown, generally contains two adjacent stored images, such as images 11 and 17, positioned across its width. Each image is typically 1/40 of the size of its associated original document. A microfilm image, such as image 11, is scanned one line at a time by a microfilm scanner and specifically a by 2048-by-1 cell charge coupled device (CCD) array 22 located therein. The array is positioned in front of the microfilmed image and is perpendicularly oriented to the direction through which the microfilm moves. Lamp 7, situated behind microfilm 10, projects light through the film which, in turn, enters optical system 20. The optical system ensures that light for only one horizontal scanning line, typically that lying between rays 14 and 16 inclusive, reaches CCD array 22. In practice, optical system 20 is set to overscan each horizontal scanning line that constitutes image 11 by approximately 50%. By doing so, the full image will be scanned even if document 13 used to form image 11 was photographed somewhat off center or tilted (as shown in FIG. 1) and/or if the CCD becomes slightly horizontally misaligned with respect to the microfilm. Overscanning is necessary particularly where rotary microfilmers have been used to photograph images onto microfilm 10. These filmers cause a wide variation in the location and orientation of the photographed document, such as document 13, with respect to a standard image area, such as that containing image 11. Specifically, the area scanned by CCD array 22 for image 11 is illustratively defined by dotted line box 12. As a result, each cell of the CCD array provides an analog output which is proportional to the intensity of the light that passes through a portion of scanned area 12 and which is focused onto that cell. Each CCD cell provides cells: one group for the odd pixels and the other group for the even pixels. Under control of appropriate clocking signals applied, via lead 23, to the CCD array, a stream of sequential pixels for both the even and odd channels are simultaneously shifted out of the array on leads 24 and 28 for the even and odd pixels, respectively, for each scanned line in scanned area 12. Each channel of pixel information is then converted by a respective analog-to-digital (A/D) converter. Specifically, A/D converter 26 receives even channel pixel information over lead 24 emanating from CCD array 22 and, under control of appropriate "convert" control pulses appearing on lead 32, provides six-bit digital equivalent pixel values on leads 27. Likewise, A/D converter 29 receives odd channel pixel information over lead 28 emanating from CCD array 22 and, under control of appropriate convert pulses appearing on lead 31, provides six-bit digital equivalent pixel values on leads 30. The convert pulses are provided by pixel addressing circuit 34. This circuit also generates the (x,y) address of the current pixel in the image that is being scanned. This address consists of vertical (y) pixel address, YCNT (y count), appearing on leads 35 and horizontal (x) pixel address, XCNT (x count), appearing on leads 36. System clock pulses are provided by clock circuit 38 and appear on lead Image processing circuit 40 performs image enhancement, noise removal and document edge detection.

Specifically, within circuit 40, incoming digitized pixel values are routed via leads 27 and 30 to pre-scan processing circuit 42. This circuit first corrects the scanned image for what corresponds to the number of transitions that occur per line scanned. Lastly, counting circuit 66 produces the "TIME PER LINE" scan.

The signal on lead 49 also passes to the LED print bar 68 which is part of the film writing mechanism comprising LED bar 68, lens system 70 and unexposed film 72 which is being exposed with a new image (not shown).

Microcomputer system 78 receives the data accumulated in one or more of the counters 60 through 66 via bus 76, which may either be stored on disk 80 or magnetically written on the film 72 by a writing head 82 that receives the processed data from microcomputer 78 via lead 84. Alternatively, digital data may be exposed on the film during the exposure process by LED bar 70 through lead 86. The data is stored characterizing key parameters such as those collected by counters 60 through 66, which characterize the one bit per pixel video signal.

USING THE DIGITAL INFORMATION STORED ON FILM

The determining factor in selecting which key parameters to use is based on the number of generations required to be made of the film. A small number of duplicate generations would only require the parameters of total number of "TRANSITIONS" and total number of "ON PIXELS". Greater number of generations would require additional data such as identifying the total number of transitions and total number of counts in subregions across the image so that the threshold may be adapted to different regions of the image. Additional data may also be obtained by measuring the distribution of transition length to form a histogram across the image and recording the histogram data. This distribution of transition lengths is then compared to the distribution of transition lengths extracted when the duplicate film is scanned and the filtering functions of the image enhancement process would be adjusted to produce transition data with an equivalent histogram.

A higher level technique involves identifying the size characteristics of the elements of the image such as the characters and insuring that small characters such as periods are specifically identified so that if dirt should appear in subsequent generations, it is erased based on the information relating to the location and presence of any periods or decimal points (which are most likely confused with dirt, scratches or pinholes in the film).

Another technique is to perform optical character recognition (OCR) on the original microfilm image and digitally store the text information on the microfilm along with the image. This procedure provides a method for reinserting and reforming each character at its given location in order to preserve the image of the original onto subsequent generations of copies.

SECOND AND THIRD GENERATION OF FILM

It will be appreciated that referring to FIG. 1A, the microfilm 10 is an original microfilm that is, the first exposure or the original of the microfilm to be duplicated.

It should be noted that in FIG. 1B, the microfilm 72 is the first generation microfilm and the first film on which information has been written in support of it.

The first generation of microfilm will be read as shown in FIG. 1C. The scanning setup in FIG. 1C is almost identical to that shown in FIG. 1A. The film 250 is illuminated by lamp 252 the intensity of which is controlled by lamp driver 254. This film 250 is the first generation or the first film on which digital data has been written to characterize the image; this data was either recorded magnetically through magnetic head 82 (FIG. 1B), optically as part of LED box 68 (FIG. 1B) or merely stored on a magnetic disk in disk storage 80 (FIG. 1B).

The film 250 is illuminated by lamp 252 and is imaged through lens 256 to the CCD 258 which is scanned in direction 260 to produce a video signal on line 262 which is processed in the image processing circuit 264. The image processing function is controlled by microcomputer 266 through line 268. The image processing circuit 264 is controlled by microcomputer 266 through line 268 and is used to adjust or modify the image processing as a result of indexing data fed to microcomputer 266 through either line 270 from disk storage 80 or from the image processing circuit 264 through line 272 to the microcomputer 266 or the processed video by image processor 264, which reads the digital data encoded on the film 250. After the data is entered into the microcomputer 266 and this data is processed interactively to insure that the threshold values used by image processing circuit 264 are correct so as to reproduce the second generation or later film image on film 278 using LED bar 276 via line 291, in the same manner that data was handled for the first generation image. The interactive adjustment of the threshold may be either line segment by line segment, line by line or frame by frame, depending on the manner in which the data was originally produced. In the frame by frame case, a second or third scan may be required before the output data converges on the original data. In the line by line or line segment by line segment case, an interactive process occurs simultaneously with the scan to adjust the threshold.

The second and subsequent generations of microfilm will use the data generation in FIG. 1B to produce additional film generations using the circuit shown in FIG. 1C.

The data from the image processing circuit 264 appearing on line 274 and the data from microcomputer 78 in FIG. 1B are used to generate the second generation of microfilm using LED BAR 276 which writes the image on the film 278 through line 280.

In the event the reproduction information is in magnetic form, it is read from the film by magnetic read head 282 and sent to magnetic data processing circuit 284 via line 286 and then sent via line 288 to microcomputer 266. This digital data is then passed through line 289 to the writing control processor 290. There, the digital data recovered from the second generation film, whether digitally, optically, or magnetically stored on the film is analyzed and sent to the writing control processor 290 to be written on the film in optical form or magnetic form or as a third alternative, may be stored in magnetic disk storage 80.

Figure 2B:
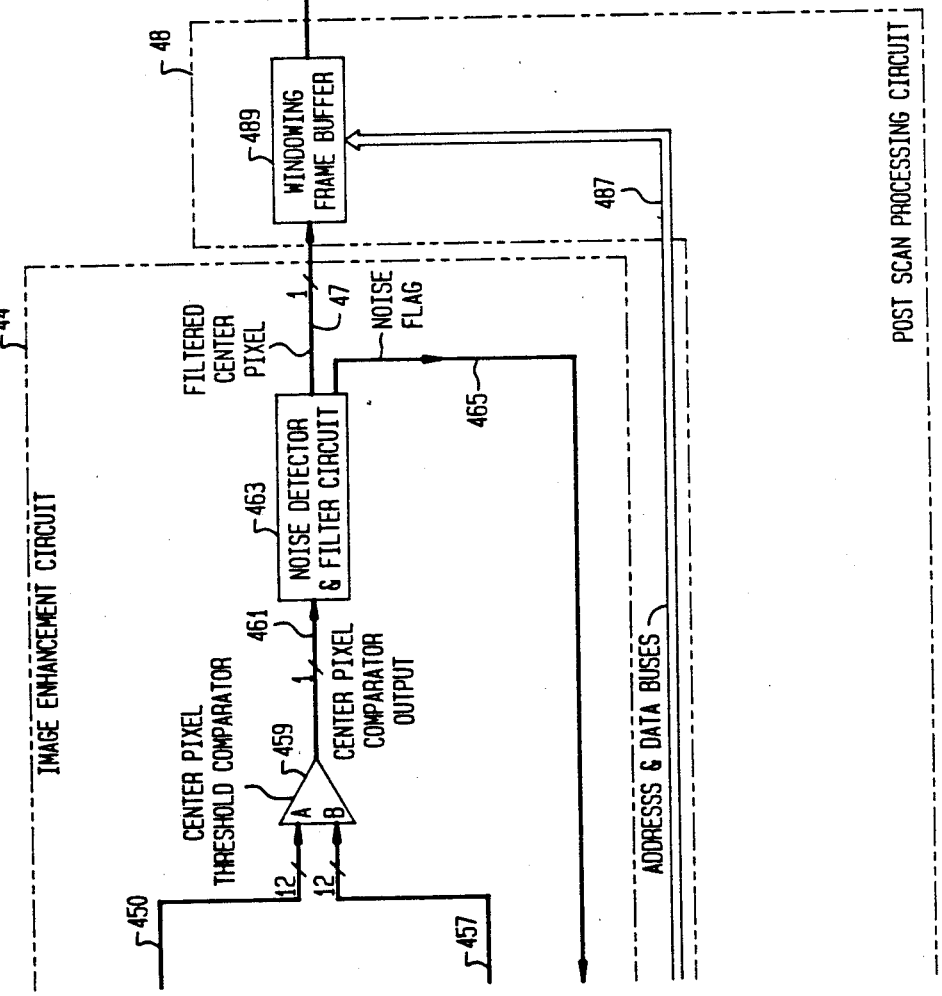

A block diagram of image processing circuit 40 is shown in FIG. 1A and appears in detail in FIGS. 2A and 2B, for which the correct alignment of the drawing sheets for these figures is shown in FIG. 1. As discussed, image processing circuit 40 consists of pre-scan processing circuit 42, image enhancement circuit 44 and post-scan processing circuit 48. Inasmuch as pre-scan processing circuit 42 and image enhancement circuit 44 both provide image processing through specialized hardware, and post-scan processing circuit 48 utilizes both specialized hardware and software, a detailed discussion of the hardware utilized in all three circuits will now be presented followed by a discussion of the software utilized in post-scan processing circuit 48 and specifically by microcomputer system 485.

B. Image Processing Hardware

Now, as shown, within image processing circuit 40, incoming six-bit even and odd pixel values are applied over leads 27 and 30, respectively, to pre-scan processing circuit 42. Within circuit 42, these incoming pixels are routed to multiplexer 422. Under control of various clock and control signals, multiplexer 422 successively routes incoming pixels on an alternating basis from even channel leads 27 and odd channel leads 30 to leads 424. The control signals for multiplexer 422, as well as for the remaining circuitry that forms image processing circuit 40, are generated by control circuitry 493 in response to system clock signals appearing over lead 35. Circuitry 493 produces various control and clock signals over leads 495 and 497, respectively. To simplify the drawing, only those control and clock signals that are needed to understand the following description have been specifically shown in the figures. Additional clock and control signals will be needed to implement the circuit, with the specific signals used being governed by the specific implementation. However, these signals and their interconnection to the circuitry would be readily apparent to those skilled in the art from the following description and for that reason have been omitted from the drawing.

The pixels appearing over leads 424 and produced by multiplexer 422 are applied to shading correction circuit 426. This circuit, described in detail in conjunction with FIG. 3, corrects the value of each incoming pixel by adding a predetermined offset correction factor to each pixel and then multiplying the result by a pre-determined gain correction factor. The offset and gain factors vary across the scanned line and correct for optical shading and uneven CCD pixel performance that appear in the output of the CCD array. The values of the correction factors are determined during a calibration process which will be discussed in detail below in conjunction with FIG. 15, wherein offset factors are obtained using a test scan with lamp 7 (see FIG. 1) off while gain factors are obtained during a test scan with the lamp on. The shading corrected pixel values are routed over leads 428 to gamma correction circuit 432. This circuit, discussed in detail in conjunction with FIG. 4, compensates each incoming six-bit pixel value for differences in transfer characteristics occurring among different types of microfilm that can be used in an image retrieval system. The different film types illustratively include silver positive, silver negative, diazo and vessicular. These characteristics generally include intensity rolloff distance, film rise distance, and the like. Consequently, gamma correction can be advantageously used to tailor the response curve (illumination vs. intensity) of any one of several pre-defined film types to a single curve best suited as input to image enhancement circuit 44. Moreover, gamma correction can be used to invert incoming pixel values and thereby convert from a positive to a negative image. Inasmuch as the noise removal algorithms utilized in image enhancement circuit 44 are designed to function with negative images, gamma correction can be used to provide optimum results with negative images by providing a positive to negative image conversion prior to noise filtering.

Random access (RAM) memories located within shading correction circuit 426 and gamma correction circuit 432 store tables of appropriate correction factors. These memories are loaded through address and data busses 487 during the calibration process by microcomputer system 485, situated within post-scan processing circuit 48. The specific manner in which the RAMs are loaded will be discussed in detail in conjunction with shading correction circuit 426 shown in FIG. 3. In addition, RAM memories, which are used to store pre-defined data tables, are also situated within background tracker 475, noise tracker 467, center pixel look-up circuit 455 and noise detector and filter circuit 463 all located within image enhancement circuit 44. All these RAMs are also appropriately loaded with data during the calibration process, via address and data busses 487, by microcomputer system 485.

The corrected pixels produced by gamma correction circuit 432 are routed over leads 43 to image enhancement circuit 44. This circuit, as discussed, filters single pixel noise from the scanned image and appropriately thresholds each six-bit pixel value into a single bit bi-tonal value for subsequent storage within a frame store memory.

In essence, image enhancement circuit 44 enhances the scanned images and reduces the noise content of each pixel (thereby increasing its signal-to-noise ratio) contained therein. First, image enhancement circuit 44 enhances image edges by convolving a 5-by-5 window of scanned pixel values, with the current scanned pixel value located at the center of the window, with a 5-by-5 array of pre-defined coefficients to emphasize the high frequency content in the image. The value of the pixel produced by the convolution, specifically a convolved pixel produced on leads 450 by convolution circuit 445, forms one input to a thresholding circuit, specifically center pixel threshold comparator 459. It is this comparator which converts each multi-bit (convolved) pixel value into a corresponding single bit binary value (the center pixel comparator output). Specifically, a multi-bit convolved pixel, which appears on leads 450, is compared against a multi-bit binary value that appears on leads 457.

Advantageously, both the noise and background levels are determined for each pixel rather than for each scan line as is commonly done in the art. In this manner, the values for background and noise content, and hence the multi-bit threshold level appearing on leads 457, respond much more rapidly to local variations than in filtering systems known in the art and thereby permit more accurate thresholding than that which has been heretofore utilized in the art.

Specifically, the other input to comparator 459, which appears on leads 457 and varies with the noise and background level, is a pre-defined value provided by center pixel look-up circuit 455. This circuit stores pre-defined pixel values which are used in thresholding the value of each pixel which forms the center pixel in a 3-by-3 window utilized by noise detector and filter circuit 463. The particular value produced by circuit 455 is governed by three factors: the background intensity level of a region centered about the current scanned pixel, the noise content of a 3-by-3 window centered about the current center pixel and a deaveraged value of current scanned pixel. The background level and noise content are determined by two adaptive filters. One such filter, background tracker 475 which is discussed in detail below in conjunction with FIG. 11, adaptively tracks the background level of the scanned pixels and produces a six-bit value on leads 474 representative of the background level. In essence, the background level is determined through a pre-defined function of the value of the current pixel, the value of the background level for the immediately prior scanned pixel and the value of the scanned pixel situated in the previous scan line and directly above the current scanned pixel.

The other adaptive filter, consists of noise tracker 467 and noise detector and filter circuit 463. Noise detector and filter circuit 463 determines whether any one of several pre-defined noise patterns exist in the thresholded image produced by comparator 459. Specifically, circuit 463 forms a 3-by-3 window of thresholded pixels centered about the current thresholded pixel produced by comparator 459. The pixel pattern in this window is then compared to a previously stored noise pattern which is pre-defined to be pixel noise. Should a match occur between the pattern in the window and the pre-stored pattern, then a signal in the form of a "Noise flag" is provided over lead 465 to noise tracker 467. This signal causes the noise tracker to increment its output value which, in the absence of subsequent noise, decays on a two-dimensional exponential basis. Inasmuch as the noise flag and the noise tracker form a feedback path in a closed loop servo-control system containing noise tracker 467, summer 473, center pixel look-up circuit 455, comparator 459 and noise detector and filter circuit 463, any detected noise will change the values applied as input to the center pixel look-up table circuit in order to produce an appropriate center pixel value that does not contain noise. In addition, noise detector and filter circuit 463 filters noise from the center pixel (changes its value) in the 3-by-3 window and provides the filtered center pixel value on lead 47. These filtered pixel values are serially applied to and stored within windowing frame buffer 489 located within post-scan processing circuit 48.

Now, with that overview in mind, the discussion will shift to a specific description of image enhancement circuit 44. Specifically, incoming pixel values that have been corrected by pre-scan processing circuit 42 and appear on leads 43 are first applied as input to odd/even pixel averager 441. The averager computes the average value for any two adjacent pixels by merely summing two adjacent pixels and then shifting the result one place to the right to effect a division by two. The resulting averaged value is applied over leads 443 as input to 5-by-5 convolution circuit 445. Advantageously, the averager smooths out any differences (such as offsets between the odd and even channels) appearing in the response of the CCD array to identical adjacent image portions thereby advantageously removing odd/even correlated noise from the corrected pixels. In addition, averaging expands the convolved sampling area with little increase in cost. In particular, pixel averaging followed by 5-by-5 convolution effectively expands the sampled pixel area used in convolution to a 6-by-5 window.

Figure 6:
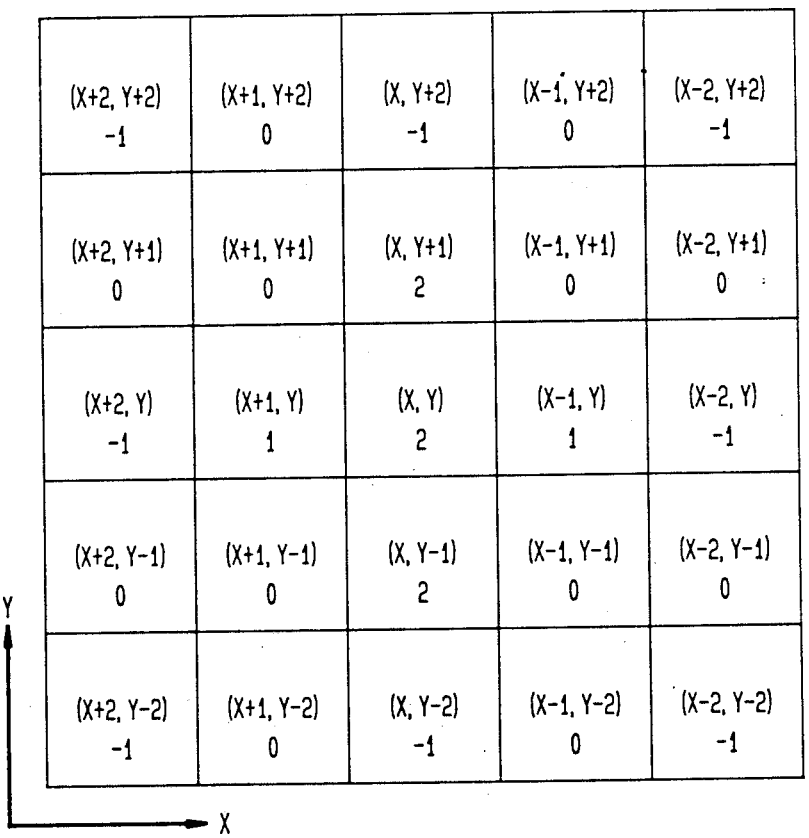
FIG. 6 depicts a diagram of the pixels that constitute 5-by-5 window 46 and their corresponding convolution coefficients as used by 5-by-5 Convolution Circuit 445 shown in FIG. 5.

Convolution circuit 445 convolves a 5-by-5 moving window of pixel values centered about the current averaged pixel value appearing on lead 443 to yield a convolved multi-bit pixel value on lead 450. Convolution is used to sharpen the edges of pixel patterns having widths of two pixels or greater which appear in a scanned microfilm image. Specifically, a certain amount of image resolution is lost whenever an image on paper is reduced in size and photographed onto microfilm. This loss becomes evident when the microfilm image is later expanded: a certain amount of fine detail is lost and previously sharp image edges appear somewhat blurred. Convolution substantially compensates the scanned microfilm image for the loss in resolution. The amplitude of the pixel situated at the beginning of the edge will be substantially increased while that of all surrounding pixels will be decreased although by an amount less than the increase. As a result, the amplitude of the former pixel will reach a peak at a positive value that is substantially higher than the original intensity level, thereby producing a "spike" in the convolution output, while the values of the latter pixels will become somewhat negative thereby creating a "moat" around the peaked value. In this manner, the signal-to-noise ratio of the image is substantially enhanced. The size of the window is set to 5-by-5 in order to achieve a good compromise between hardware cost and complexity and resulting image quality. Generally, as the size of the window increases, image quality will correspondingly increase as the convolution operation is able to detect pixel changes occurring in additional directions. Unfortunately, the cost and complexity of implementing the convolution circuit also increases as the window size increases. Specifically, use of a 2-by-1 or 1-by-2 pixel window only sharpens horizontal and vertical pixel patterns and is generally unacceptable for text. Use of a 3-by-3 window sharpens pixel patterns that occur not only horizontally and vertically but also diagonally through the center pixel in the window. Use of a 5-by-5 pixel window sharpens additional diagonally oriented pixel patterns. For textual images, a 5-by-5 window provides an acceptably high degree of image enhancement. Consequently, this size is used, in view of the additional cost and complexity of the necessary hardware associated with implementing larger windows. Clearly, as the size of memory circuits and shift registers increase and their cost decreases, larger windows can be implemented and used. The coefficients used in convolution circuit 445, as discussed in detail later in conjunction with FIG. 6, are pre-defined binary values. To produce a zero output in response to a constant input the values of the coefficients are constrained to sum to zero. As noted, the multi-bit output of convolution circuit 445 is routed, over leads 450, as one input to center pixel threshold comparator 459.

Convolution circuit 445 also provides the value, over leads 447, of the center pixel that forms the 5-by-5 window. Inasmuch as center pixel look-up circuit 455 imparts a delay of one-pixel interval to its output, a shift register used in implementing convolution circuit 445 is tapped at the (X+1, Y) position which corresponds to the pixel situated immediately to the left of the center pixel. As a result of the one-pixel delay, the convolved pixel appearing on leads 450 and the output of center pixel look-up circuit 455 appearing on leads 457 are always synchronized together to the same pixel.

Center pixel look-up circuit 455 provides a value in response to two specific inputs: the value of the current pixel and the value of the combined background and noise levels present in this pixel. Pixel deaverager 451, discussed in detail below in conjunction with FIG. 7, reconstructs the original values of the shading corrected pixels (applied over lines 43) by inverting the averaging process. Once the pixel deaverager is supplied with the first pixel value for any scan line, it is then able to determine the original pixel values for all the remaining pixels in that line given the averaged data for each pixel appearing in that scan line. The deaveraged pixels appear on leads 453 as one input to center pixel look-up circuit 455.

In response to the current and previous pixel values appearing on leads 447, background tracker 475 provides a multi-bit value representative of the background level in the current pixel on leads 474 as one input to summer 473. This background level can be viewed as a level at which a white pixel changes to black (for negative film) as a function of the pixel intensities in a neighboring region. This level dynamically varies, as will be discussed in detail below. The other input to summer 473, appearing on leads 470, is produced by noise tracker 467. This latter input represents the noise level in the current pixel. Whenever a noise pixel is detected, the noise tracker generates a pre-set factor on leads 470 which, by virtue of summer 473, increases the value on leads 471, thereby causing look-up circuit 455 to generate a value having a higher threshold value for use by comparator 459. Noise tracker 467 generates a decaying exponential output in both the X and Y image directions. This output continues to decay every pixel until it either reaches zero or noise is detected again. Each time a single pixel of image noise is detected by noise detector and filter circuit 463, this circuit momentarily causes a pulse to appear on "Noise flag" lead 465. Each such pulse causes the noise tracker 467 to increment its output upward by a pre-defined amount.

Post-scan processing circuit 48 contains document edge detection circuit 481, microcomputer system 485 and windowing frame buffer 489. In essence, the function of post scan processing circuit 48 is to detect the edges of escribing rectangle 11 containing the scanned document (document 13 shown in FIG. 1) located within the overscanned image area (scanned image 12 in FIG. 1) and supply the thresholded pixels situated on and within escribing rectangle 11 from windowing frame buffer 489 to compressor 50, via leads 49. Document edge detection circuit 481, in response to the current pixel values and corresponding background levels appearing over respective leads 447 and 474 and as discussed in detail below in conjunction with FIGS. 12A–12C, detects edges in each scan line in the scanned image. For each such edge, the circuit supplies its associated pixel location (XCNT value) to microcomputer system 485 via address and data busses 487. The microcomputer system then determines which ones of these edges for any given scan line are the leading and trailing edges of scanned document 13 for the scan line. Specifically, once all the edges for any given scan line have been detected by document edge detection circuit 481, this circuit applies a pulse, via lead 486, to interrupt microcomputer system 485. In response to this interrupt, the microcomputer system, as discussed in detail below in conjunction with document edge detection routine 2100 shown in FIGS. 21A–21C, locates the pair of edges having the widest difference therebetween. Once this pair is located, the edge situated at the lower valued pixel location is designated as the actual leading edge of the document and the edge situated at the higher valued pixel location is designated as the actual trailing edge of the document. This process is repeated, on an interrupt basis, for each scan line in the entire scanned area. At the same time, a histogram is generated by the microcomputer of the leading and trailing edge locations for the document. Now, once all the scan lines have been processed, the microcomputer determines from the histogram the first pixel location moving from the leftmost pixel location to the right at which 10% of the leading edges have occurred. This pixel location is designated as the leading (left) edge of the escribing rectangle (rectangle 11 shown in FIG. 1) situatated within the entire scanned area and which contains the scanned document. The microcomputer then performs a similar analysis to locate the right edge of the escribing rectangle. Specifically, the microcomputer ascertains the first pixel location moving from the rightmost pixel location to the left at which 10% of the trailing edges have occurred. This pixel location is designated as the trailing (right) edge of the escribing rectangle. Also, from these pixel locations and in a manner to be discussed in detail below, the microcomputer also ascertains the vertical pixel locations in the scanned area at which the top and bottom edges of the escribing rectangle occur and determines the corresponding memory addresses. Now, given the pixel locations for the top, bottom, left and right edges of the escribing rectangle, the microcomputer system generates the memory address corresponding to the starting pixel (upper left corner in the rectangle) and the horizontal and vertical size of the rectangle. The microcomputer system then supplies the starting address and the vertical and horizontal size information (number of pixels horizontally and number of scan lines vertically) to the windowing frame buffer 489 (see FIGS. 13A–13B which will be discussed in detail shortly) via address and data busses 487. The windowing frame buffer then reads the pixel values stored on and within the edges of the escribing rectangle and serially supplies these pixels, via lead 49, to compressor 50.

Now, having described the entire system, the remaining discussion will turn to a specific description of each of the circuits shown in FIGS. 2A and 2B followed by a discussion of the software executed by microcomputer system 485.

A block diagram of shading correction circuit 426, which forms part of image processing circuit 40 shown in FIGS. 2A and 2B, is depicted in FIG. 3. AS discussed above, the shading correction circuit corrects the value of each incoming pixel appearing on leads 424 for differences in illumination appearing across a scan line as well as differences in response between individual cells of the CCD array. This correction is accomplished by adding a pre-determined offset correction factor to the value of each incoming pixel and then multiplying the result by a pre-determined gain correction factor. The offset and gain factors vary across the scanned line and correct for optical shading and pixel performance differences that appear in the output of the CCD array.

Specifically, within shading correction circuit 426, an incoming multi-bit pixel value appearing on leads 424 is routed to one input of adder 4262. The other input to this adder is the offset correction value associated with this pixel and supplied from offset correct look-up table 4274. This table is illustratively a RAM memory that has been loaded with appropriate offset correction factors during system calibration. To generate the values stored within this table, a test scan was performed with lamp 7 (see FIG. 1) off. To obtain the appropriate offset correction factor, the horizontal pixel address, XCNT, is applied over leads 36 as the address to table 4274. Thus, for any incoming pixel appearing on leads 424, the corresponding offset factor for that pixel on any scan line is produced by table 4274. Adder 4262 additively combines the incoming pixel value and the offset correction value and applies the resulting sum to overflow/underflow adjust circuit 4264. This circuit is implemented using programmable array logic (PAL). The PAL has been pre-programmed to suitably change the value of the sum in the event the sum has overflowed or underflowed an allowable 10-bit range and thereby bring the value of sum within its allowable range. The adjusted sum is then applied as one input of (hardware) multiplier 4266. The other input to the multiplier is the gain correction value associated with the incoming pixel and supplied from gain correct look-up table 4270. This table is illustratively a RAM memory that has been loaded with appropriate gain correction factors during system calibration. To generate the values stored within this table, a test scan was performed with lamp 7 (see FIG. 1) on and without any microfilm present in the microfilm reader to impede light. To obtain the appropriate gain correction factor for the incoming pixel, the horizontal pixel address, XCNT, is routed, via leads 36, as the address to table 4270. Thus, for any incoming pixel appearing on leads 424, the corresponding gain factor for that pixel on any scan line is produced by table 4270. Multiplier 4266 multiplies the sum by the gain correct factor and applies the resulting product as the shading corrected pixel, via leads 428, to gamma correction circuit 432.

As noted, the values of the offset and gain correction factors stored within offset and gain correct tables 4274 and 4270 are determined and then stored within the associated RAM memories during system calibration. Specifically, once an appropriate test scan, such as lamp off, has been completed as part of system calibration, and microcomputer system 485, located within post-scan processing circuit 48 (see FIGS. 2A and 2B), has determined the appropriate values of the offset correction factors for each pixel in any scan line, these values are then loaded into table 4274. First, to write values into this table, the horizontal pixel address, XCNT, is set to point to the first pixel in the table. Thereafter or simultaneously therewith, the microcomputer system applies the appropriate offset correction value for that first pixel to data bus 4875. Then, the microcomputer system applies an appropriate pulse to an "Offset Select" control signal which, in turn, is applied to the "Load" input of latch 4276. This pulse causes the latch to store the value appearing on the data bus and apply that value, via its data output pins and leads 4277, to the data in/out terminals of table 4274. Subsequently, microcomputer system 485 applies a suitable high level "Offset Write" control signal to a "Write Enable" (WE) input to table 4274, shown in FIG. 3. This level, in turn, causes the RAM memory that implements this table to write the value appearing on data bus 4875 (which forms part of address and data busses 487 shown in FIGS. 2A and 2B) into a memory location specified by the XCNT value. Once this write operation has occurred, then the XCNT value is incremented and the process repeats. This process interactively occurs until all the remaining offset correction factors have been stored in this table. The gain correction look-up table, shown in FIG. 3, is loaded in a substantially identical fashion through latch 4272 and data bus 4875.

Figure 4:
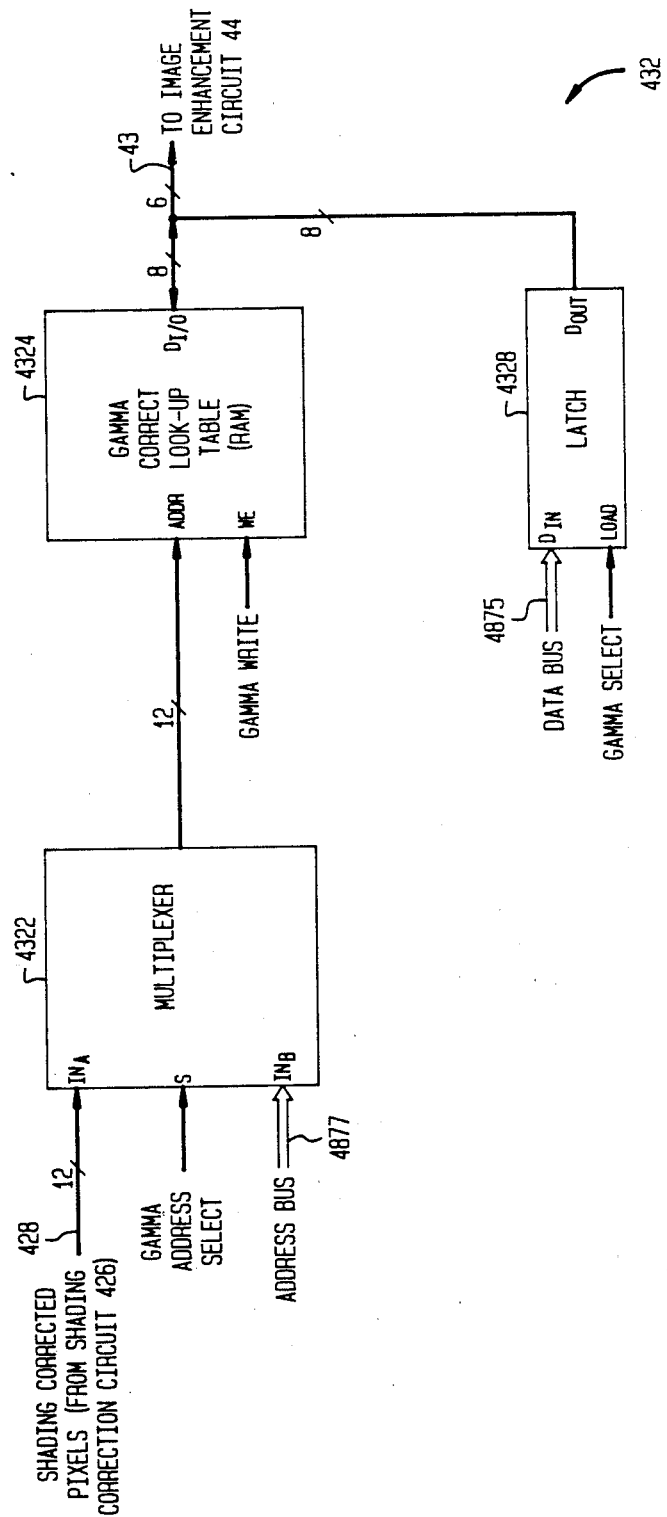
FIG. 4 depicts a block diagram of Gamma Correction Circuit 432 which also forms part of Image Processing Circuit 40 shown in FIGS. 2A and 2B.

A block diagram of gamma correction circuit 432, which also forms part of image processing circuit 40 shown in FIGS. 2A and 2B, is depicted in FIG. 4. As noted, this circuit compensates each shading corrected six-bit pixel value for differences in transfer characteristics occurring among different types of microfilm, illustratively silver positive, silver negative, diazo and vessicular, that can be used a microfilm based system. These characteristics generally include intensity rolloff distance, film rise distance, and the like. As such, gamma correction advantageously tailors the response curve (illumination vs. intensity) of any one of several pre-defined film types to a single curve best suited as input to image enhancement circuit 44. Moreover, gamma correction can also be used to invert incoming pixel values and thereby convert from a positive to a negative image.

Incoming multi-bit shading corrected pixel values are routed by leads 428 to one data input, INA, of 12-bit multiplexer 4322. This multiplexer routes either these pixel values or an address appearing on address bus 4877, which is applied to its second data input, INB, to gamma correct look-up table 4324. Whenever gamma correction is to be performed, the level of a "Gamma Address Select" control signal applied to a select, S, input of the multiplexer is appropriately set to cause the multiplexer to route the incoming pixel values therethrough as input addresses to table 4324. This control signal is set to the opposite level whenever data is to be written into the table. During gamma correction, the value of each incoming pixel is used as an address to table 4324 to access the corresponding gamma corrected pixel value from the table. Once this value is accessed, the most significant six bits are applied, over leads 43, to image enhancement circuit 44.

Gamma correction factors are constants that are loaded into gamma correction look-up table 4324 prior to scanning. These factors often vary as different types of microfilms are fetched and scanned from a film library. Specifically, after the film library loads a roll of microfilm in the microfilm reader but prior to its being scanned, gamma correction look-up table 4324 is loaded with appropriate gamma correction factors corresponding to the specific type of the film that is to be scanned. The gamma correction factors for each different film type take the form of a table of constants. All these constant tables have been previously stored within microcomputer system 485 (see FIGS. 2A and 2B). Once the microcomputer system determines the specific film type, from various indicia located on the film container, it accesses the appropriate table and writes the contents of that table into the RAM memory that implements table 4324. To do so, the microcomputer system first sets the "Gamma Address Select" control signal, as shown in FIG. 4, to an appropriate level to cause multiplexer 4322 to route the address appearing on address bus 4877 (which forms part of address and data bus 487 shown in FIGS. 2A and 2B) to the address inputs of gamma correct look-up table 4324. At substantially the same time, the microcomputer system accesses the appropriate gamma correction constant table and applies the particular gamma correction factor for the address specified on add appearing on data bus 4875 and applies it, via leads 43, to the data in/out terminals of table 4324. Subsequently, microcomputer system 485 applies a suitable high level "Gamma Write" control signal to the "Write Enable" (WE) input to table 4274 shown in FIG. 3. This level, in turn, causes the RAM memory that implements this table to write the value appearing on data bus 4875 into a memory location specified by the address appearing on address bus 4877. Once this write operation has occurred, then the address is incremented, new data is applied to the data bus and the process repeats. This process iteratively occurs until all the remaining gamma correction factors for the specific type of microfilm that will be scanned have been stored in this table.

Figure 5B:
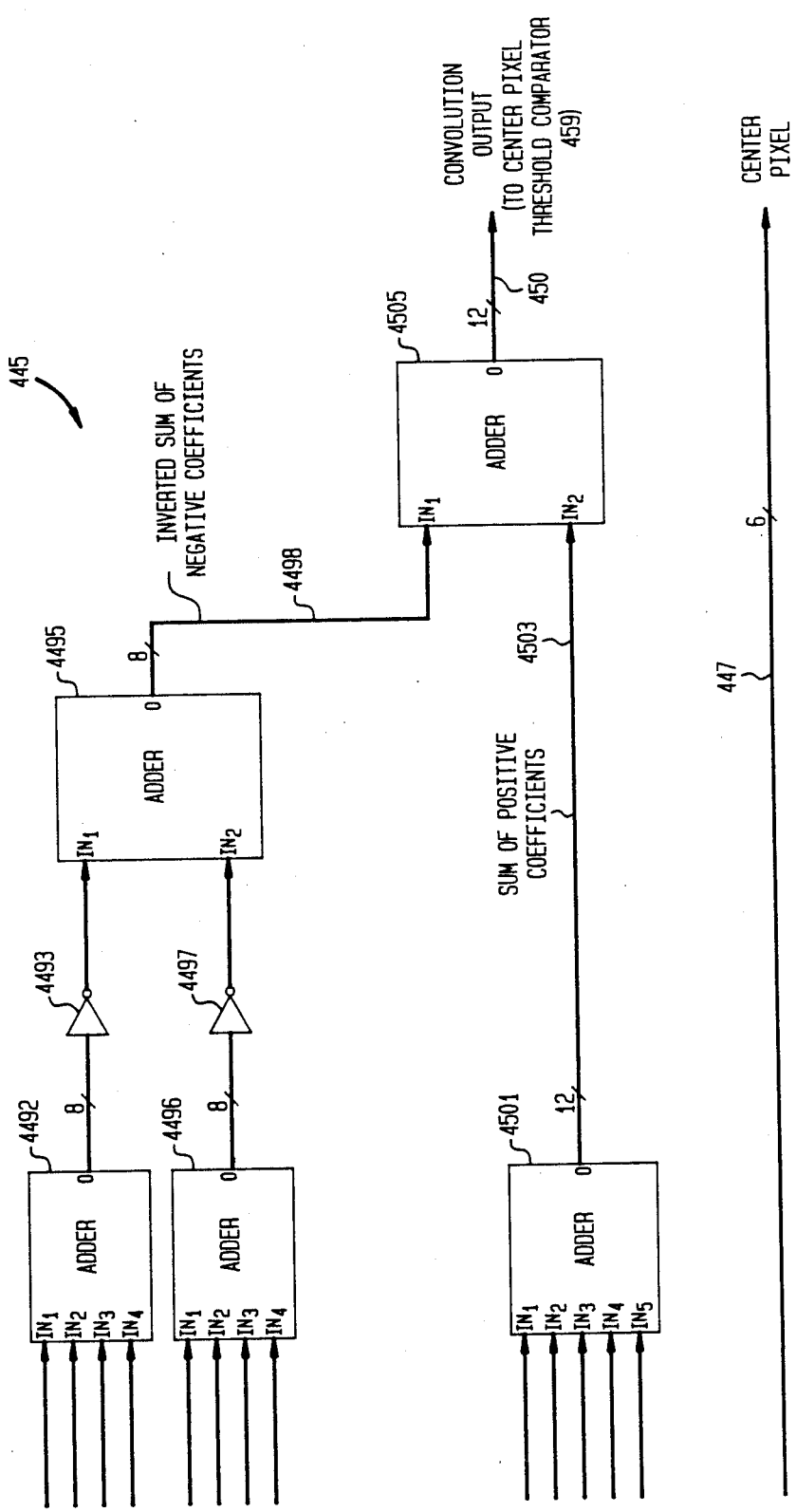

A block diagram of 5-by-5 Convolution Circuit 445, which also forms part of image processing circuit 40 shown in FIGS. 2A and 2B, is depicted in FIGS. 5A and 5B, for which the correct alignment of the drawing sheets for these latter figures is shown in FIG. 5. Now, in connection with the following discussion, reference should also be made to FIG. 6 which shows the specific pixels that constitute 5-by-5 window 46 used by convolution circuit 445 and the corresponding convolution coefficient for each pixel in this window.

The convolution circuit essentially contains a delay line which stores five scan lines and simultaneously provides the values of the pixels that form a moving 5-by-5 window. Each value is multiplied by its corresponding convolution coefficient and then summed together. Since the coefficients have the value 0, +1, −1, and 2, each multiplication can be implemented by addition, shifting and/or subtraction. Specifically, as shown in FIGS. 5A and 5B, incoming averaged pixels appearing on leads 443 are sequentially routed through line delays 4457, 4463, 4475 and 4482 to store the first (line $Y+1$), second (line Y), third (line $Y-1$) and fourth (line $Y-2$) most recent scan lines. Simultaneously therewith, incoming pixels are also applied to 5 by 6-bit shift register 4451. This shift register stores five most recent pixels on the current scan line (line $Y+2$). Inasmuch as three of these pixels (first, third and fifth) are used in the convolution, shift register 4451 simultaneously applies the values of pixel $(X+2, Y+2)$ to leads 4452, the value of pixel $(X, Y+2)$ to leads 4453, and the value of pixel $(X-2, Y+2)$ to leads 4454. Each of these values is simultaneously applied to respective inputs of adder 4492. The output of this adder, is complemented by inverter 4493 with the resulting complemented value being applied as one input to adder 4495. This latter adder provides the inverted sum of all the pixel values thereby providing the sum of all the individual pixel values that were to be multiplied by the value −1. The inverted sum appearing on leads 4498 is, in turn, applied as one input to adder 4505 which combines the sum of all the pixel values with negative coefficients with the sum, appearing on leads 4503, of those having positive coefficients. The output of summer 4505, which appears on leads 450, is the result of the convolution.

Now, with respect to the immediately preceding scan line, i.e. scan line $Y+1$, the pixels that form this scan line are produced by line delay 4457 and then are clocked into shift register 4460. Only one of the five pixels, that form the second row of the window and are situated in this scan line, is used in the convolution. This pixel value, pixel $(X, Y+1)$ appears on leads 4461 and carries a convolution coefficient of +2. Consequently, this pixel value is routed, via leads 4461, to one input of adder 4501. This adder provides the sum of all pixels that have positive convolution coefficients. Now, inasmuch as the value of pixel $(X, Y+1)$ is to be doubled, this can be effected by simply shifting the value of the pixel one place. This is readily provided by appropriately wiring the connections between shift register 4460 and the input to adder 4501 with a one position offset, i.e. the least significant bit output on leads 4461 is wired to the least significant bit+1 input lead of input IN1 of adder 4501 and so on. The circled symbol "X2" is used to designate such an offset connection. Similar offset connections occur for pixels $(X, Y)$ and $(X, Y-1)$.

With respect to the middle scan line in the window, i.e. scan line Y, the pixels that form this scan line are produced by line delay 4463 and then are clocked into shift register 4466. All five pixels, that form the center row of the window and are situated in this scan line, are used in the convolution. Two of these pixel values, i.e. first convolution. Two of these pixel values, i.e. first and fifth pixels $(X+2, Y)$ and $X-2, Y)$, appearing on leads 4469 and 4473, each carry a convolution coefficient of −1 and are hence simultaneously routed to respective inputs of adders 4492 and 4496. The output of adder 4496 is complemented by inverter 4497 and thereafter applied as a second input to adder 4495. Of the three remaining pixels in this scan line, the center pixel value $(X, Y)$ carries a convolution coefficient of +2 and is therefore connected in an offset fashion, as discussed immediately above, to one input of adder 4501. The remaining pixel values, i.e. second and fourth pixels $(X+1, Y)$ and $(X-1, Y)$, each carry convolution coefficients of +1 and for that reason are directly connected, via respective leads 4470 and 4472, to corresponding inputs of adder 4501.

Regarding the next scan line, i.e. scan line $Y-1$, the pixels that form this scan line are produced by line delay 4475 and then are clocked into shift register 4478. Only one of the five pixels, that form the fourth row of the window and are situated in this scan line, is used in the convolution. This pixel value, pixel $(X, Y-1)$ appears on leads 4480 and carries a convolution coefficient of +2. Consequently, this pixel value is routed, via leads 4480, and using a one position offset connection to one input of adder 4501.

Lastly, with respect to the last or bottom scan line in the window, i.e. scan line $Y-2$, the pixels that form this scan line are clocked into shift register 4485. Three of these pixel values, i.e. first, third and fifth pixels $(X+2, Y-2)$, $(X, Y-2)$ and $(X-2, Y-2)$, appearing on leads 4486, 4487 and 4488, respectively, each carry a convolution coefficient of −1 and are hence all simultaneously routed to respective inputs of adder 4496.

The convolution circuit also provides the value, over leads 447, of the center pixel that forms the 5-by-5 window. Inasmuch as center pixel look-up circuit 455 (see FIGS. 2A and 2B) imparts a one pixel interval delay to its output, the pixel value that is needed is available at the fourth position, i.e. pixel $(X+1, Y)$ within shift register 4466. This pixel corresponds to the pixel situated immediately to the left of the center pixel in window 46 shown in FIG. 6. As a result of the one pixel delay, the convolved pixel appearing on leads 450 is the actual center pixel in the 5-by-5 window (see FIGS. 2A and 2B). Hence, the convolved pixel and the output of center pixel look-up circuit 455 are always synchronized together to the same pixel.

Figure 7:
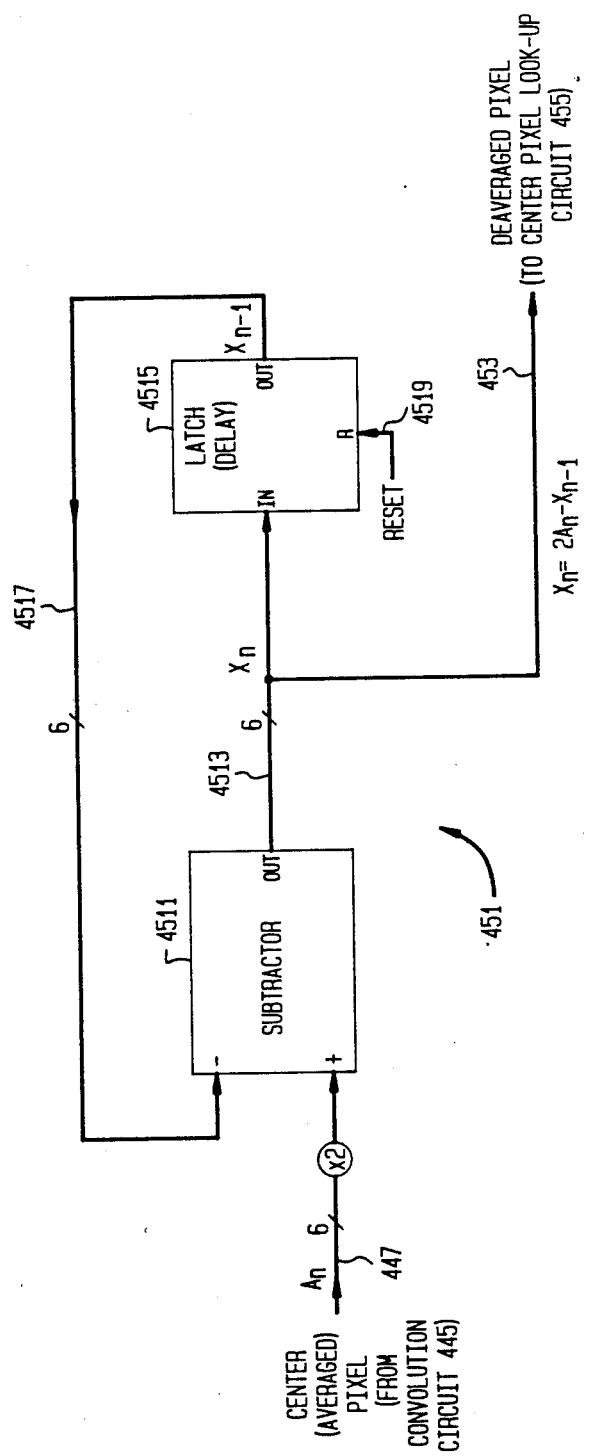
FIG. 7 depicts a block diagram of Pixel Deaverager 451 which also forms part of Image Processing Circuit 40 shown in FIGS. 2A and 2B.

A block diagram of pixel deaverager 451, which forms part of image processing circuit 40 shown in FIGS. 2A and 2B, is depicted in FIG. 7. As discussed above, the pixel deaverager reconstructs the original values of the shading corrected pixels (applied over lines 43 in FIGS. 2A and 2B) by inverting the averaging process. Once the pixel deaverager is supplied with the first pixel value for any scan line, it is then able to determine the original value for each remaining pixel in that line given the averaged data for each pixel appearing in that scan line. The deaveraged pixels appear on leads 453.

In essence, deaverager 451 functions in the following manner. Given pixels, X0, X1, ..., Xn in a current scan line, then subsequent corresponding average values (A1, A2, A3, ..., An) for these pixels are given by:

$$A1 = (X0 + X1)/2 \quad (1)$$

$$A2 = (X1 + X2)/2 \quad (2)$$

and so on until for the last average value:

$$An = (Xn-1 + Xn)/2. \quad (3)$$

Now, if the value of the first pixel in the scan line is known as X0, then solving for the unknown (deaveraged) pixel value, X1, in equation (1) yields:

$$X1 = 2*A1 - X0 \quad (4)$$

This resulting value for pixel X1 can then be inserted into equation (5) to yield the next (deaveraged) pixel value, X2, to be:

$$X2 = 2*A2 - X1. \quad (5)$$

Therefore, once the value of the first pixel in any scan line is known, a value can be calculated for each subsequent pixel using each corresponding averaged pixel value and the prior deaveraged pixel value. In general, deaverager 451 implements the following equation:

$$Xn = 2*An - Xn-1 \quad (6)$$

Hence, to reconstruct a stream of original (deaveraged) pixel values that form a scan line from a stream of averaged pixel values for that scan line, use of this inventive technique merely requires storing the value of first pixel in the line. This, in turn, advantageously eliminates the need to store both averaged and non-averaged (original) pixel values for every pixel in the line as had occurred in the past. As a result, deaverager 451 provides a simpler and hence less expensive approach than those previously known and used in the art.

Specifically, incoming center (averaged) pixels, An, from convolution circuit 445 appearing on leads 447 are routed, via a one position offset connection, to a positive input of subtracter 4511. The offset connection effectively doubles the value appearing on leads 447. The other (negative) input to subtracter 4511 is supplied with the output value generated by latch 4515 and appearing on leads 4517. Latch 4515 provides a one pixel delay.

For any incoming averaged pixel value appearing on leads 447, subtracter 4511 calculates the deaveraged value, Xn, for that pixel by subtracting the value of the immediately preceding pixel, Xn−1, from twice the averaged pixel value. To operate deaverager 451, the contents of latch 4515 are first cleared through a control ("Reset") signal applied, via lead 4519, to a reset ("R") input of the latch. As a result, the prior pixel value, Xn−1, is initially set to zero. The value of the first pixel on a current scan line, which is generally zero or other known amount, is applied to deaverager 451, via leads 447. During the next succeeding pixel clock cycle, the prior pixel value, Xn−1, is essentially clocked through subtracter 4511 and latch 4515. At the same time, i.e. one pixel clock cycle after the first pixel value was applied to leads 447, the current averaged pixel value, An, is applied to these leads. As a result, at the end of this pixel clock cycle, the current deaveraged pixel value, Xn, appears on leads 4513 and becomes the prior pixel value, Xn−1, appearing on lead 4517 for use during the next pixel clock cycle. This process is iteratively repeated to calculate all the remaining deaveraged pixel values for the current scan line.

Figure 8:
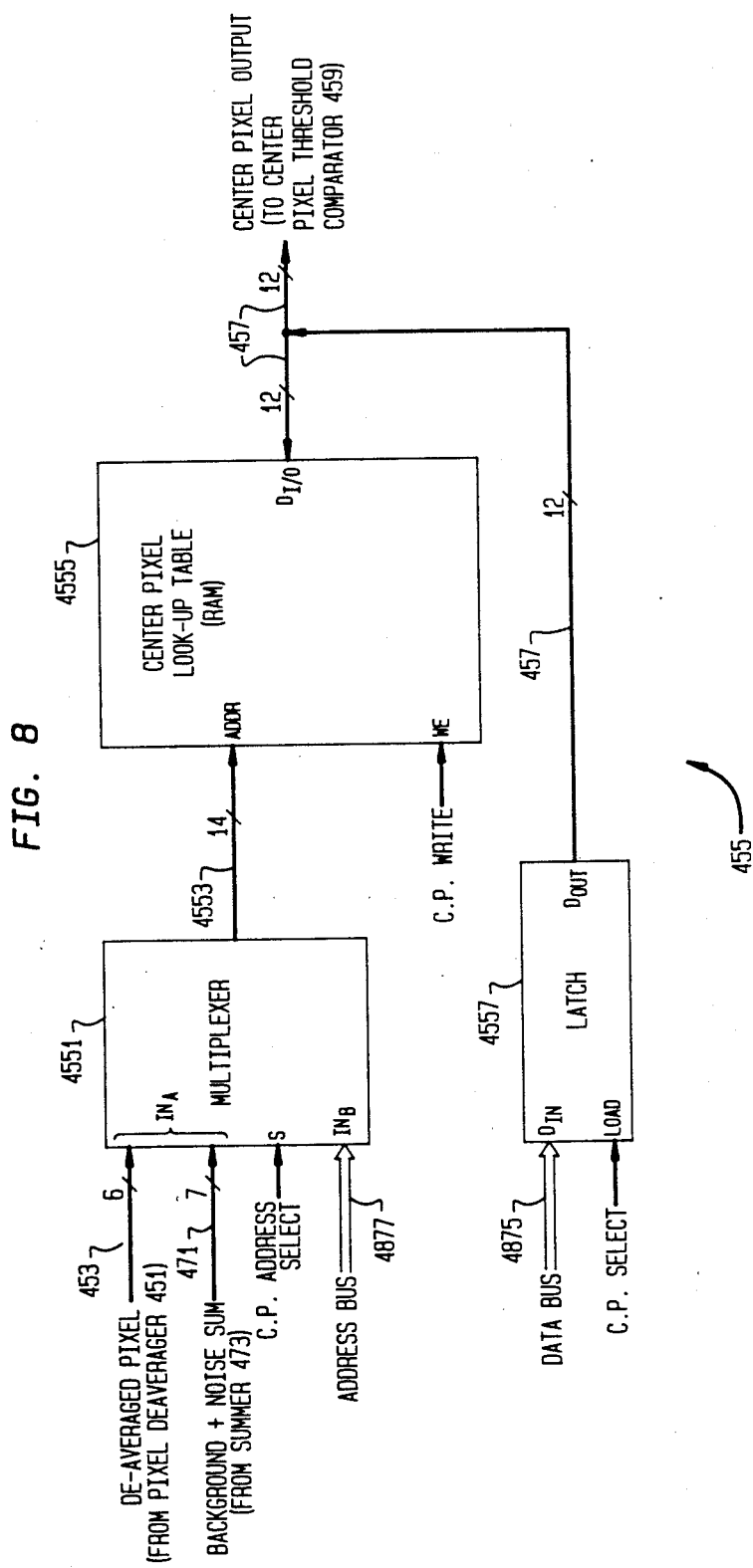
FIG. 8 depicts a block diagram of Center Pixel Lookup Circuit 455 which also forms part of Image Processing Circuit 40 shown in FIGS. 2A and 2B.

A block diagram of center pixel look-up circuit 455, which forms part of image processing circuit 40 shown in FIGS. 2A and 2B, is depicted in FIG. 8. As discussed above, circuit 455 stores pre-defined pixel values which are applied to center pixel threshold comparator 459 for use in thresholding the value of each pixel which forms the center pixel in a 3-by-3 window utilized by noise detector and filter circuit 463. The particular value produced by this table is governed by three factors: the background intensity level of the scanned area in a region near the current scanned pixel, the noise content computed for the current center pixel, and a deaveraged value of the current scanned pixel.

Specifically, three forms of incoming information are applied to the circuit and are collectively used to form an address to a memory. In particular, de-averaged pixel values appear on leads 453 and, for each such pixel value, a corresponding value representing the sum of background level and noise content for that pixel appears on leads 471. The signals appearing on leads 453 and 471 are collectively applied to one input, INA, of multiplexer 4551. The multiplexer is instructed by a "C.P. (Center Pixel) Address Select" signal, which is applied to an appropriate select (S) input of the multiplexer, to route either the signals appearing on leads 435 and 471 or those appearing on address bus 4877, which is applied to input INB of the multiplexer, to the address input of center pixel look-up table 4555, via leads 4553. This address select signal is provided by microcomputer system 485 located within image processing circuit 40 (see FIGS. 2A and 2B). Table 4555, shown in FIG. 8, is illustratively implemented using RAM memory circuits. Once an address is provided to this table and the RAM memories used therein are appropriately clocked (by clock signals not shown), the memories provide the corresponding center pixel output values on leads 457 for use by center pixel thresholding comparator 459. During system initialization, microcomputer system 485 (see FIGS. 2A and 2B) accesses an internal table of stored constants and appropriately copies these constants into center pixel look-up table 4555. To do so, the microcomputer system first sets the "C.P. Address Select" signal, as shown in FIG. 8, to an appropriate level to cause multiplexer 4551 to route the address appearing on address bus 4877 to the address inputs of center pixel look-up table 4555. At substantially the same time, the microcomputer system accesses the appropriate center pixel table and applies the particular pixel value for the address specified on address bus 4877 to data bus 4875 which, in turn, applies this factor to the data input of latch 4557. The microcomputer system then applies a pulse, via the "C.P. Select" control line, to a "Load" control input of the latch. In response to this pulse, latch 4557 latches the value appearing on data bus 4875 and applies it, via leads 457, to the data in/out terminals of table 4555. Subsequently, microcomputer system 485 applies a suitable high level "C.P. Write" control signal to the "Write Enable" (WE) input to table 4555. This level, in turn, causes the RAM memory that implements this table to write the value appearing on data bus 4875 into a memory location specified by the address appearing on address bus 4877. Once this write operation has occurred, then the address is incremented, new data is applied to the data bus and the process repeats. This process iteratively occurs until all the remaining center pixel values have been written into table 4555.

Figure 9:
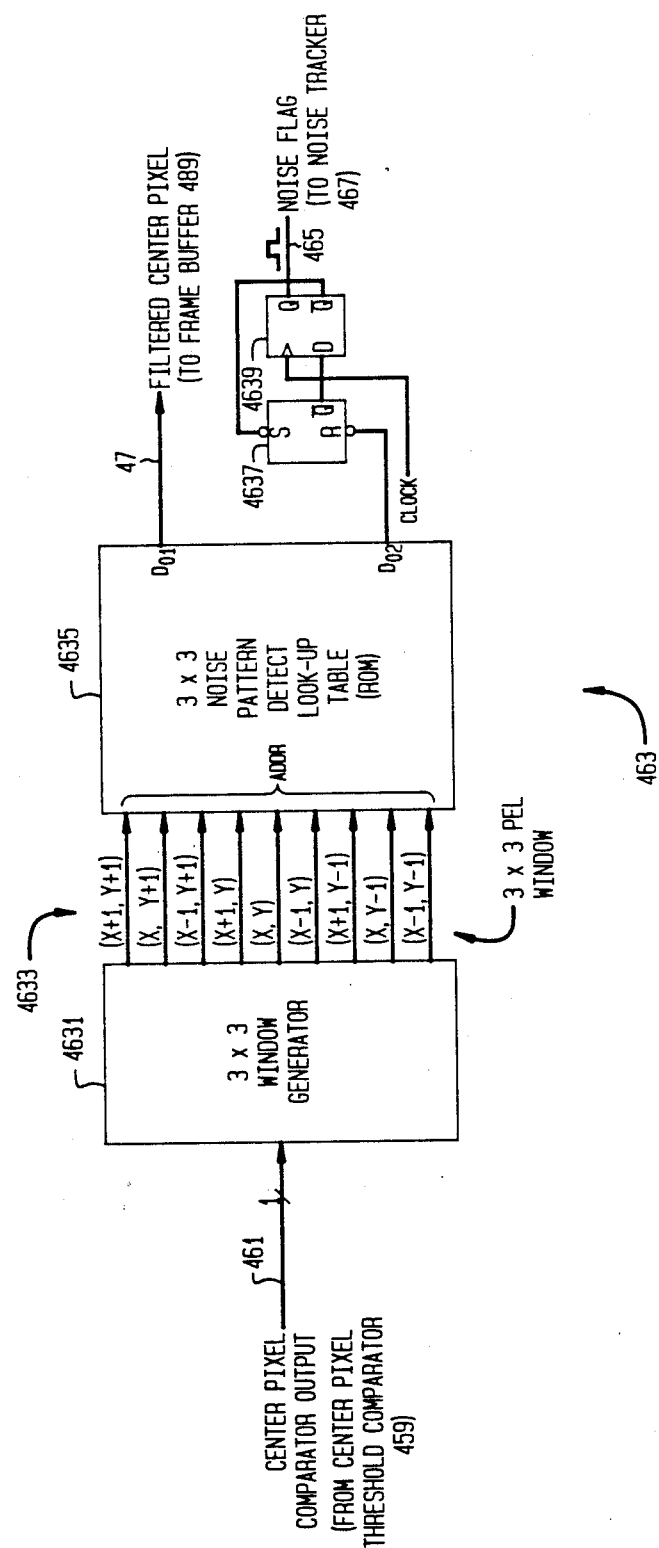
FIG. 9 depicts a block diagram of Noise Detector and Filter Circuit 463 which also forms part of Image Processing Circuit 40 shown in FIGS. 2A and 2B.

A block diagram of noise detector and filter circuit 463, which forms part of image processing circuit 40 shown in FIGS. 2A and 2B, is depicted in FIG. 9. As previously discussed, noise detector and filter circuit 463 determines whether any one of several pre-defined noise patterns exist in the thresholded image produced by comparator 459. Circuit 463 forms a 3-by-3 window of thresholded pixels centered about the current thresholded pixel produced by comparator 459. The pixel pattern in this window is then compared to a previously stored noise pattern which is pre-defined to be pixel noise. Should a match occur between the pattern in the window and any pre-stored pattern, then a signal in the form of a "Noise flag" is provided over lead 465 to noise tracker 467. In addition, circuit 463 filters single pixel noise from the center pixel (changes its value) in the 3-by-3 window and provides the filtered center pixel value on lead 47. The filtered centered pixels appearing on lead 47 are routed to windowing frame buffer 489 situated within post-scan processing circuit 48 (see FIGS. 2A and 2B).

In particular as shown in FIG. 9, single bit pixels produced by center pixel threshold comparator 459 are applied over lead 461 to 3-by-3 window generator 4631. This window generator contains two line delays and three 3-bit shift registers connected in a similar fashion as are line delays 4457 and 4463 and shift registers 4451, 4460 and 4466 (see FIGS. 5A and 5B), to produce a moving window of 3-by-3 pixels. The nine pixels simultaneously produced by window generator 4631 are applied in parallel, via leads 4633 shown in FIG. 9, as an address to 3-by-3 noise pattern detect look-up table 4635. This look-up table contains read only memories (ROMs) that store pre-defined noise patterns that could occur within a 3-by-3 window. Four different noise patterns that could occur within a 3-by-3 window are stored within the ROMs, but only one of these patterns is selected (by well known addressing circuitry not shown) for use at any one time. Table 4635 produces two separate outputs. If the moving 3-by-3 window curtains a noise pattern that matches a pattern stored within the ROM, then a high level signal is produced on output DO2. This high level signal is then clocked through flip-flops 4637 and 4639 in order to produce a pulse, which lasts two clock cycles, on lead 465. This pulse is the "Noise flag". This pulse causes noise tracker 467 (see FIGS. 2A and 2B), which is discussed in detail below in conjunction with FIG. 10, to imcrement its output value. As shown in FIG. 9, the other output of table 4635, output DO1, which appears on lead 47, is the value of the center pixel of the 3-by-3 window from which single pixel noise has been removed. Specifically, if the center pixel provided by comparator 459 is black (e.g. binary "1") because of noise, the value of this pixel is changed to white (e.g. binary "0") by table 4635.

Figure 10B:
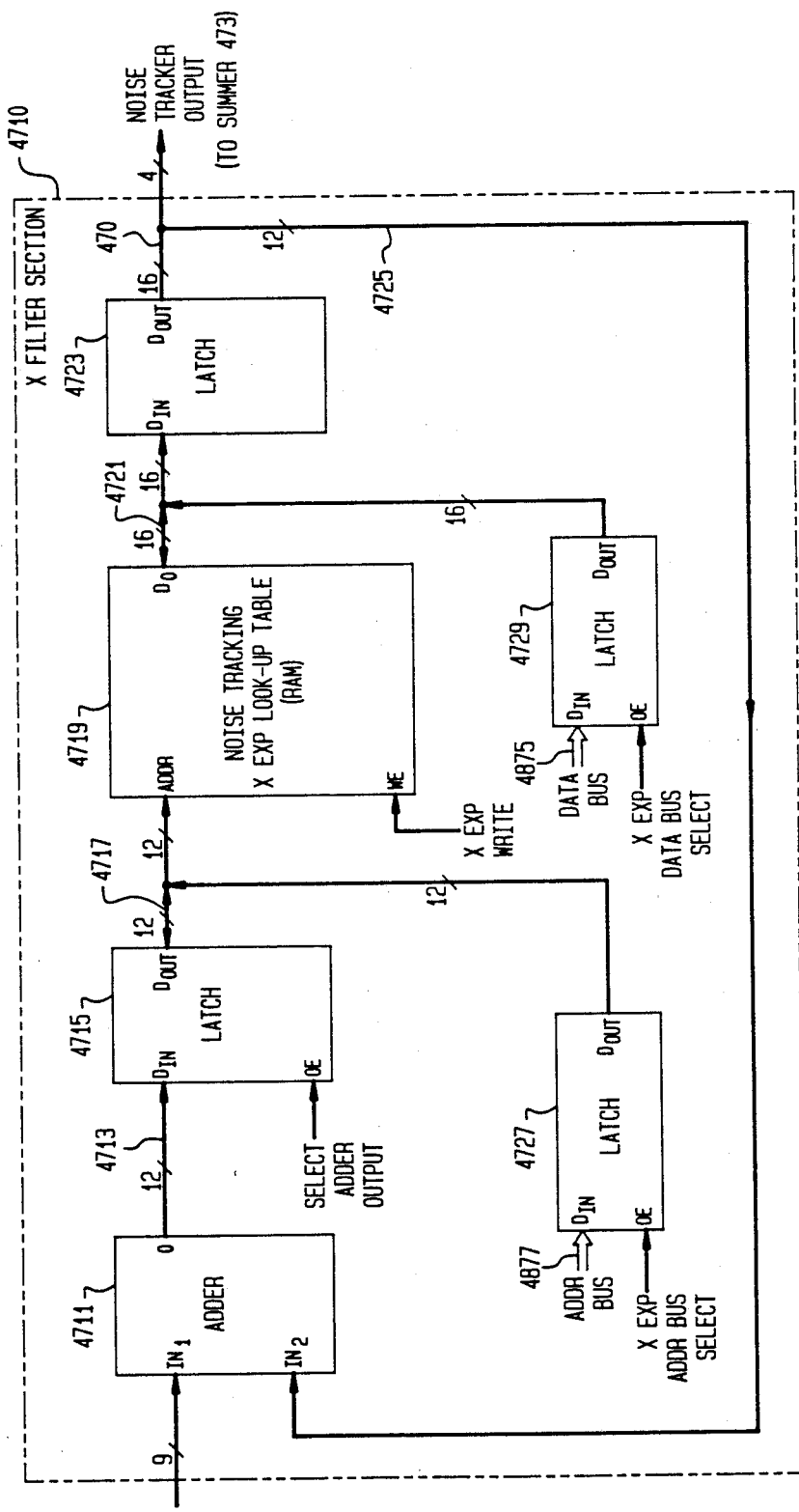

A block diagram of noise tracker 467, which forms part of image processing circuit 40 shown in FIGS. 2A and 2B, is collectively depicted in FIGS. 10A and 10B, for which the correct alignment of the drawing sheets for these figures is shown in FIG. 10. As noted above, noise tracker 467 is a two-dimensional filter that produces an output value that incrementally and exponentially decays, on a pixel by pixel basis, in both the X and Y directions in response to each pulse of the Noise flag that appears on lead 465. The output of this filter tracks the current noise level in the scanned image. In response to each pulse on the Noise flag, the output of this filter increases, by a pre-defined value that is preferably equal to the decimal value "45", and then decays in both the X and Y directions until the value of the output reaches zero.

As shown in FIGS. 10A and 10B, Noise Tracker 467 consists of Y Filter Section 4670 and X Filter Section 4710 which provide outputs that exponentially decays on a pixel-by-pixel basis in the Y and X directions, respectively. Specifically, within Y Filter Section 4670, a pre-defined exponentially decaying function [of the form $1/(1-T)$ where T is time] is stored within Noise Tracking Y Exp Look-up Table 4679, which is preferably a RAM circuit. This function provides filtering in the Y direction which corresponds to a direction that is perpendicular to that of the scan line. In other words, given a starting value for any pixel, P, on a scan line, the output of this look-up table provides a value for the same pixel but located on the next scan line, i.e. the next pixel in the same column, that equalts the starting value attenuated by a small exponential amount. Now, assuming that no noise occurs in all the remaining pixels in this column for the next several scan lines, then the values for the pixels in this column produced by look up table 4679 will resemble a decaying exponential function.

Specifically, look-up table 4679 is accessed by two values that collectively form an address over leads 4677. One value is the single bit pulse appearing on Noise flag lead 465. At the same time, the multi-bit output produced by look-up table 4679, which has been delayed by one scan line through line store 4671, is the other value. Both of these values are applied to respective data inputs of latch 4675: the Noise flag bit appearing via lead 465 and the delayed output of look-up table 4679 appearing through leads 4673.

In operation, Noise flag pulses are applied over lead 465 as data to an appropriate input bit of latch 4675. Simultaneously therewith, the output of Y EXP look-up table 4679 is stored within latch 4684 for use as input data to line store 4671. The address at which the Y EXP value will be stored within the line store is specified by the value of the horizontal pixel address, XCNT, appearing on leads 36. Control circuitry 493 (see FIGS. 2A and 2B) then applies an appropriate pulse on the line store write signal to write this value into line store 4671. Once the Y EXP value has been written into the appropriate location in the line store, the line store accesses the delayed value for that location and applies the result, as shown in FIGS. 10A and 10B, to leads 4673. Both the delayed value and the value of the Noise flag are clocked into latch 4675 and from there appear as a ten bit address to Y EXP look-up table 4679. In response to this addres and appropriate clock signals (not shown) applied to the RAM circuits used therein, Y EXP look-up table accesses the appropriate Y EXP value and applies that value to leads 4682. Thus, as can be seen, the value provided by table 4679 for the current pixel being processed determines, in part, the value for the same pixel but located in the immediately following scan line. In the event a pulse occurs on the Noise flag, then the Y EXP table increases its output value by a pre-determined amount. The output of the Y EXP table appearing on leads 4681 is routed as input to X Filter Section 4710.

As noted, X Filter Section 4710 provides filtering in the X direction which corresponds to a direction parallel to that of the scan line. In other words, given a starting value for any pixel, P, on a scan line, the output of this look-up table provides a value for the next pixel on this scan line that equals the starting value attenuated by a small exponential amount. Now, assuming that no noise occurs in the next several successively occurring pixels in the same scan line, then the values for these pixels in this scan line produced by look up table 4719 will resemble a decaying exponential function. Specifically, within X Filter Section 4710, a pre-defined exponentially decaying function [again of the form $1/(1-T)$ where T is time] is stored within Noise Tracking X Exp Loop-up Table 4719, which is preferably a RAM circuit.

X Filter Section 4710 functions in a very similar manner to that of Y filter Section 4670. Specifically, look-up table 4719 is accessed by an address appearing on leads 4717. This address consists of the sum of two values. One value is the output of Y Filter Section 4670 appearing on leads 4681. At the same time, the multi-bit output produced by X EXP look-up table 4719, which has been delayed by one pixel clock cycle through latch 4723, is the other value. In operation, both the output of Y Filter Section 4670, directly appearing via leads 4681, and the delayed output of look-up table 4719 appearing on leads 4725 are applied to respective inputs of adder 4711. The sum of these values appears on leads 4713 and is clocked into latch 4715 as an address to X EXP look-up table 4719. In response to this address and appropriate clock signals (not shown) applied to the RAM circuits that form X EXP look-up table 4719, this look-up table accesses the appropriate X EXP value and applies that value to leads 4725. Thus, as can be seen, the value provided by table 4719 for the current pixel being processed determines, in part, the value for the immediately preceding pixel. The output value appearing on leads 470 is a two-dimensionally filtered value that tracks the noise level that occurs in the scanned image. As noted above, this value is applied, via leads 470, to summer 473 (see FIGS. 2A and 2B).

X EXP and Y EXP look-up tables 4679 and 4719 are both loaded with appropriate data during system initialization by microcomputer system 485, specifically through execution of block 1410 shown in FIG. 14 which will be discussed in detail shortly. For initialization, appropriate data and address information are applied, from the microcomputer system, via address bus 4877—shown in FIGS. 10A and 10B—and data bus 4875, to these tables through address latch 4687 and data latch 4690 for Y EXP look-up table 4679 and address latch 4727 and data latch 4729 for X EXP look-up table 4719. Data is written into both of these tables by the microcomputer system using appropriate address and data bus select signals and write signals in a substantially identical manner as that explained above in connection with center pixel look-up table 4555 (see FIG. 8).

Figure 11B:
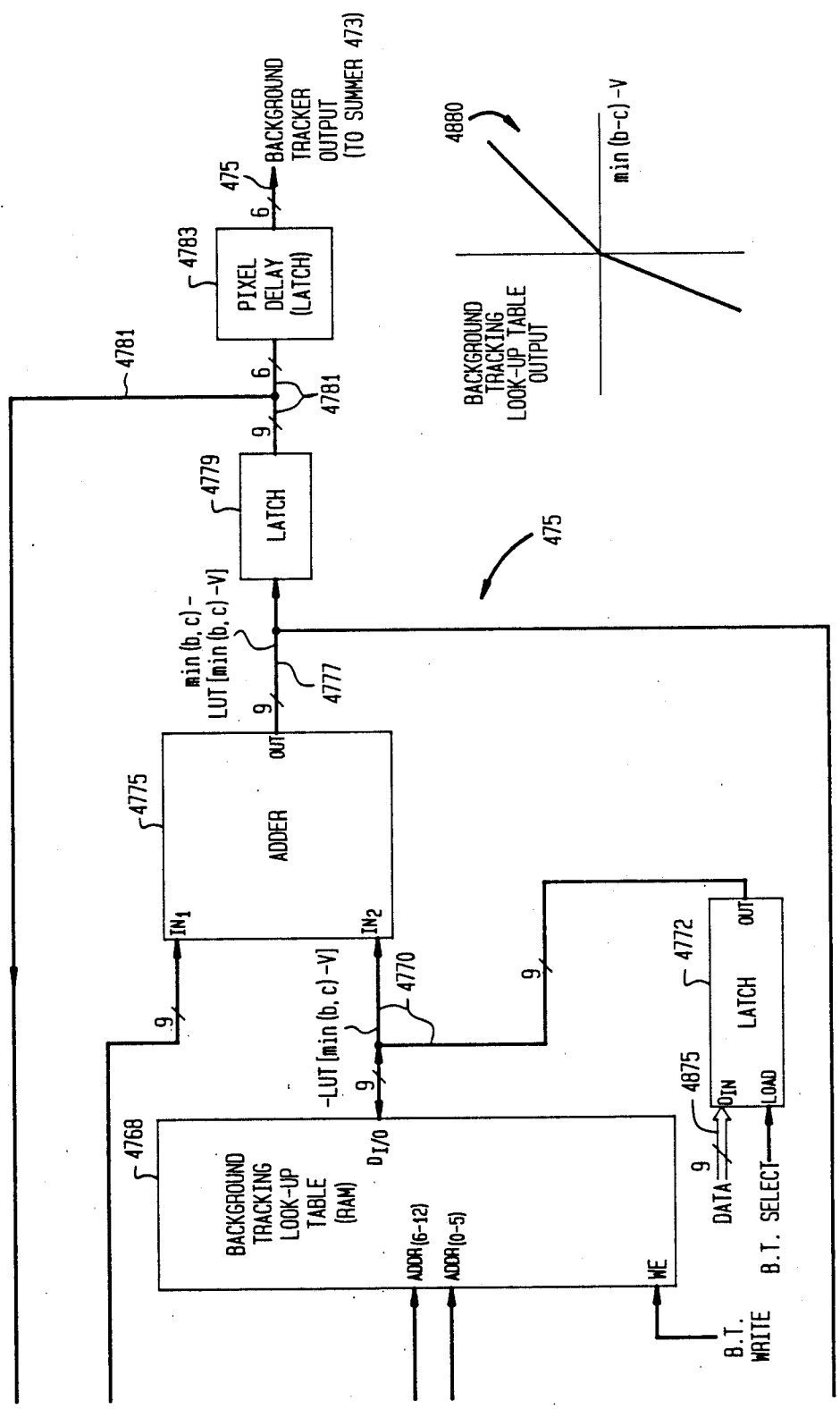

A block diagram of background tracker 475, which forms part of image processing circuit 40 shown in FIGS. 2A and 2B, is collectively depicted in FIGS. 11A and 11B, for which the correct alignment of the drawing sheets for these Figures is shown in FIG. 11. Background tracker 475, as noted above, produces a six-bit value that adaptively tracks the background level for each pixel in the scanned image. The background level can be viewed as the level, which dynamically varies from pixel to pixel, at which a white pixel changes to black (for negative film) as a pre-defined function of the background intensities of the pixels in a neighboring region.

The background level for the current pixel, V, can be determined using the following relationship:

Background of $V = \min(b, c) - f[\min(b, c) - V]$ \hfill (7)

where: $b$ = the background level for the pixel, B, situated in the same column as the current pixel but located within the immediately prior scan line, and $c$ = the background level for the previous pixel, C, located in the current scan line.

The positions of pixels B and C in relation to current pixel V are depicted in portion 4785 of the current scanned image. Function f is a non-linear empirically derived function that preferably resembles function 4880. Through this function, the tracked background level responds rapidly (closely follows a video level) when the value of the current pixel goes towards the background (or paper) level of the scanned document, i.e. changes from black (decimal value "63") to white (decimal value "0"), and responds less rapidly when the value of the current pixel goes towards that of character data, i.e. changes from white to black. Background tracker 475 provides the background level of the current pixel V using this relationship.

Specifically, pre-defined values of the function f are stored within background tracking look-up table 4768 which is preferably implemented using RAM circuits. This table is accessed using two values as an address: the value of the present pixel, V, and the minimum of two prior background values (b and c). The value of the current pixel, pixel (X+1, Y), is supplied to background tracker 475, via leads 447. During image processing, this value is routed through multiplexer 4767 and is applied as input to the lowest six bits (0-5) of the address input to look-up table 4768. The other input, min(b,c), appears on leads 4763 and is routed, during image processing, through multiplexer 4765, and is applied as input to the highest six bits of the address input to this look-up table.

Line store 4751, latch 4755, comparator 4757 and multiplexer 4761 are used to determine the minimum value between prior background values b and c. In particular, in response to various clocking and control signals (not shown) line store 4751 provides the value of the pixel for the prior scan line and stored in the location given by the current value of the horizontal pixel address, XCNT, on leads 4753. This value is applied to one input, INB, of multiplexer 4761 and as one input, INA, of comparator 4757. At the same time, the contents of latch 4779 contain the background value for the previous pixel, C, situated on the current scan line. This value is routed, via feedback leads 4781, to another input, INA, of multiplexer 4761. In addition, the background value c is also routed as one input, INB, to comparator 4757. Comparator 4757 compares the b and c background values and produces a single bit output which specifies which value is the smaller of the two. This single bit is applied to the select input of multiplexer 4761. Therefore, in the event that background level b exceeds background level c, then the output level produced by comparator 4757 is high which instructs multiplexer 4761 to route background level c to leads 4763. Alternatively, in the event that background level c exceeds background level b, then the output level produced by comparator 4757 is low which instructs multiplexer 4761 to route background level b to leads 4763. The value appearing on leads 4763 then becomes part of the address supplied to look-up table 4768.

Now, once the full address is applied to table 4768 and in response to appropriate clock and control signals (not shown), the RAM circuits that form look-up table 4768 access an appropriate pre-stored value of function f (stored in two's complement form) and applies it to leads 4770. This value is routed as one input to adder 4775. The other input to the adder is the minimum value, min(b,c), produced by multiplexer 4761. The output of this adder appearing on leads 4777 is the background value for the current pixel V. This value is then clocked into latch 4779 which imparts a one pixel delay to this value. The resulting value clocked out of latch 4779 is used as the background value for the previous pixel and hence is routed, via leads 4781, to respective inputs of comparator 4757 and multiplexer 4761. The output of latch 4779 is clocked through latch 4783 in order to impart an additional pixel delay to the output. This additional delay synchronizes the output of background tracker 475, which is applied as one input to summer 473 (see FIGS. 2A and 2B), to that of noise tracker 467 which is applied to the other input of this summer.

After each time the line store is accessed to provide a background value, the current background value is stored therein. Specifically, once the line store generates a background value, appropriate clock and control signals detail shortly). First, the microcomputer system sets the level of a select signal applied to multiplexers 4765 and 4767, shown in FIGS. 11A and 11B as the "B.T. Address Select" signal, to an appropriate level to instruct both multiplexes to route the addresses appearing on bus 4877 and applied to input INB of each multiplexer, instead of the current pixel level appearing on leads 447 and the min(b, c) value appearing on leads 4763, to the address inputs of look-up table 4768. Next, the microcomputer system applies an appropriate address to address bus 4877 which is, in turn, routed through multiplexers 4765 and 4767 to look-up table 4768. Thereafter, the microcomputer system accesses a value of the function f that has been stored within its resident memory and applies this value to data bus 4875. Once this has occurred, the microcomputer applies an appropriate select signal ("B.T. Select") to latch 4772 to store the data appearing on bus 4875 into the latch and then route the data to leads 4770 as input to look-up table 4768. Thereafter, the microcomputer system applies an appropriate write signal ("B.T. Write") to look-up table 4768 to cause the RAM circuits used therein to store the data value at the appropriate address within the table. For the next data value of function f, the microcomputer system changes the address, accesses the new data value from its resident memory, applies this data value to data bus 4875, stores the data into latch 4772 and then instructs the RAM memory that forms look-up table 4768 to appropriately store this data value, and so on for each successive value of function f.

Figure 12B:
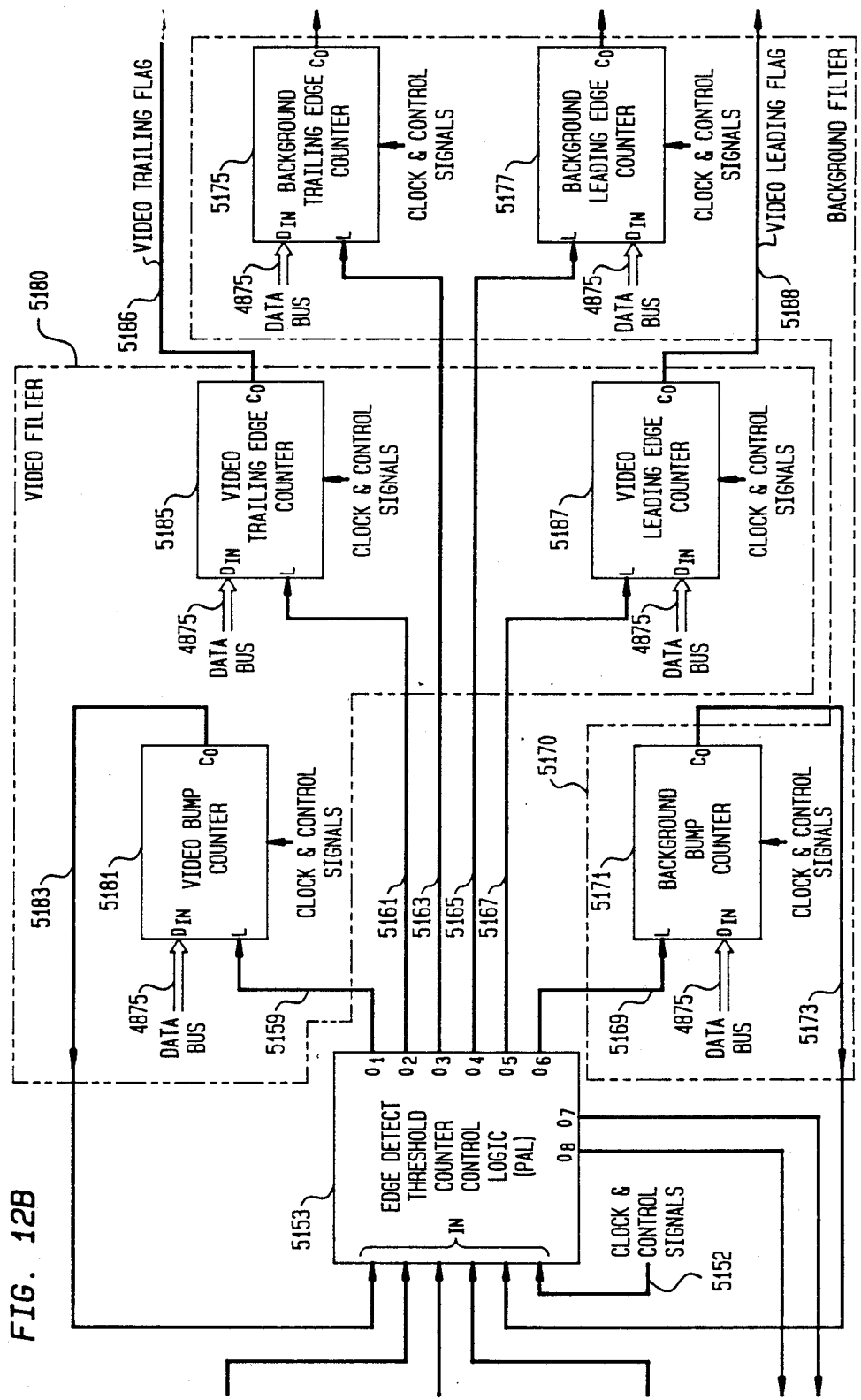
Figure 12C:
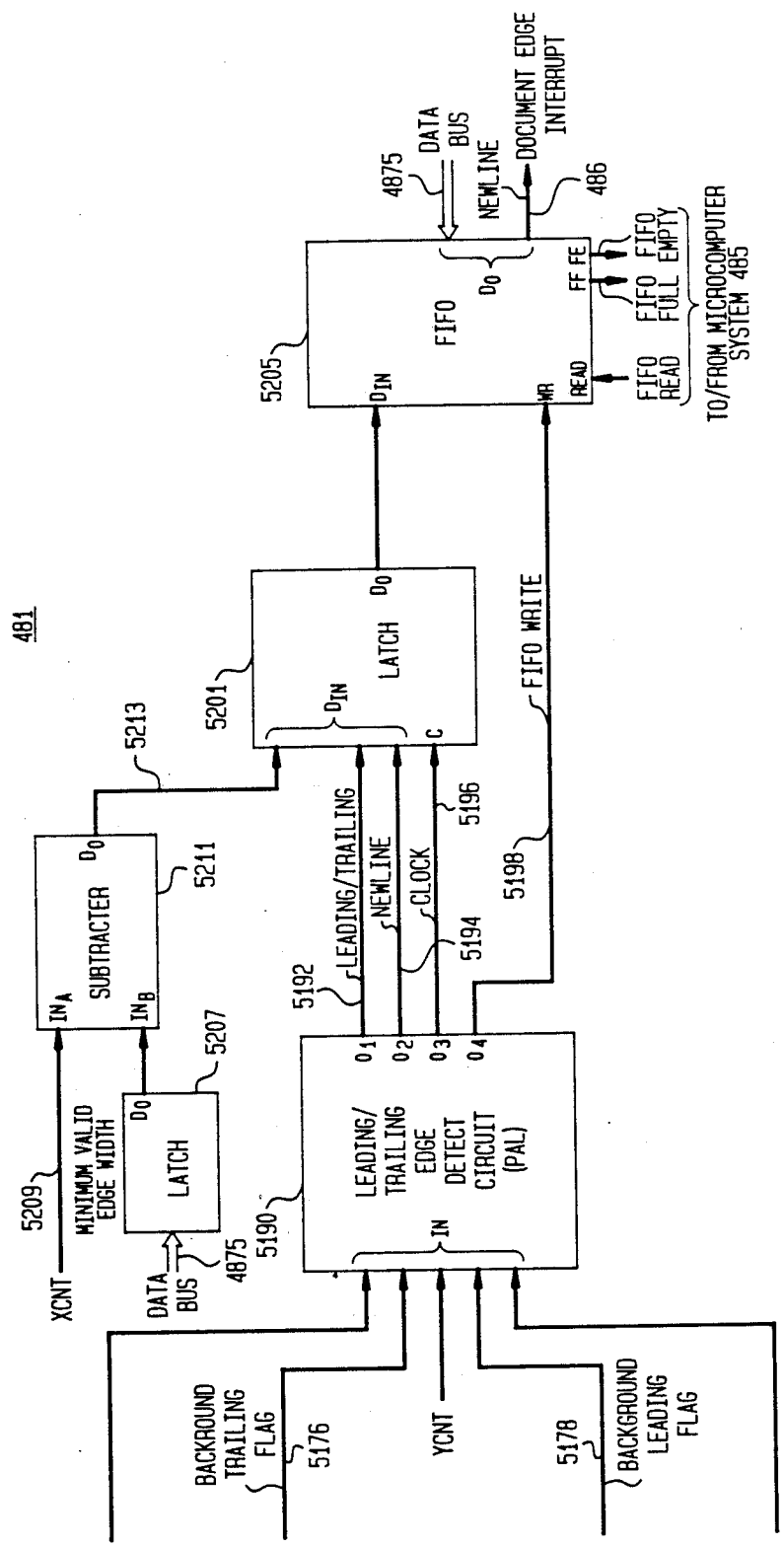

A block diagram of document edge detection circuit 481 is collectively depicted in FIGS. 12A–12C, for which the correct alignment of the drawing sheets for these Figures is shown in FIG. 12. Document edge detection circuit 481, as noted above, detects edges in each scan line in the scanned image. for each such edge, the circuit supplies the associated pixel location (XCNT value) of that edge to microcomputer system 485, via address and data busses 487, for subsequent use by the microcomputer system in determining which ones of these edges for any given scan line are the actual leading and trailing edges of the document for that scan line.

In essence, circuit 481 functions by comparing background values and center pixel values against threshold values and using the results of those comparisons to control various counters. One set of these counters forms a video filter which detects valid edge transitions in the video signal (incoming center pixel values) while removing spurious transitions due to noise that would otherwise appear in the video signal. Another set of these counters forms a background filter which detects valid edge transitions in the background values while removing spurious transitions due to noise that would otherwise appear in the background values. The output of various ones of these counters are then applied to a leading/trailing edge detect circuit which determines, based upon these outputs, whether a valid leading or trailing edge has, in fact, occurred in the current scan line. If such a valid edge has occurred, then the detect circuit generates suitable control signals to store the pixel position (XCNT value) of that edge within a first-in first-out (FIFO) memory circuit. Once the entire scan line has been processed, circuit 481 generates a document edge detection interrupt on lead 486. In response to this interrupt, the microcomputer system accesses all the edge locations from the FIFO and then determines the location of the actual leading and trailing edge pair of the scanned document for the current scan line.

Specifically, within circuit 481, incoming background values, appearing on leads 474 or center pixel values (video values) appearing on leads 447, are routed to one input of each of comparators 5137, 5141 and 5145. These comparators compare both the video and background levels to two different threshold levels: a "cutoff" level appearing on leads 5130 and an "actual cutoff" level appearing on leads 5113. Generally speaking, the background level follows the video level. In particular, the background values closely track any increase in the video values but respond somewhat slower to any decrease in the video values. In contrast, the cutoff level very slowly tracks both the video and background levels, typically falling one count over the span of several hundred pixels and rising approximately ten times more slowly. Inasmuch as the background level often rises or falls above the cutoff level making the results of a comparison against the cutoff level somewhat erratic, the actual cutoff level has a value that is consistently lower than the cutoff value by a pre-defined offset value, typically 10 counts. In this manner, the background level generally remains above the actual cutoff value thereby eliminating any erratic performance due to noise. Comparing the background values against two separate threshold levels provides a check on system performance which advantageously reduces erratic response. Both cutoff levels are produced by cutoff values generating circuit 5100, which will be discussed in detail below. Comparator 5141 compares the video values [values of center pixel (X+1, Y)], appearing on leads 447, against the cutoff value.

Now, in order to determine whether a valid edge has occurred in the scanned image, the outputs of the three comparators are used to control six separate counters. Three of these counters, specifically video bump counter 5181, video trailing edge counter 5185 and video leading edge counter 5187, collectively form video filter 5180. The remaining three counters, specifically background bump counter 5171, background trailing edge counter 5175 and background leading edge counter 5177, collectively form background filter 5170. The video and background filters provide two functions: (a) they determines whether a detected edge in the video or background level, respectively, spans a sufficiently long interval in the scanned image, i.e. whether the edge transition itself in the video or background level, respectively, is followed by a sufficiently wide interval of pixels all having the same value (the minimum valid edge width); and (b) filters out transitions that are too short (less than or equal to the maximum noise edge width) and hence attributable to noise.

For example, a leading edge in the video signal is defined to be a rising transition in the video signal followed by at least a preset number of, typically 20 pixels (the minimum valid edge width), all having a value in excess of the cutoff value. Now, if such an edge does not span a predefined minimum distance, typically at least "5" pixels wide (the maximum noise edge width), then the edge is viewed as noise and hence ignored. Alternatively, a trailing edge in the video signal is defined to be a falling transition in the video signal followed by again a preset number of, also typically "20", pixels all having a value lower than the cutoff value. If the trailing edge does not span a distance of at least "5" pixels, then this edge is viewed as noise and ignored. Similarly, the background filter determines whether a detected edge in the background values lasts sufficiently long through use of the same pixel distances.

Now, with this understanding in mind, the outputs of comparators 5137, 5141 and 5145 are routed via respective leads 5139, 5143 and 5147 to associated inputs of edge detect threshold control logic 5153. This logic is typically implemented using programmable array logic. The array stores pre-defined logical functions and operates as a finite state machine in defining the manner in which the counters in video filter 5180 and the counters in background filter 5170 operate as well as the direction (increase/decrease) in which the cutoff value changes. Specifically, whenever an edge transition is detected, by virtue of a level change in one or more of the comparator outputs, the appropriate background or video leading or trailing counter 5185 or 5175, or 5177 or 5187 is loaded with the pre-set value by circuit 5153, which generates appropriate signals appearing on output lead 5161 or 5163, or 5165 or 5167. Illustratively, a leading edge is defined to occur when the video values decrease below the cutoff and actual cutoff values. A trailing edge, in contrast, is illustratively defined to occur when both the video and background values increase above the cutoff levels. At the same time, circuit 5153 causes either video bump counter 5181 or background bump counter 5171 to be loaded with the predefined minimum distance value, typically "5" pixels. The contents of all the other counters remain at zero. For example, if the output level produced by comparator 5141 falls, thereby indicating that a leading edge in the video level occurs, then logic 5153 generates a pulse on lead 5167 to load counter 5187 with the value "20" and also generates a pulse on lead 5159 to load the value "5" into video bump counter 5181. Likewise, if a trailing edge in the video occurs, then logic 5153, in response to a rising level change in the output signal produced by comparator 5141, generates a pulse on lead 5161 to load counter 5185 with the minimum valid edge width, i.e. the value "20", and generates a pulse on lead 5159 to load the maximum noise width value, i.e. the value "5", into the video bump counter. Similarly, if a background leading or trailing edge is detected, then only either counters 5171 and 5177, or counters 5171 and 5175 are loaded with the appropriate initial values.

Now, during each successive pixel following the edge transition, each counter that has been loaded with an initial value is decremented by one. In the event another edge transition occurs within the first five pixels, then logic 5153 will merely generate appropriate pulses at certain of its outputs to cause all the appropriate counters to re-load themselves with the minimum valid edge width value thereby effectively ignoring this edge transition. Alternatively, if another edge transition occurred after but not during the first five pixels (the maximum edge noise width), then, depending upon whether the edge transition occurs in either the video or background level, either video bump counter 5181 or background bump counter 5171 will underflow (roll over) and generate a pulse on its carry output, CO, terminal. The carry outputs of both bump counters 5171 and 5181 are fed back over leads 5173 and 5183, respectively, to corresponding inputs of logic 5153 in order to signify that the present edge transition is a potentially valid edge and that further decrementation for each subsequent pixel should continue.

Now, if the detected edge continues for at least the minimum valid edge width, i.e. the number "20", then that one of the four remaining counters in the video and background filters that has most recently been loaded with the minimum valid edge width value will eventually underflow, i.e. roll over through zero, and generate a pulse on its associated carry output, CO, terminal. For example, if a video leading edge transition was initially detected based upon a level change present in the output of comparator 5141, then video leading edge counter 5187 will have been loaded with the value "20" and subsequently decremented with each successive pixel until the contents of this counter underflows and causes a carry out pulse to be generated which whill appear on lead 5188 as the "Video Leading" flag. Likewise, if a transition signifying a video trailing edge, a background leading edge or a background trailing edge was initially detected, based upon level changes in the output signals produced by comparators 5137, 5141 or 5145, and the edge was at least "20" pixels wide, then the contents of video trailing edge counter 5185, background leading edge counter 5177 or background trailing edge counter 5175 would, as the result of subsequent decrementation, eventually underflow and produce a carry out pulse. This pulse would appear on leads 5186, 5178 or 5176 as the "Video Trailing" flag, the "Background Leading" flag or the "Background Trailing" flag, respectively.

All four flags along with the current value of the vertical pixel address, YCNT, are applied as input, through leads 5186, 5176, 5178 and 5188, to leading/trailing edge detect circuit 5190. This circuit is also implemented using programmable array logic (PAL). This circuit is pre-programmed with pre-defined logical functions that categorize a valid detected edge as a leading or trailing edge, based upon the status of these four flags and the vertical pixel address, YCNT. Specifically, if both the video and background leading flags are high, then this indicates that an actual leading edge has just been detected in the current scan line. In this case, circuit 5190 produces a high level on leading/trailing lead 5192 (PAL output O1) which, in turn, is routed to an appropriate data input terminal of latch 5201. Alternatively, if both the video and background trailing flags are high, then this indicates that an actual trailing edge has just been detected in the current scan line. Consequently, here, circuit 5190 produces a low level on leading/trailing edge lead 5192. At the same time either of these events occur, circuit 5190 also produces a clock pulse on clock lead 5196 (PAL output O3). This clock pulse is routed to the clock input of latch 5201 and causes the horizontal pixel location occurring at the start of the detected edge to be stored into latch 5201. This location is equal to the current value of horizontal pixel address XCNT less the minimum valid edge width value, i.e. the decomal value "20". Specifically, during system initialization, the minimum valid edge width value is applied to data bus 4875 and then stored in latch 5207 by the microcomputer system. Thereafter, this value is applied to one input, INB, of subtracter 5211 while the current value of the horizontal pixel address, XCNT, is applied to the other input, INA of the subtracter. Hence, whenever a valid edge is detected, the output of subtracter 5211, appearing on leads 5213, is the location of the pixel situated at the start of the edge transition. This location is applied to appropriate data input terminals of latch 5201 to be clocked into this latch whenever a valid edge has been detected. The output of the latch, namely the edge location and whether it is a leading or trailing edge, is routed to the data inputs of FIFO memory circuit 5205. During the next pixel interval, leading/trailing edge detect circuit 5190 generates a pulse at output terminal O4 which is, in turn, applied, via FIFO write lead 5198, to the write enable input of FIFO 5205. This pulse causes the FIFO to store the value then being applied to its data input terminals. This process is repeated for each successive detected edge on the current scan line such that all the edge locations for this line are stored within FIFO 5205. Now, once this entire line has been processed, circuit 5190 generates a pulse on NEWLINE output lead 5194 (PAL output lead O2). This pulse, which signifies that another scan line is about to be processed, is stored in the FIFO and serves to demarcate edge location data for different scan lines. The FIFO provides the pulse on NEWLINE lead 486 as the document detection interrupt to the microcomputer system. In response to this interrupt signal, the microcomputer system reads the contents of the FIFO to obtain the leading/trailing edge locations stored therein. A NEWLINE pulse will be generated regardless of whether any edges were detected in the previous scan line. The microcomputer system is connected through appropriate leads (not shown) to various control terminals of the FIFO; namely, FIFO Read, FIFO Full and FIFO Empty, and utilizes these control terminals to read the contents of the FIFO. The edge locations provided by the FIFO are applied, via various data output (DO) terminals, to data bus 4875 and from there to the microcomputer system.

As discussed above, cutoff values generating circuit 5100 provides the values of the cutoff and actual cutoff levels for use by comparators 5137, 5141 and 5145. These cutoff values, as noted above, vary with time and slowly track both the video and background values. Specifically, within circuit 5100, the cutoff value is generated through arithmetic logic unit (ALU) 5125, counter 5133 and latch 5129 along with add register 5117 and subtract register 5121. During system initialization, pre-defined constants, which will be subsequently used to increment and decrement the cutoff value, are stored in add register 5117 and (in two complement form to implement subtraction) in subtract register 5121 by the microcomputer system, via data bus 4875. Also during system initialization, the microcomputer system stores, via data bus 4875, an initial cutoff value within cutoff counter 5133. Now, if, during processing of any pixel in the scanned image, the background value for that pixel is greater than the cutoff level, as indicated by the output level produced by comparator 5145, then the cutoff level is too low and needs to be incremented. Consequently, logic circuit 5153 applies a level change, via output terminal O7, to output lead 5157. This causes add register 5117 to apply its contents to its data output (DO) terminals which, in turn, are connected to an input, IN2, of ALU 5125. The other input, IN1, of the ALU receives through latch 5129 and feedback leads 5127, the previous output provided by the ALU. The ALU adds the two values present at its two inputs together. If the result causes an overflow in the ALU, a carry out pulse is generated by the ALU and applied to the clock input ("c") of counter 5133. Inasmuch as the add signal, provided over lead 5157 by circuit 5153 and applied to the Up/Down input of counter 5133, is now high, counter 5133 now increments its contents by one. The output of this counter, appearing on leads 5130, is the cutoff value.

Now, alternatively, in the event the background value is less than the cutoff level for the pixel presently being processed, as indicated by the output level produced by comparator 5145, then the cutoff level is too high and needs to be decremented. In this case, logic circuit 5153 applies a level change, via output terminal O8, to output lead 5155. This causes subtract register 5121 to apply its contents to its data output (DO) terminals which, in turn, are connected to input IN2 of ALU 5125. The ALU then basically decrements its output by the contents of subtract register 5121. If the result causes an underflow in the ALU, a carry out pulse is generated by the ALU and applied to the clock input of counter 5133. Inasmuch as the add signal, provided over lead 5157 by circuit 5153 and applied to the Up/Down input of counter 5133, is now low, counter 5133 decrements its contents by one and thereby reduces the cutoff value appearing on leads 5130. Inasmuch as the incremental amount stored in and supplied by add and subtract registers 5117 and 5121 is generally quite small, the cutoff level changes very slowly.

As will now be explained below, any change upward or downward in the cutoff value causes the same change in the actual cutoff value. Specifically, to generate the actual cutoff value appearing on leads 5113, the cutoff value appearing on leads 5130 is routed to one input of subtracter 5107. The other input is provided by register 5103. This register is loaded by the microcomputer system, during system initialization and via data bus 4875, with the pre-defined value, typically 10 counts, of the offset between the cutoff and actual cutoff values. Subtracter 5107 subtracts the offset value from the cutoff value and applies the result as input data to latch 5111. This resulting value is then clocked into the latch, by clock signals (not shown), and thereafter appears on leads 5113 as the actual cutoff value.

Figures 13, 13A:
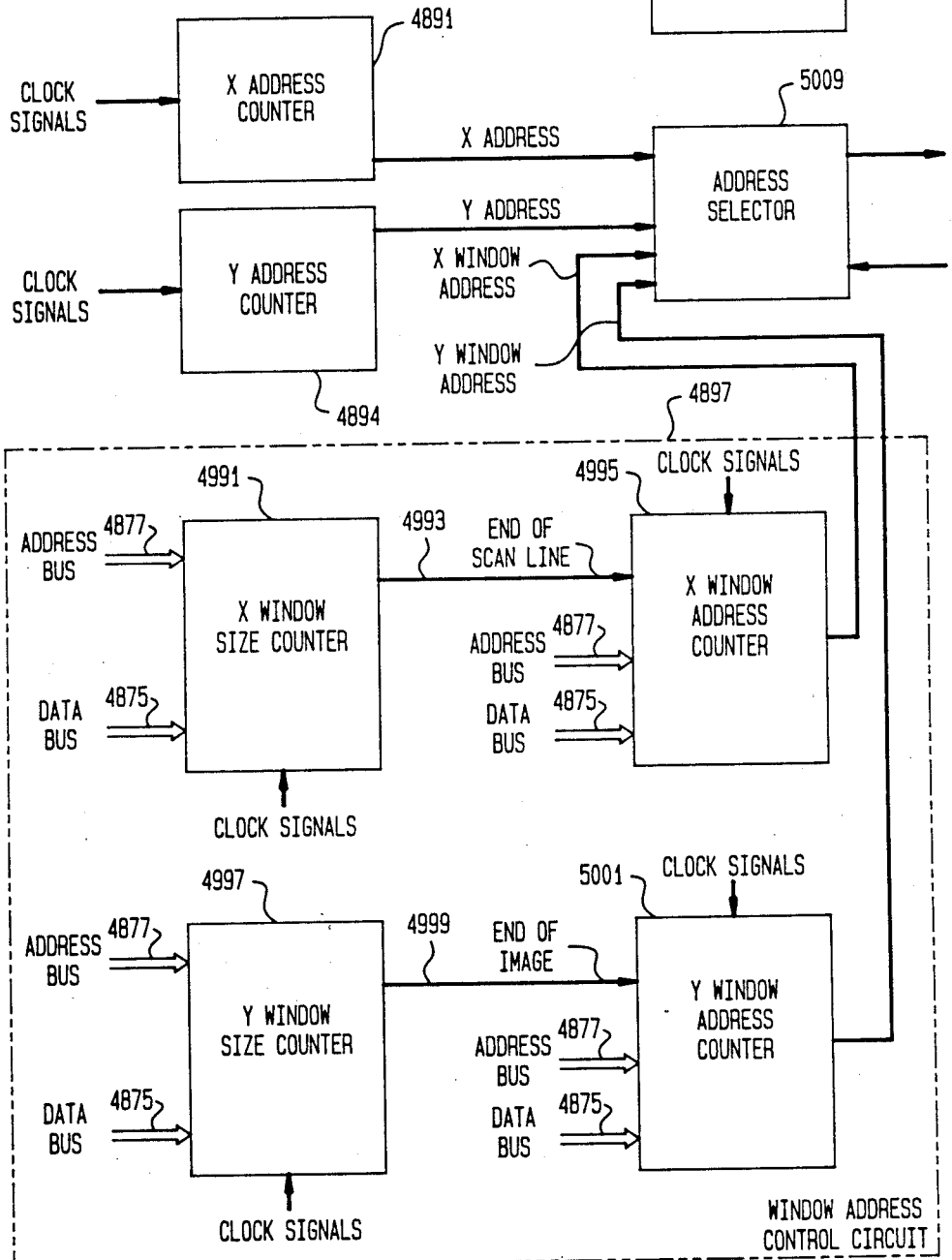
Figure 13B:
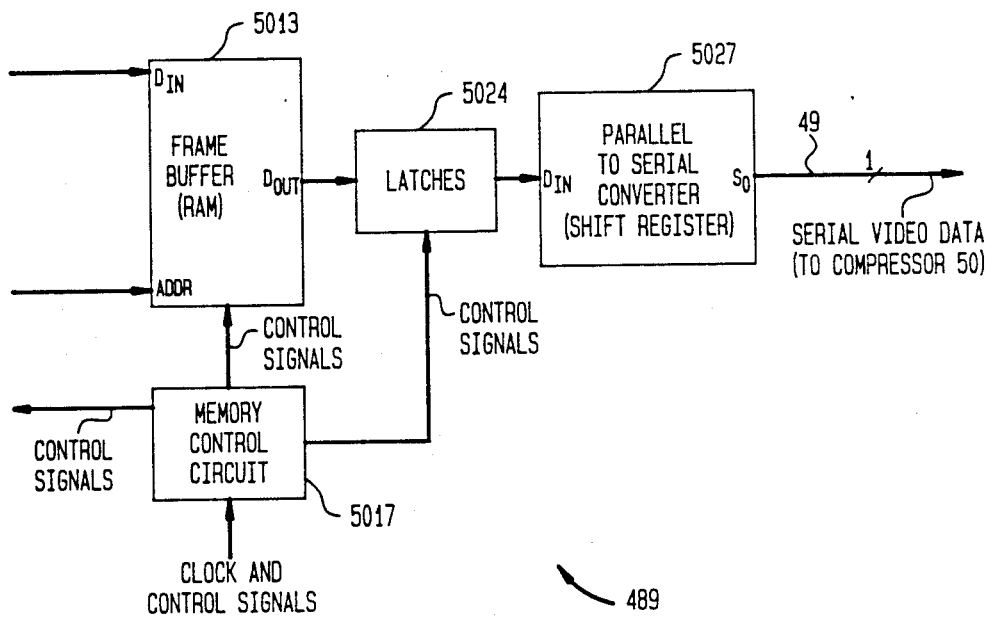

A block diagram of windowing frame buffer 489 is collectively depicted in FIGS. 13A–13B, for which the correct alignment of the drawing sheets for these Figures is shown in FIG. 13. In essence, as noted above, all the pixel values that form any scanned image are first stored within windowing frame buffer 489. Thereafter, the starting address of the first pixel location in the escribing rectangle (upper left hand corner) and the horizontal and vertical sizes of the rectangle, as determined by the microcomputer system, are appropriately loaded into the windowing frame buffer. Once this has occurred, the windowing frame buffer performs a video masking operation to read out all the pixel values located on and within the edges of the escribing rectangle. The resulting pixels are applied, in serial form, via lead 49, to counters 60, 62, 64 and 66 and to LED bar 68.

As noted above, all the filtered center pixel values provided by noise detection and filter circuit 463 (see FIGS. 2A and 2B) that form the scanned image are first stored within frame buffer 5013 before any masking opeation occurs on this image. To store pixel information for a scanned image within the frame buffer, memory control circuit 5017 applies appropriate control signals to address selector 5009 to route the collective address produced by both X address counter 4891 and Y address counter 4894 to the address inputs of frame buffer 5013. The frame buffer is preferably implemented using RAM circuits of sufficient capacity. An incoming pixel value, appearing on lead 47, is then routed to serial to parallel converter 5005, which is preferably implemented using an appropriately sized shift register. Under the control of appropriate system clock signals (not shown), converter 5005 converts a group of several successive incoming single bit pixel values into parallel form and applies the resulting parallel value to the data inputs, Din, of frame buffer 5013. Once this has occurred, memory control circuit 5017 applies appropriate control signals to the frame buffer to invoke a write operation and thereby store the pixel values at the address then appearing on its address inputs and supplied by both X and Y address counters 4891 and 4894. Once this write operation has occurred, the contents of X address counter 4891 are incremented by one in preparation to store the next group of successive incoming pixel values on the current scan line. After an entire row in the frame buffer is filled, the contents of the X address counter roll over to zero and the Y address counter are incremented by one in preparation to store pixels in the next row. This process is iteratively repeated until the last pixel located on the last scan line in the scanned image has been written into the frame buffer at which point both the X and Y address counters are reset to zero in preparation to store the next scanned image. Counters 4891 and 4894 are clocked by appropriate pixel clocks provided by control circuitry 493 (see FIGS. 2A and 2B).

Now, to read pixel values located on and within the escribing rectangle, the microcomputer system loads, utilizing data bus 4875 and address bus 4877, X and Y memory addresses corresponding to the location of the starting pixel of the escribing rectangle into X window address counter 4995 and Y window address counter 5001, respectively. Thereafter, the microcomputer, again utilizing the address and data busses, loads the horizontal size (width), measured in memory locations, of the escribing rectangle into X window size counter 4991 and the vertical size (length), measured in memory rows (scan lines), into Y window size counter 4997. Once these operations have occurred, the pixels stored within frame buffer 5013 and located on and within the top, bottom, left and right edges of the escribing rectangle are then read. Specifically, to read the desired pixels stored frame buffer 5013 (i.e. perform a video masking operation), appropriate control signals are applied by memory control circuit 5017, to route pre-defined control signals to address selector 5009, typically implemented by a multiplexer, in order to select the X and Y memory addresses of the starting pixel location stored within counters 4995 and 5001. These addresses are then routed through address selector 5009 to the address inputs of the frame buffer. Thereafter, memory control circuit 5017 provides appropriate control signals to the frame buffer to invoke a read operation at the address then appearing on its address inputs. The group of pixel values provided at the data output terminals, Dout, of the frame buffer are then clocked within latches 5024 by appropriate control signals provided by memory control circuit 5017. Thereafter, the value stored within latches 5024 is applied in parallel to the input of parallel to serial converter 5027 (typically a shift register) which, using appropriate system clock signals (not shown) then converts the parallel value into bit serial form which, in turn, is applied, via lead 49, to counters 60, 62, 64 and 66 and LED bar 68. Now, once this memory location has been read, the contents of counter 4991 are decremented by one and the contents of counter 4995 are incremented by one. This, in turn, addresses the next group of pixel values on the first scan line in the escribing rectangle. The frame buffer is appropriately instructed to perform a read operation at this new address. This process continues until the end of the scan line has been read. When this occurs, the contents of counter 4991 which has been decremented to zero then roll over which, in turn, causes a pulse to appear on end of scan line lead 4993. This pulse causes counter 4995 to reload the value of the starting X address in preparation for reading the next scan line. At the same time, Y window address counter 5001 has been incremented by one to address the next sequential scan line in the escribing rectangle. Since a full scan line has now been read, the contents of Y window size counter 4997 are then decremented by one. Clearly, to increase the speed of windowing frame buffer circuit 489, parallel to serial converter 5027 can operate simultaneously with frame buffer 5013 such that a group of pixel values can be converted into serial form and applied to lead 49 while the next group value can be accessed from the frame buffer. In any event, the process of reading the frame buffer and converting the resulting parallel pixel values into bit serial form is iteratively repeated for each remaining group of pixels on each remaining scan line until the last group of pixels situated on the scan line has been read, converted and applied to lead 49. Once this has occurred, then the contents of counter 4997 which have, by now, been decremented to zero then roll over. This, in turn, causes a pulse to appear on end of image lead 4999 which, in turn, causes counter 5001 to cease decrementing any further. At this point, all the pixels located on and within the escribing rectangle have been read from frame buffer 5013 and routed, in serial form on line 49.

C. Image Processing Software

Now having discussed the hardware used in the inventive system in detail, a detailed description of the software exectuted by microcomputer system 485 will now be provided.

1. Main Loop

Figure 14:
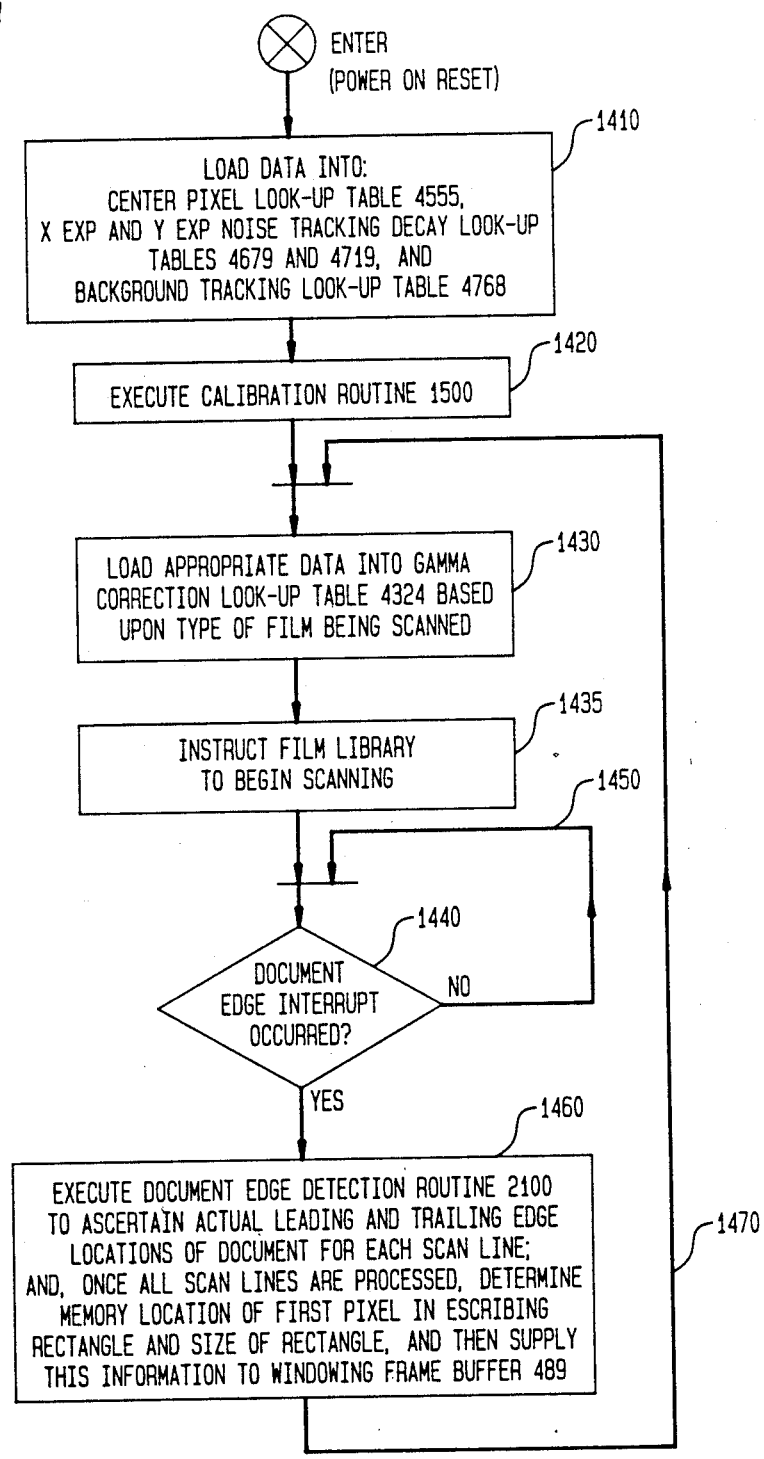
FIG. 14 depicts Main Loop 1400 executed by Microcomputer System 485 located within Image Processing Circuit shown in FIGS. 2A and 2B.

FIG. 14 depicts a flowchart of the Main Loop executed by the microcomputer system. In essence, Main Loop 1440 calibrates the system, loads look-up tables (RAMs) 4270 and 4274 in Shading Correction Circuit 426 (see FIG. 3) with appropriate data, and at each occurrence of a document edge interrupt, occurring on lead 486 (see FIGS. 2A and 2B) as discussed above, determines actual leading and trailing edges of the document for the current scan line being processed. Once all the scan lines have been processed, this routine determines the memory location of the first pixel in the escribing rectangle and the size of the rectangle. The memory address and rectangle size are then provided by routine 2100 to the windowing frame buffer.

In particlular, when power is first applied to the system microcomputer system, execution enters routine 1400, as shown in FIG. 14, and proceeds to block 1410. This block accesses resident memory within the microcomputer system and transfers appropriate data therefrom into Center Pixel Look-up Table (RAM) 4555, X EXP and Y EXP Noise Tracking Decay Look-up Tables (RAMs) 4679 and 4719 and Background Tracking Look-up Table (RAM) Table 4768 all contained within Image Processing Circuit 40 (specifically see FIGS. 8, 10A and 10B, and 11A and 11B, respectively). Once this has occurred, execution is passed to block 1420 to invoke Calibration Routine 1500. This routine, as discussed in detail below in conjunction with FIG. 15, calculates appropriate gain and offset factors and stores these factors within Offset Correct Look-up Table (RAM) 4274 and Gain Correct Look-up Table (RAM) 4270 for subsequent use by Shading Correction Circuit 426 in correcting scanned microfilm images for side-to-side shading differences. Once block 1420 fully executes, execution passes to block 1430. This block, determines the type of microfilm that is to be scanned (silver positive, silver negative, diazo or vessicular) from information supplied by the film library and, in response to this information, copies an appropriate table of gamma correction factors from resident memory within the microcomputer system into Gamma Correct Look-up Table (RAM) 4324 situated within Gamma Correction Circuit 432 (see FIG. 4). During this time, the film library also loads an appropriate roll of microfilm that is to be scanned into an available microfilm scanner. Now, once the gamma table has been fully copied, system calibration and initialization is complete, and microfilm scanning can begin. Therefore, execution passes to block 1435 which, when executed as shown in FIG. 14, provides a signal (over a lead not shown) to the film library to begin scanning. Once this occurs, execution proceeds to block 1440. Now, as noted above, each incoming scanned pixel is processed by pre-scan processing circuit 42 and by image enhancement circuit 44 (see FIGS. 2A and 2B). However, edge detection does not occur until an entire line of pixels has been scanned. Consequently, microcomputer system 485 waits for an interrupt to occur over line 486 (see FIGS. 2A and 2B) by re-executing decision block 1440 (see FIG. 14). This interrupt signals that an entire scan line has been processed and leading and trailing edge pair(s) have been stored within document edge detection circuit 481, as described above, for use by the microcomputer system. When this interrupt occurs, execution proceeds, via the "YES" path emanating from decision block 1440, to block 1460. This block invokes Document Edge Detection Routine 2100 to access the leading/trailing edge pairs stored within the document edge detection circuit and appropriately process these pairs, in the manner described in detail below in conjunction with FIGS. 21A-21C, to ascertain the actual document leading and trailing edge locations (boundaries) for the current scan line and, once all the scan lines have been processed, a memory address for the first pixel in the escribing rectangle and the size of the rectangle. Once all first pixel address and rectangle size have been determined, routine 2100 passes this information to windowning frame buffer 489 (see FIGS. 2A and 2B) to mask all areas appearing outside the rectangle and thereby transfer the processed pixels located on and within the escribing rectangle to video compressor 50 (see FIGS. 2A and 2B). Once Document Edge Detection Routine 2100 completes its execution, execution loops back, as shown in FIG. 14 via path 1470, to block 1430 in preparation for processing the next scan of an image.

2. System Calibration Routines

Figure 15:
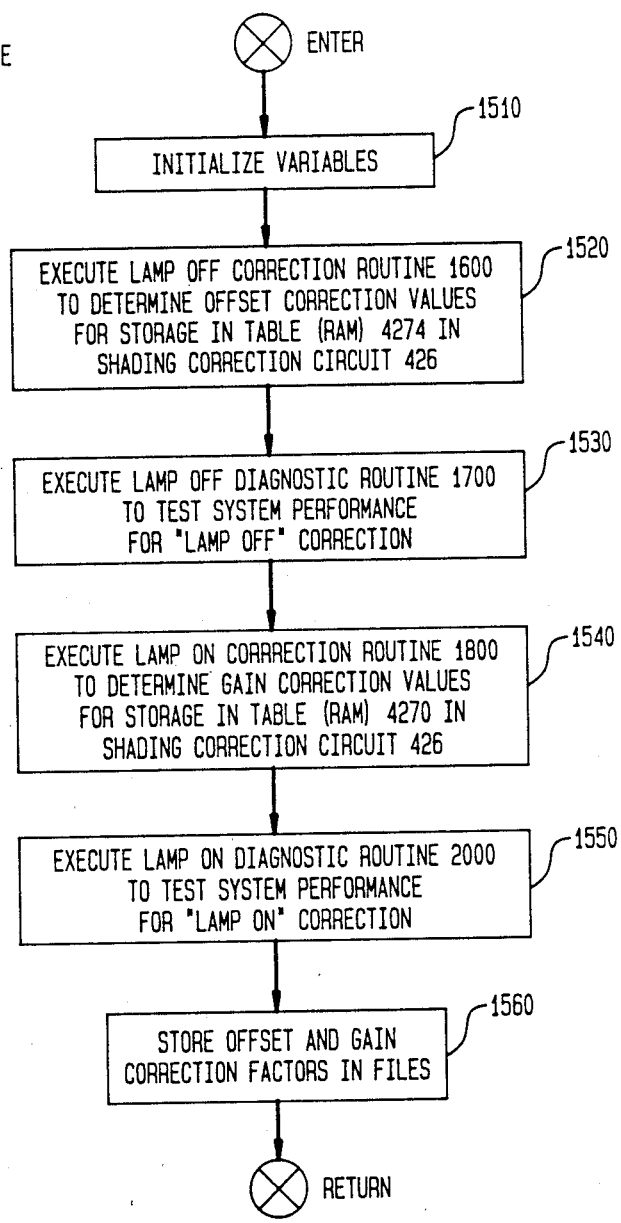
FIG. 15 depicts a flowchart of Calibration Routine 1500 that is executed as part of Main Loop 1400 shown in FIG. 14.

A flowchart of Calibration Routine 1500 is depicted in FIG. 15. This routine calculates appropriate gain and offset factors and stores these factors within Offset Correct Look-up Table (RAM) 4274 and Gain Correct Look-up Table (RAM) 4270 for subsequent use by Shading Correction Circuit 426 (see FIG. 3) in correcting scanned microfilm images for side-to-side shading differences.

Upon entry into this routine, execution passes to block 1510 to initialize various variables. Once this occurs, the microcomputer instructs the film library, as discussed in detail below, to scan an image without any microfilm present in the scanner. One such scan occurs with illumination lamp 7 (see FIG. 1) "off" to fabricate a table of offset correction factors, and a second scan occurs with the illumination lamp "on" to fabricate a table of gain correction factors. These tables are then stored within appropriate RAM look-up tables located within Shading Correction Circuit 426 (see FIG. 3).

Specifically as shown in FIG. 15, once all the appropriate variables have been initialized, execution passes to block 1520 to invoke Lamp Off Correction Routine 1600, which will be discussed in detail in conjunction with FIGS. 16A and 16B below, to perform a lamp off scan and determine a table of offset correctoin values. Thereafter, execution proceeds to block 1530, to invoke Lamp Off Diagnostic Routine 1700, which is discussed in detail below in conjunction with FIGS. 17A and 17B, to perform various dianostic tests with the lamp off and thereby partially test performance of the optics located in the microfilm scanner. Now, once these diagnostic tests have been completed, execution proceeds to block 1540 to invoke Lamp On Correction Routine 1800. This routine, as discussed in detail below in conjunction with FIGS. 18A-18C, performs a lamp on scan and determines a table of gain correction values. Thereafter, execution proceeds to block 1550, which when executed, invokes Lamp On Diagnostic Routine 2000. This routine, when executed and as discussed in detail in conjunction with FIG. 20 below, performs various dianostic tests with the lamp on and provides other diagnostic test information concerning the performance of the optics located in the microfilm scanner. Now, once routine 2000 has fully executed, execution proceeds to block 1560 to store the offset and gain correction tables, determined through routines 1600 and 1800, in appropriate files located within resident storage (such as disk storage) contained within the microcomputer system. Once this occurs, Calibration Routine 1500 has fully executed and hence execution then return to Main Loop 1400.

Now let us turn to the way in which the video signal on line 49 (FIG. 1B) is processed to extract the parameters of the original scan; this signal comes from the post scan processing circuit 48.

The purpose of this processing is to generate information parameters about the scan, including, for example, the number of on pixels in a given region as generated by "ON PIXEL" counter 60, the number of transitions in a region as generated by "TRANSITION" counter 62, the number of transistions per line as generated by "TRANSITION PER LINE" counter 64 and the total on time per line is generated by the "ON TIME PER PIXEL" counter 66.

The operation of counter 60 will be discussed in detail and then show how counter 60 may be modified to achieve the functionality of counters 62, 64 and 66.

Figure 16:
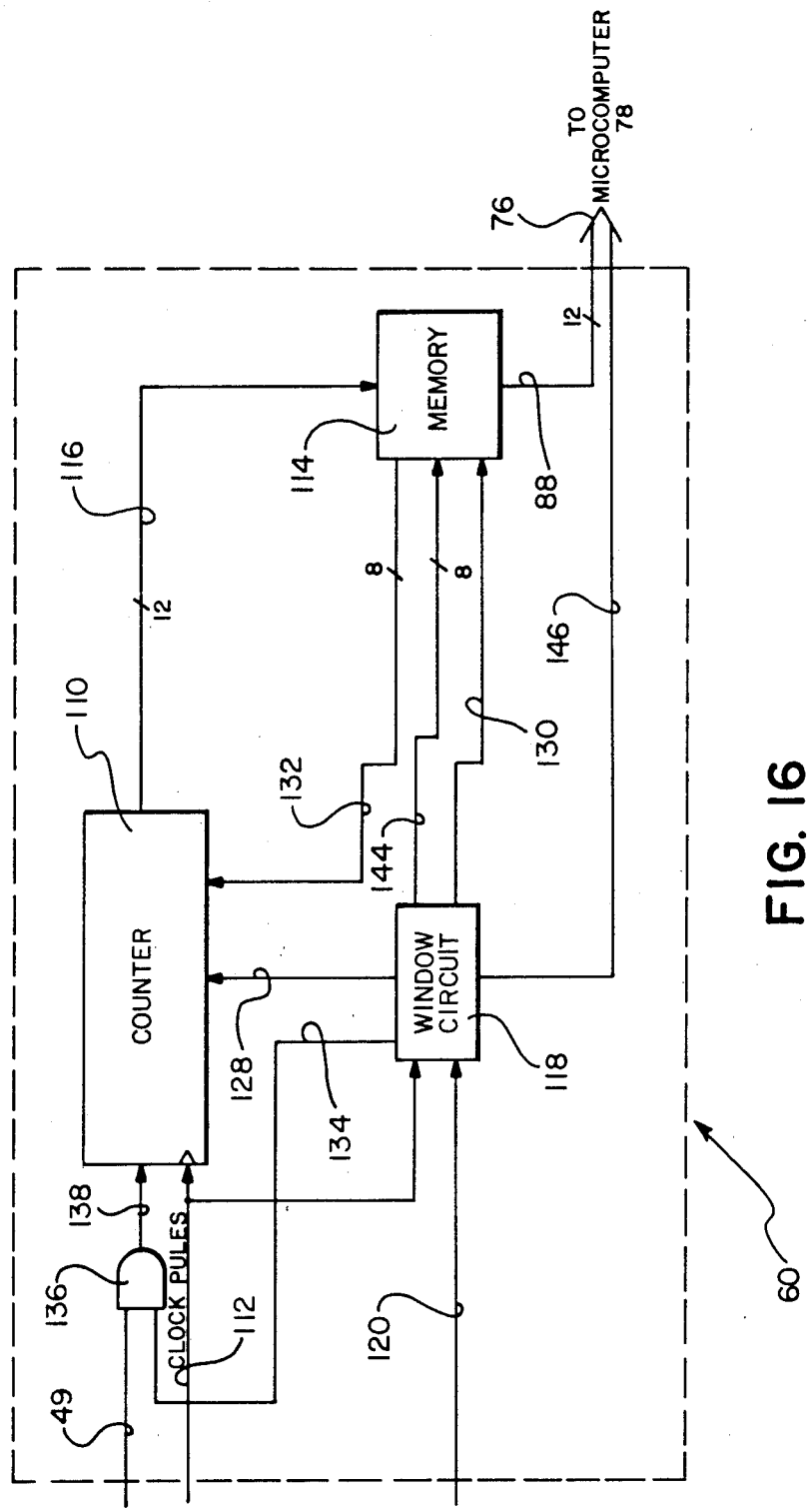
FIG. 16 depicts the on pixel counter shown in FIG. 1B.
Figure 17:
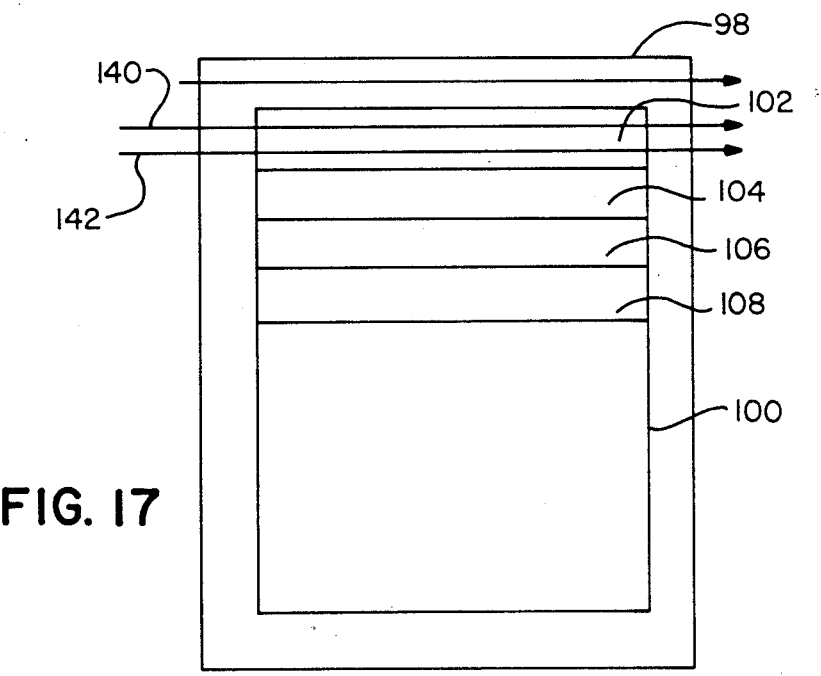
FIG. 17 depicts the manner in which the selected region of the image may be defined as a series of strips.

Counter 60 (FIG. 1B) is shown in greater detail in FIG. 16. The primary function of counter 60 is to produce a count of the total number of "ON PIXELS" or the total number of pixels representing text or other non-background area. As illustrated in FIG. 17, the selected region over which the counts are assessed of the image 100 may be defined as a single strip 102 with subsequent strips 104, 106, and 108.

In operation, the "ON PIXEL" counter 60 (FIG. 1B) receives on line 49 (FIG. 1B and FIG. 16) indicating when the video signal is comprised of text in that portion of the document. This signal on line 49 is used to gate the counter 110 which counts the pixels with pixel clock signal 112. Across the strip the window strip area 102 (FIG. 17) is defined by the window circuit 118 in FIG. 16 and lies within the area 100 (FIG. 6 and FIG. 17) of the total image area 98. This strip 102 is signalled by window circuit 118 (FIG. 16) through line 134, which enables, via NAND gate 136, the signal line 138 so that when an area of text is encountered which falls within the window area 100, the counter 110 is able to count, counter 110 counts the pixel clock pulses on line 112 because the output of NAND gate 136 is high.

Figure 19:
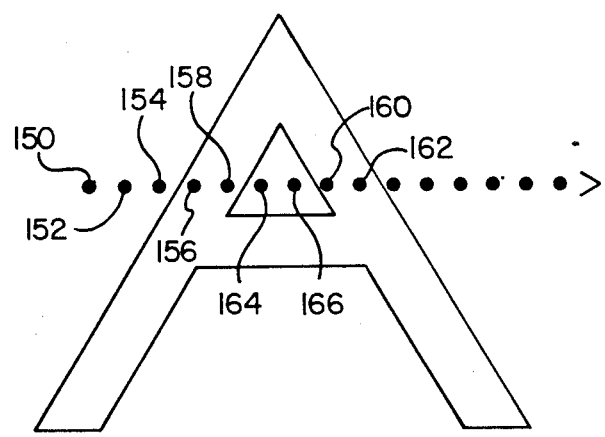
FIG. 19 depicts how text and background area are treated during the scanning operation.

As shown in FIG. 19 where for example, an area of text or any other area which is designated by a binary signal 49 as being different from the background that is to say, signal 49 which will have one value when the video signal falls on the background of the document, such as for example, at pixel locations 150 or 152 or 154, but will have another value when a pixel falls on an area of text such as 156, 158, 160 or 162. Pixel locations 164 and 166 would also correspond to background values. There may be other areas of different contrast, the background of the document is represented by binary signal 49 which may not be text, but instead may be such things as figures or lines and the pixels which may fall on those areas would also be counted.

This process continues on repeated scan lines for example, scan line 140, (FIG. 17) and 142, across the region 102 until the end of scan line 142. The window circuit 118 (FIG. 16) generates a write control signal on line 144 which controls the writing of data from the output of counter 110 through lines 116 to memory 114.

The value written in memory 114 corresponds to the count of the total of the pixels that fall on text or other non-background areas of the image during the scanning of the window area 102 (FIG. 17).

Consecutive strips 104, 106 and 108 are similarly scanned and their count values are stored in separate locations in memory 114, FIG. 16 at the completion of the scanning of the image, the window circuit 118 generates an interrupt signal via line 146 to processor 78 (FIG. 1B) at which time processor 78 accesses through control data line 76 (FIG. 1B and FIG. 16) the contents of memory 114 (FIG. 16) to acquire the information about the number of counts that corresponds to strips 102, 104, 106, and 108 (FIG. 17).

Figure 18:
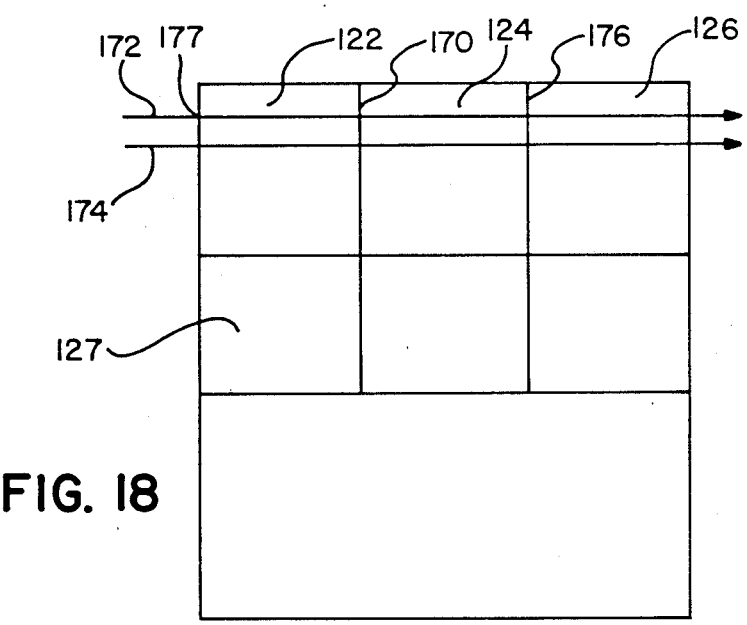
FIG. 18 depicts an alternative way of selecting regions of the image that take the form of subareas.

FIG. 18 illustrates an alternate way of selecting regions of the images that may take the form of subareas, for example, 122, 124, 126 (FIG. 18) at specified location of memory 114 (FIG. 16) (which is controlled by address control lines 130, to specify memory location in memory 114) is fed back to counter 110 through lines 132 to preload counter 110.

At the start of the region at point 177, the counter 110 is enabled to begin counting the pixels which intersect the areas of text in the region 122 (FIG. 18). On each vertical boundary, for example, boundary 117 (FIG. 18) at each scan line for example, scan lines 172 and 174, the window circuit causes the contents of counter 110 (FIG. 16) to be sent to memory 114. The location in memory corresponds to corresponding region 122 which is preserved along each line so that the counter 110 may be used in preloading the counter for the next line. Consequently, on edge 176, the accumulated contents of counter 110 are passed through lines 132 to memory 114 and thus, the value of counter 110 is replaced with the value in memory 114 for region 122 (FIG. 18) through lines 132 (FIG. 16). Thus, at the end of a complete scan of the region 122 (FIG. 18), each location in memory 114 (FIG. 16) corresponds to a specific region for example, 122, 124, etc. (FIG. 18) which contains the total accumulated "on text" pixels of each of their respective regions. This data is passed on line 88 to processor 78 (FIG. 1B) through its interrogation of memory 114 (FIG. 16) via lines 76 on the occurrance of an interrupt signal on line 146 (FIG. 16) from window circuit 118.

Figure 20:
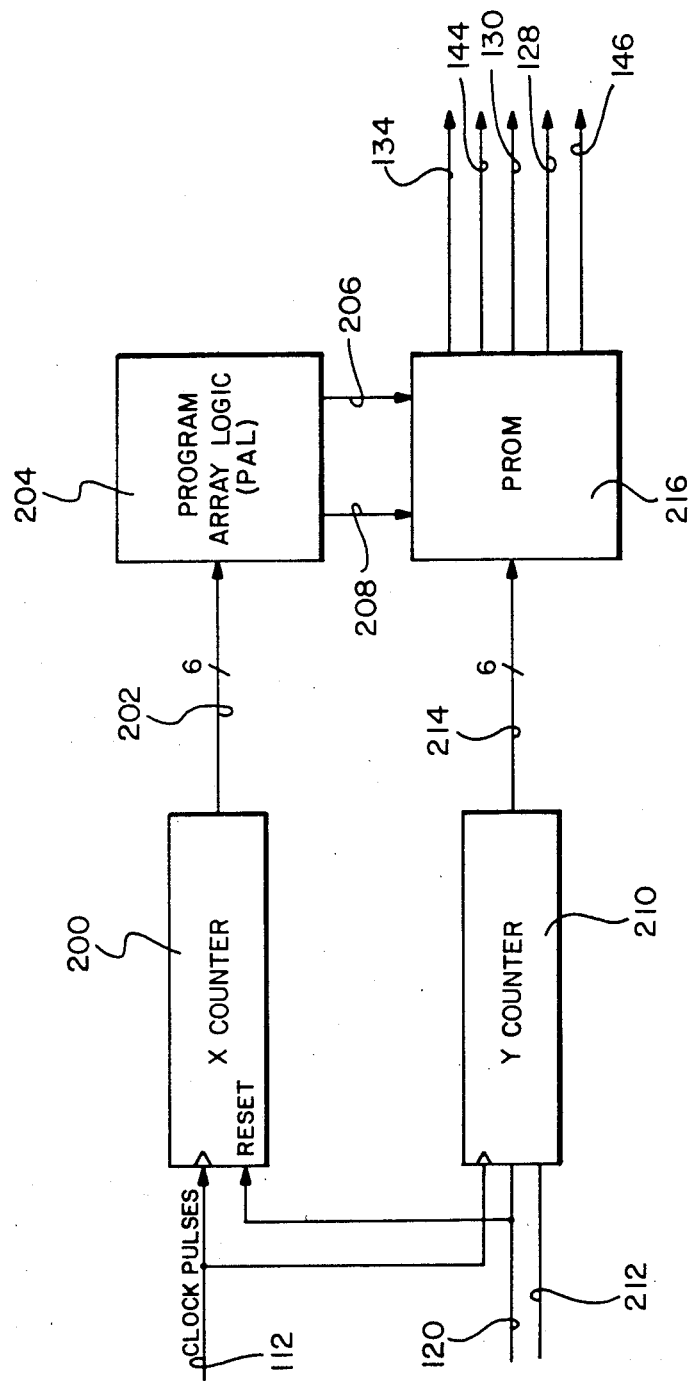
FIG. 20 depicts the window circuit shown in FIG. 16 in more detail.

FIG. 20 shows the window circuit 118 shown in FIG. 16 in greater detail, in which an X counter 200 receives the pixel clock pulse on line 112 and the beginning of line signal via line 120, the pixel clock pulses on line 112 and the start of scan line signal 120 are used to trigger the counting process of X counter 200 at the beginning of a scan line and is also used to reset X counter 200. The output of X counter 200 is equivalent to the pixel/count across the scan line and are carried by line 202 to PAL (program array logic) 204. PAL 204 produces an X timing signal on line 206 and 208. These timing signals correspond to the beginning of the left and right edges of region 100 and also corresponds to each of the individual boundaries when counting in rectangular regions (FIG. 17) (e.g. 122, 124 etc. in FIG. 18); these boundaries are shown as 170 and 176 in FIG. 18.

The Y counter 210 (FIG. 20) receives the pixel clock signal on line 112 and also the start of scan line signal 120 which enables the counter to increment one count per scan line. Y counter 210 is reset to zero at the beginning of a frame as a result of the beginning of frame signals appearing on line 212. The output of Y counter 210 is the line count number which is carried on line 214 to PROM 216 which also receives X counting signals on lines 206 and 208 and PROM 216 decodes these signals in conjunction with the Y count values to produce enable line signals 134 which are used to define the counting region 100; counter reset line 128 is used to reset counter 110 at the beginning of a counting region such as 102 are in the top left corner of 122 or 124. The interrupt line which occurs at the end of the total counting process, when the frame is completely scanned and the address signals on central line 130 are used to define the location in memory into which the data must be written. In addition, the read/write signal for memory 114 is carried on line 144, which is also generated by PROM 216. It will be appreciated by those familiar with the art that PROM 216 may be programmed to generate all those signals which are simply combinations of the Y address signals on line 214 and the X count signals which are carried on line 206 and line 208.

Figure 21:
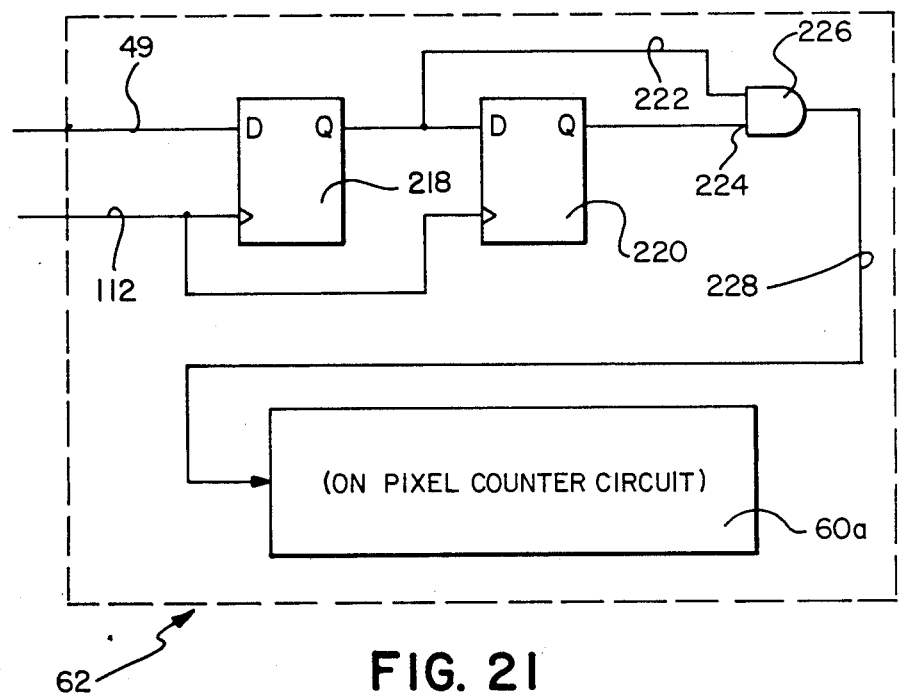
FIG. 21 depicts the configuration of the "TRANSITION COUNTER" shown in FIG. 1B.
Figure 22:
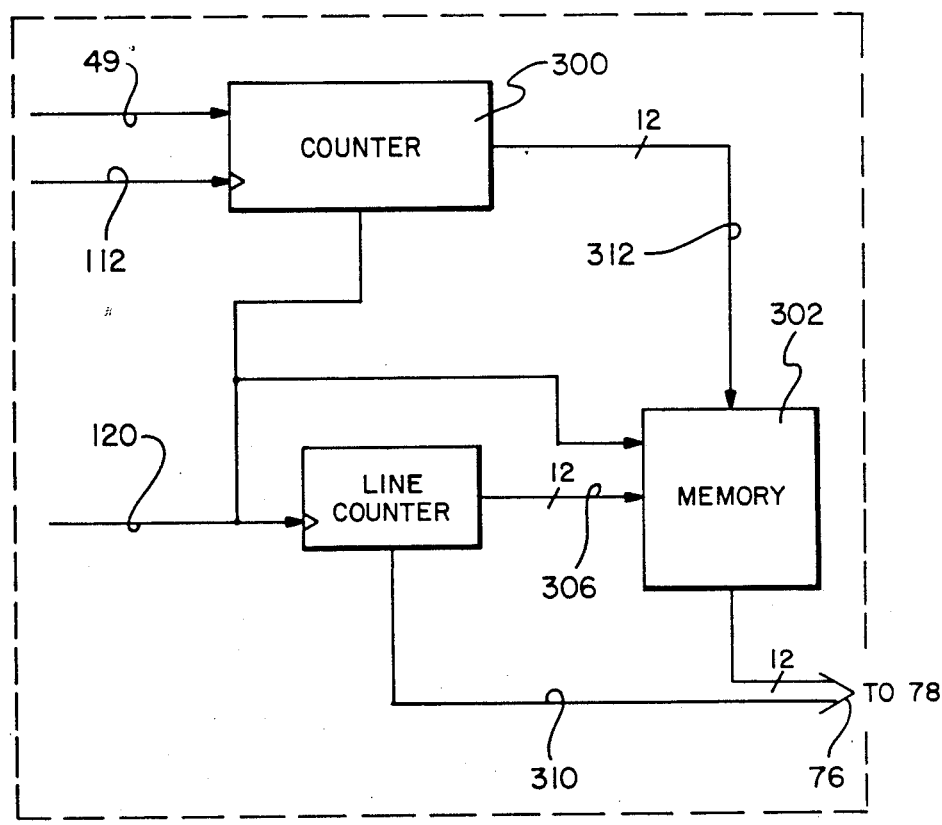
FIG. 22 depicts the configuration of the "ON TIME PER LINE" counter shown in FIG. 1B.

Counter 62 in FIG. 1B counts transitions and the configuration of counter 62 is shown in FIG. 21 where the incoming binary signal 49 in conjunction with the pixel clock 112 passes to a D type flip flop 218 and to a second D type flip flop 220, the outputs of which on lines 222 and 224 are used to count the transitions in the text signal which are decoded by NAND gate 226 to produce an output binary video signal 228 which is placed at the input line of counter 300' in FIG. 22.

The "TRANSITION PER LINE COUNTER" counter 64 is similar to the "TRANSITION" counter 62 except that the "TRANSITION PER LINE" counter resets the total count on each scan line and uses a circuit very similar to that for the "TRANSITION" counter 62 (FIG. 21) including the counter 110' and memory 114' as originally shown in FIG. 16, is configured to store in its memory the transition counts on each scan line so that the microcomputer 78 may read the transition counts on every scan line across the scanned area.

In a similar manner, the "ON TIME PER LINE" counter 66 is effectively identical to the "ON PIXEL" counter 60.

FIG. 22 shows the "ON TIME PER LINE" counter 66 (FIG. 1B) in which counter 300 counts the number of clock pulses during which time the binary video signal carried by line 49 is "ON". This is achieved by clocking counter 300 with the clock pulse signal on line 112. This counter 300 is reset at the beginning of each scan line by the beginning of scan line signals carried on line 120. In addition, line 120 drives "LINE" counter 308 which counts the number of scan lines from the beginning of the image scan ("LINE" counter 308 is reset at the beginning of each image). The output of "LINE" counter 308 is carried on the twelve lines designated 306 which forms the address for memory 302 which has one memory location per scan line when the image scan is complete. At the end of each scan line, the memory 302 writes the contents of counter 300 into a memory location specified by memory 302 via data lines 312 and writes this data at the location specified by "LINE" counter 308 through lines 306. At the end of a complete scan, or when data from a sufficient number of lines have been accumulated, an interrupt signal on line 310 passes to microcomputer 78 at which time microcomputer 78 requests the contents of memory 302 on bidirectional control lines 76, thereby storing in the microcomputer the "ON" time per scan line.

The "TRANSITIONS PER LINE" counter 64 (FIG. 1B) which counts transitions per line is effectively identical to that shown in FIG. 22 but is preceded by a circuit, which is constructed the same as flip flops 218 and 220 and NAND gate 226, which is outputted on line 228, shown in FIG. 21. This circuit takes the incoming binary video signal 49 and processes it to generate a pulse per transition which is placed on line 228 as an output; this output signal would be sent to a circuit similar to that shown in FIG. 22 and identified as 66 to perform the functions of counting the number of "TRANSITIONS PER LINE".

Modifying the Image Processing with Stored Data

The technique of overwritting magnetic digital data on film is well known to those skilled in the art as shown in U.S. Pat. No. 3,920,862.

Figure 23:
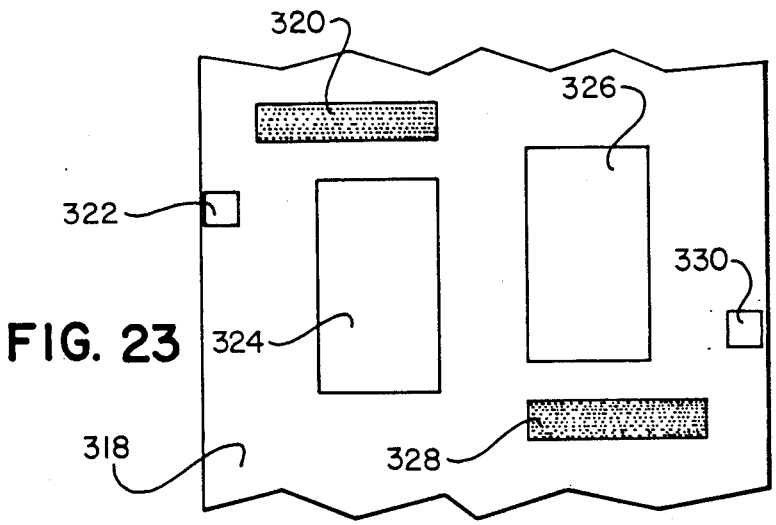
FIG. 23 depicts a section of microfilm illustrating where the digital information is stored relative to the image and image count blip.

The digital information may be stored optically on film 318 along with the image. Such technology is illustrated in U.S. Pat. Nos. 4,213,040; 4,254,329; and 4,734,565. One technique is shown in FIG. 23, where the digital data for one track of microfilm is stored in area 320 adjacent to blip mark 322 used to locate the image and just ahead of the image 324 represented by the digital data 320, while the data associated with image 326 is stored at location 328 in conjunction with blip 330.

Figure 24:
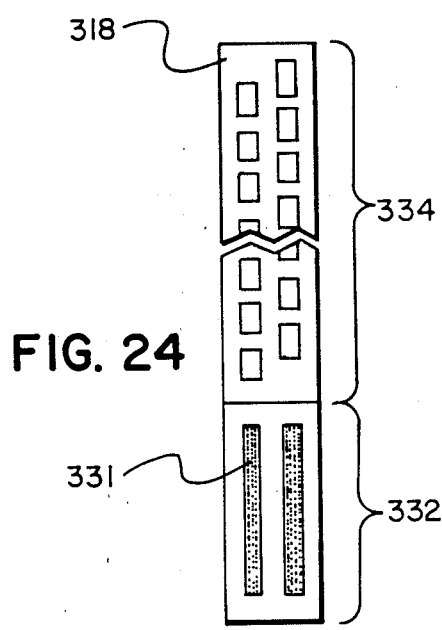
FIG. 24 depicts an alternative embodiment that places the digital information on the film leader.

Alternatively, as shown in FIG. 24, the microfilm digital data may be stored in an area at the beginning of the microfilm and this digital data will relate to all images on the roll of microfilm. Thus, the leader area 332 has digital data stored on it and the actual material comprising the digital data 331 on the leader 332 may be a different medium or the same medium as the area where the images are stored which is identified as 334. In this instance, the digital data could be read in its entirety during scanning of a microfilm or by indexing further down the roll to the images of interest. The digital data 331 could be selected such that only the digital data associated with the images of interest could be read prior to moving the film to the respective image area.

The way in which the image processing is modified depends on the data which is stored on the microfilm with reference to its image. For example, if the data corresponding to the total area thresholded is stored on the microfilm, then this information can be used to change the threshold level of the image during electronic processing.

The basic technique is that the digital data read from the film either from the magnetic data (not shown) or from the digital data 320 and 326 written optically on the film 318 (or alternatively, from the disc storage 80) is processed in the microcomputer system 78 and a new set of correction values for the center pixel lookup table in RAM 4555 (FIG. 8) is sent along line 268 from the microcomputer to change the contents of the RAM 4555 in order to bring the image closer to the digitally stored value.

Figure 25:
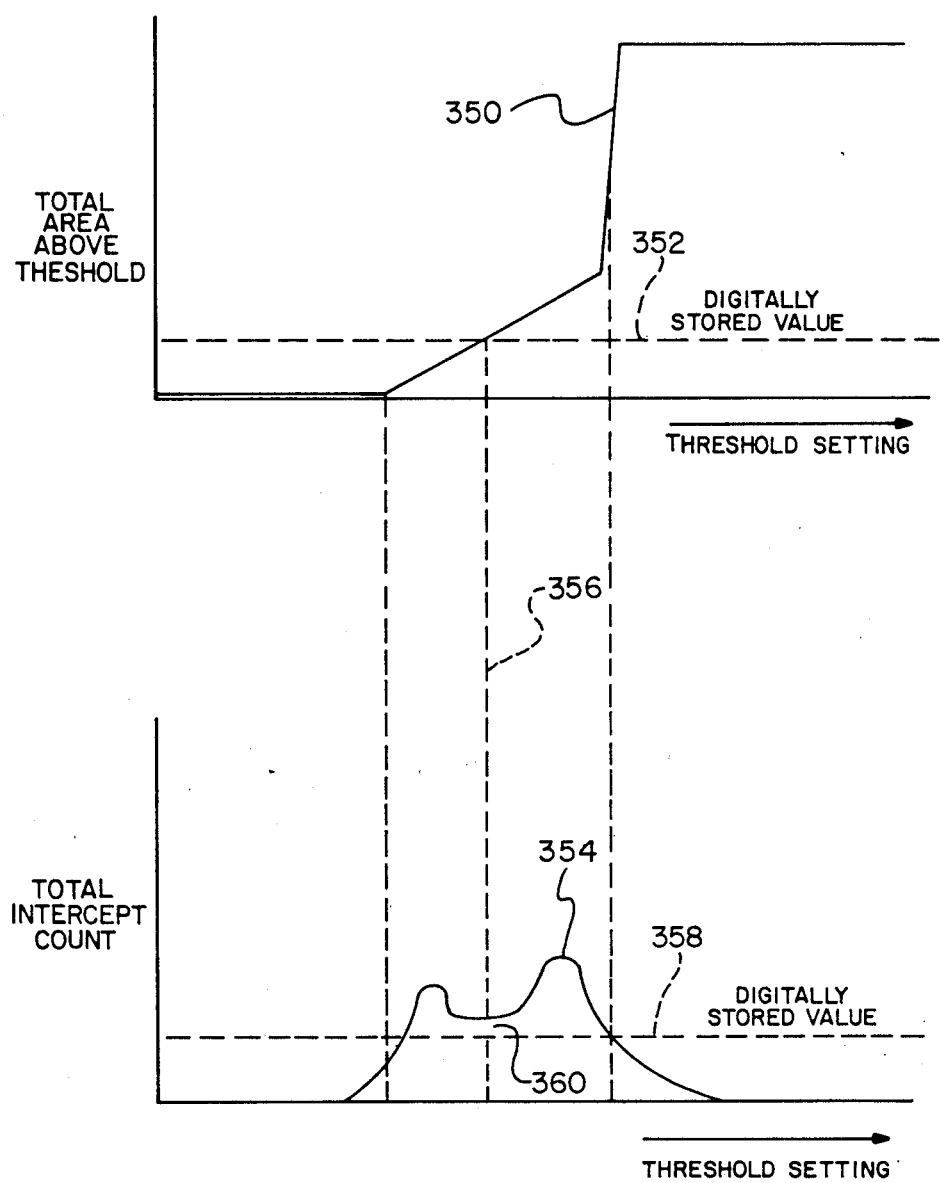
FIG. 25 depicts graphs showing total area above the threshold vs. threshold setting in the upper graph and total transition count vs. threshold setting in the lower graph.

For example, such a technique is illustrated by the upper graph in FIG. 25 which plots the threshold setting against the total area above threshold for a typical image. The line 350 indicates the relationship which typically exists between a threshold setting and a total area above threshold. The function is a monotonic function which passes through the digitally stored value (dotted line 352) corresponding to the total area of "ON PIXELS" of the original image. By adjusting the center pixel lookup table in RAM 4555 (FIG. 8), microcomputer 266 is able to change the total area above threshold of the image from this current value to a value closer to the digitally stored value. This may be done through repeated scans or if the digitally stored total area is limited to regions across the image, as has already been explained. It may be adjusted through the image so that as each successive region is scanned, a more exact threshold value is obtained, and the image may then be scanned a second time.

If additional data is stored, such as the total transition count whose function varies as shown by line 354 (FIG.

25), this information may be used to deterine first if additional noise has been introduced as indicated by the difference between the transition count at the desired threshold setting as indicating by dotted line 356 and the digitally stored transition count value as indicated by line 358 so that the difference between the level of the transition function 354 at the desired threshold setting value 356 and the digitally stored value as indicated by line 358, this differenced designated by distance 360 between the level of line 358 and the level of line 354 at position 356 which may be used to identify whether the quality of the film has been degraded by scratches or pin holes and this may be used as a monitoring method.

It should be understood that by storing total area above threshold or total transition on subareas across the image, that the threshold level may also be dynamically adjusted across the image, to be optimally set for each subarea.

In addition, in order to offset additional transitions which may be introduced by noise in the image, it is possible to use the difference between the transition count at the desired level of line 358 (and the digitally stored value), this difference being designated as 360 to have the microcomputer 266 (FIG. 1C) adjust the contents of the noise pattern detect lookup table 4555 (FIG. 8) to provide addition filtering of noise in the image should the transition count prove to be higher than the original image, in other words, should the value 360 be greater than the present value.

Finally, if the histogram data on intercept length already referred to previously is to be used as a parameter of measure. The values used in the convolution function 455 (FIG. 2A) can be modified to provide the appropriate edge enhancement to insure that the histogram of transition is appropriate. This process would be an interactive process based on consecutive scanning under the control of the microcomputer 266.

Figure 26:
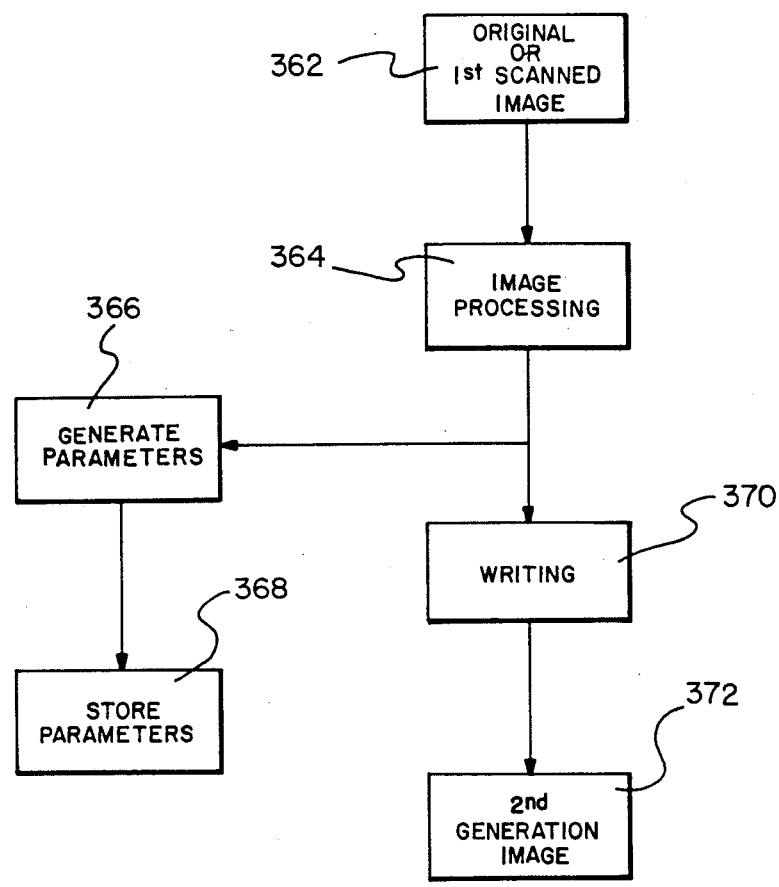
FIG. 26 depicts a block diagram of the procedural steps used to make the 2nd generation image of an original image N.

FIG. 26 illustrates the procedural steps required to make an electronic copy of an original optical image or first scanned image. Block 362 requires that the original optical image be scanned electronically to produce a video signal that is processed in block 364 to generate a series of parameters in accordance with block 366 which are then stored as set forth in block 368. The video signal is used to write electronically in block 370 a new or 2nd generation image on film as stated in block 372. The stored series of parameters 368 may then be used to create any subsequent generation of images.

Figure 27:
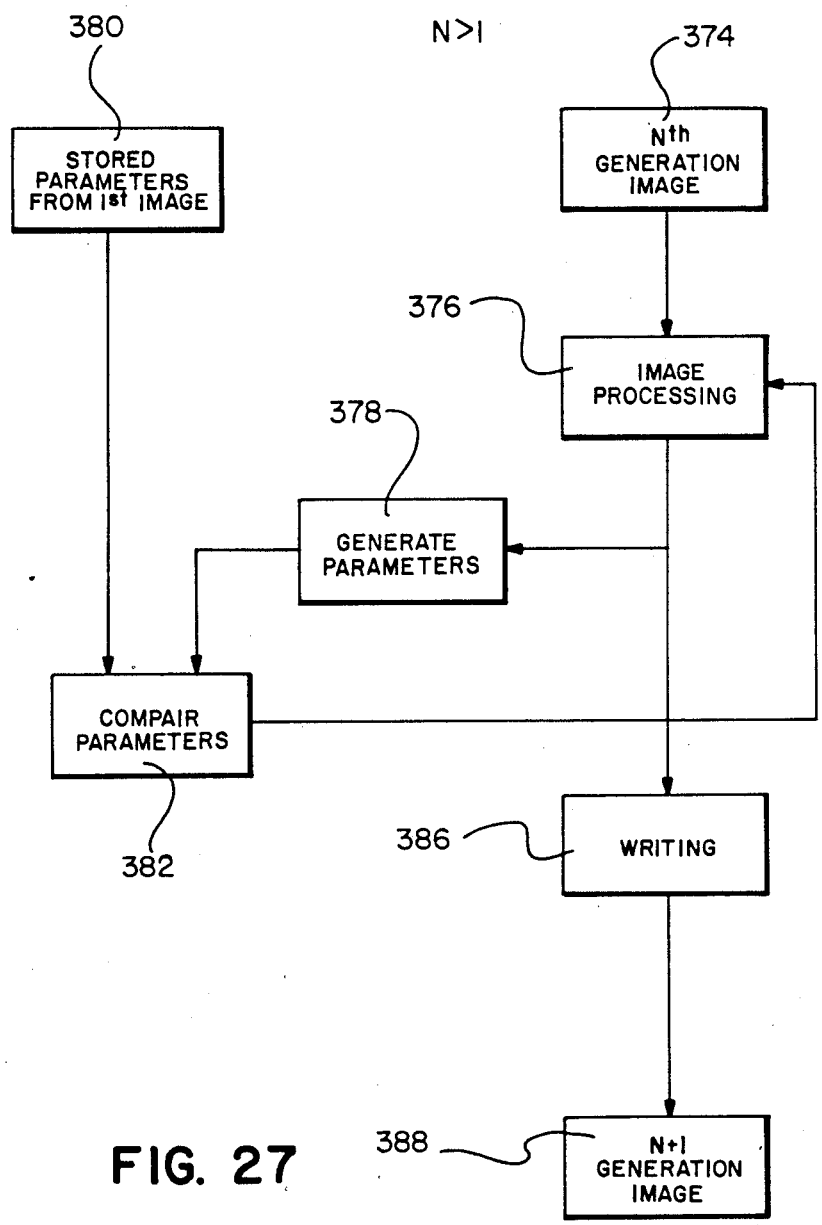
FIG. 27 depicts a block diagram of the procedural steps used to make 3rd or greater generations of images from an N>1 image.

FIG. 27 illustrates the procedural steps involved in making subsequent generations of images from the Nth or greater generation of electronically produced images. Accordingly, the Nth generation image in block 374 is scanned electronically to produce a video signal which is processed in block 376 to generate a series of video parameters as per block 378. These video parameters are compared in block 382 to the 1st generation series of video parameters stored in block 380. After comparison, an adjustment signal is created to modify the image processing step in block 376 prior to that processed signal being used to write as per block 386, a new N +1 image in block 388 which is the next generation of the two series of video parameters 380 and 378 that insures that the subsequent generations of film images will be of the highest quality possible.

Advantages and Industrial Applicability

Use of the present invention provides apparatus that can be used to make mutliple generations of a microfilm image while maintaining a higher level of image quality than was possible heretofore using strictly optical methods especially when a large number of image generations are produced. Because electronic techniques are used to generate the duplicate microfilm additional data is extracted from the original scanning of the image and stored independently of the image. This additional data may be recalled whenever subsequent generations of the image are to be produced to thereby preserving image quality to a high degree by using the stored information to monitor multiple generations of the image. Additionally, the invention overcomes the problem encountered in optical duplication which generally requires alternate generation of positive or negative images. The inventive method and apparatus can provide a copy having the same sense as the original i.e., a positive duplicate image can be obtained from a positive original.

The invention is useful in document retrieval and storage and use of such a technique renders microfilm more compatible with the electronic office and computer environment.

What is claimed is:

1. A method for duplicating a microfilm image comprising the steps of:
    generating a first video signal by scanning an Nth generation image;
    processing said video signal to generate binary video data representing said Nth generation image;
    generating a first series of parameters representative of the generated binary video data;
    storing said first series of parameters; and
    electronically writing an N+1 generation image using the generated video signal;
    generating a binary video signal by scanning an N+Mth generation image;
    processing said video signal to generate binary video data representing the Nth+Mth generating image;
    generating an N+Mth series of parameters representative of the generating binary video signal;
    comparing said N+Mth series of parameters with said stored parameters from the Nth generation to produce an adjustment signal;
    adjusting said N+Mth video signal in response to said adjustment signal; and
    electronically writing N+Mth+1 generation images using the adjusted video signal.

2. The method according to claim 1 wherein the first series of stored parameters include the number of on pixels per line in the Nth generation image.

3. The method according to claim 1 wherein the first series of stored parameters include the number of transitions per line in the Nth generation image.

4. The method according to claim 1 wherein the first series of stored parameters include the length of each transition in the Nth generation.

5. A method of duplicating a microfilm image comprising the steps of:
    generating a first video signal by scanning an Nth generating image;
    processing said video signal to generate binary video data representing said Nth generation image;
    generating a first series of parameters representative of the generated binary video data;
    storing said first series of parameters;
    electronically writing an N+1 generation image using the generated video signal;
    reading the N+1 generation image and comparing the N+1 generation parameters with the first series of stored parameters; and
    electronically writing an N+2 generation using said compared parameters.

* * * * *